(12) United States Patent
Marcus

(10) Patent No.: US 9,099,152 B2
(45) Date of Patent: Aug. 4, 2015

(54) METHOD AND APPARATUS FOR CREATION, DISTRIBUTION, ASSEMBLY AND VERIFICATION OF MEDIA

(75) Inventor: Dwight Marcus, Santa Barbara, CA (US)

(73) Assignee: NTECH PROPERTIES, INC., Santa Barbara, CA (US)

(*) Notice: Subject to any disclaimer, the term of this patent is extended or adjusted under 35 U.S.C. 154(b) by 276 days.

(21) Appl. No.: 13/233,636

(22) Filed: Sep. 15, 2011

(65) Prior Publication Data

US 2012/0180083 A1 Jul. 12, 2012

Related U.S. Application Data

(60) Division of application No. 11/156,086, filed on Jun. 16, 2005, now abandoned, which is a continuation-in-part of application No. 09/953,086, filed on Sep. 11, 2001, now abandoned.

(60) Provisional application No. 60/231,259, filed on Sep. 8, 2000.

(51) Int. Cl.
*H04N 7/10* (2006.01)
*H04N 7/025* (2006.01)
(Continued)

(52) U.S. Cl.
CPC .......... *G11B 27/034* (2013.01); *G11B 27/3027* (2013.01); *H04N 7/17318* (2013.01);
(Continued)

(58) Field of Classification Search
USPC ..................................................... 725/32–36
See application file for complete search history.

(56) References Cited

U.S. PATENT DOCUMENTS

| 3,900,219 A | 8/1975 | D'Amato et al. |
| 3,926,325 A | 12/1975 | Benson |

(Continued)

FOREIGN PATENT DOCUMENTS

| EP | 564247 | 10/1993 |
| WO | WO 93/23836 | 11/1993 |

(Continued)

OTHER PUBLICATIONS

Curtis et al., "Multimedia Content Management-Provision of Validation and Personalisation Services", IEEE, 1999, pp. 302-306.
(Continued)

*Primary Examiner* — Nasser Goodarzi
*Assistant Examiner* — Fred Peng
(74) *Attorney, Agent, or Firm* — Troutman Sanders LLP

(57) ABSTRACT

A method and apparatus for creation, distribution, assembly and verification of media, including one embodiment, media is transmitted to a receiver where the receiver assembles the media into programming. In another embodiment, media is transmitted to the receiver from a plurality of sources. In a further embodiment, a source of media performs a tagging operation to associate sets of tags with elements of the stream of media. In various embodiments, different combinations of look-and-feel, content and other tags are associated with the media stream. In an additional embodiment, tagging of the media stream is performed at the receiver. A user at the receiver may also provide data about the user to the receiver. In yet another embodiment, the receiver uses the tags to assemble the media into a program. In still further embodiments of the invention, various Royalty Only Aggregate Revenues or "ROAR" models and apparatus are disclosed.

15 Claims, 7 Drawing Sheets

(51) Int. Cl.

| | | |
|---|---|---|
| H04N 7/173 | (2011.01) | |
| G11B 27/034 | (2006.01) | |
| G11B 27/30 | (2006.01) | |
| H04N 21/254 | (2011.01) | |
| H04N 21/258 | (2011.01) | |
| H04N 21/2668 | (2011.01) | |
| H04N 21/418 | (2011.01) | |
| H04N 21/431 | (2011.01) | |
| H04N 21/433 | (2011.01) | |
| H04N 21/442 | (2011.01) | |
| H04N 21/45 | (2011.01) | |
| H04N 21/4784 | (2011.01) | |
| H04N 21/81 | (2011.01) | |
| H04N 21/84 | (2011.01) | |
| H04N 21/854 | (2011.01) | |

(52) U.S. Cl.
CPC ....... *H04N21/254* (2013.01); *H04N 21/25866* (2013.01); *H04N 21/25891* (2013.01); *H04N 21/2668* (2013.01); *H04N 21/4182* (2013.01); *H04N 21/431* (2013.01); *H04N 21/4331* (2013.01); *H04N 21/44204* (2013.01); *H04N 21/44218* (2013.01); *H04N 21/4532* (2013.01); *H04N 21/4784* (2013.01); *H04N 21/812* (2013.01); *H04N 21/84* (2013.01); *H04N 21/854* (2013.01)

(56) References Cited

U.S. PATENT DOCUMENTS

| | | |
|---|---|---|
| 4,290,141 A | 9/1981 | Anderson et al. |
| D264,810 S | 6/1982 | Voltmann |
| 4,377,870 A | 3/1983 | Anderson et al. |
| 4,566,030 A | 1/1986 | Nickerson et al. |
| 4,724,166 A | 2/1988 | deBruin |
| 4,724,491 A | 2/1988 | Lambert |
| 4,744,281 A | 5/1988 | Isozaki |
| 4,850,618 A | 7/1989 | Halladay, Jr. |
| 4,959,734 A | 9/1990 | Foster |
| 5,029,014 A | 7/1991 | Lindstrom |
| 5,034,807 A | 7/1991 | Von Kohorn |
| 5,041,972 A | 8/1991 | Frost |
| 5,046,004 A | 9/1991 | Tsumura et al. |
| 5,083,491 A | 1/1992 | Fields |
| 5,109,482 A | 4/1992 | Bohrman |
| 5,132,992 A | 7/1992 | Yurt et al. |
| 5,142,961 A | 9/1992 | Paroutaud |
| 5,153,829 A | 10/1992 | Furuya et al. |
| 5,206,929 A | 4/1993 | Langford et al. |
| 5,208,421 A | 5/1993 | Lisle et al. |
| 5,227,863 A | 7/1993 | Bilbrey et al. |
| 5,236,200 A | 8/1993 | McGregor et al. |
| 5,247,126 A | 9/1993 | Okamura et al. |
| 5,253,275 A | 10/1993 | Yurt et al. |
| 5,262,940 A | 11/1993 | Sussman |
| 5,303,042 A | 4/1994 | Lewis et al. |
| 5,307,456 A | 4/1994 | MacKay |
| 5,317,732 A | 5/1994 | Gerlach et al. |
| 5,353,391 A | 10/1994 | Cohen et al. |
| 5,388,197 A | 2/1995 | Rayner |
| 5,388,264 A | 2/1995 | Tobias et al. |
| 5,390,138 A | 2/1995 | Milne et al. |
| 5,393,926 A | 2/1995 | Johnson |
| 5,414,808 A | 5/1995 | Williams |
| 5,428,774 A | 6/1995 | Takahashi et al. |
| 5,434,678 A | 7/1995 | Abecassis |
| 5,440,730 A | 8/1995 | Elmasri et al. |
| 5,483,276 A | 1/1996 | Brooks et al. |
| 5,486,645 A | 1/1996 | Suh et al. |
| 5,515,490 A | 5/1996 | Buchanan et al. |
| 5,519,828 A | 5/1996 | Rayner |
| 5,543,925 A | 8/1996 | Timmermans |
| 5,550,863 A | 8/1996 | Yurt et al. |
| 5,550,965 A | 8/1996 | Gabbe et al. |
| 5,553,221 A | 9/1996 | Reimer et al. |
| 5,559,548 A | 9/1996 | Davis et al. |
| 5,561,711 A | 10/1996 | Muller |
| 5,576,844 A | 11/1996 | Anderson et al. |
| 5,580,054 A | 12/1996 | Shneifer |
| 5,616,876 A | 4/1997 | Cluts |
| 5,633,726 A | 5/1997 | Timmermans |
| 5,634,020 A | 5/1997 | Norton |
| 5,644,686 A | 7/1997 | Hekmatpour |
| 5,659,539 A | 8/1997 | Porter et al. |
| 5,659,793 A | 8/1997 | Escobar et al. |
| 5,680,639 A | 10/1997 | Milne et al. |
| 5,687,331 A | 11/1997 | Volk et al. |
| 5,689,641 A | 11/1997 | Ludwig et al. |
| 5,713,021 A | 1/1998 | Kondo et al. |
| 5,721,815 A | 2/1998 | Ottesen et al. |
| 5,721,878 A | 2/1998 | Ottesen et al. |
| 5,729,471 A | 3/1998 | Jain et al. |
| 5,748,187 A | 5/1998 | Kim et al. |
| 5,748,956 A | 5/1998 | Lafer et al. |
| 5,751,883 A | 5/1998 | Ottesen et al. |
| 5,752,029 A | 5/1998 | Wissner |
| 5,754,851 A | 5/1998 | Wissner |
| 5,765,164 A | 6/1998 | Prasad et al. |
| 5,781,730 A | 7/1998 | Reimer et al. |
| 5,799,150 A | 8/1998 | Hamilton et al. |
| 5,799,282 A | 8/1998 | Rakshit et al. |
| 5,819,286 A | 10/1998 | Yang et al. |
| 5,826,102 A | 10/1998 | Escobar et al. |
| 5,852,435 A | 12/1998 | Vigneaux et al. |
| 5,861,880 A | 1/1999 | Shimizu et al. |
| 5,864,682 A | 1/1999 | Porter et al. |
| 5,864,868 A | 1/1999 | Contois |
| 5,870,030 A | 2/1999 | DeLuca et al. |
| 5,875,305 A | 2/1999 | Winter et al. |
| 5,949,951 A | 9/1999 | Sklar et al. |
| 5,966,121 A | 10/1999 | Hubbell et al. |
| 5,999,909 A | 12/1999 | Rakshit et al. |
| 6,002,720 A | 12/1999 | Yurt et al. |
| 6,006,257 A * | 12/1999 | Slezak ................. 725/110 |
| 6,032,156 A | 2/2000 | Marcus |
| 6,144,702 A | 11/2000 | Yurt et al. |
| 6,154,771 A | 11/2000 | Rangan et al. |
| 6,293,868 B1 | 9/2001 | Bernard |
| 6,314,451 B1 | 11/2001 | Landsman et al. |
| 6,317,761 B1 | 11/2001 | Landsman et al. |
| 6,317,784 B1 | 11/2001 | Mackintosh et al. |
| 6,320,495 B1 | 11/2001 | Sporgis |
| 6,379,251 B1 | 4/2002 | Auxier et al. |
| 6,456,981 B1 | 9/2002 | Dejaeger et al. |
| 6,760,916 B2 * | 7/2004 | Holtz et al. ................. 725/34 |
| 6,764,395 B1 | 7/2004 | Guyett |
| 6,813,775 B1 | 11/2004 | Finseth et al. |
| 6,883,000 B1 | 4/2005 | Gropper |
| 7,024,677 B1 | 4/2006 | Snyder et al. |
| 7,130,831 B2 | 10/2006 | Howard et al. |
| 7,380,262 B2 | 5/2008 | Wang et al. |
| 7,603,684 B1 | 10/2009 | Ellis |
| 7,617,190 B2 | 11/2009 | Wright et al. |
| 7,877,676 B2 | 1/2011 | Munetsugu et al. |
| 7,937,582 B1 | 5/2011 | Lee |
| 8,386,588 B1 | 2/2013 | Cooley |
| 2001/0056577 A1 | 12/2001 | Gordon et al. |
| 2002/0019858 A1 | 2/2002 | Kaiser et al. |
| 2002/0077902 A1 | 6/2002 | Marcus |
| 2002/0087976 A1 | 7/2002 | Kaplan et al. |
| 2002/0092019 A1 | 7/2002 | Marcus |
| 2002/0111912 A1 | 8/2002 | Hunter et al. |
| 2003/0163815 A1 | 8/2003 | Begeja et al. |
| 2003/0167202 A1 | 9/2003 | Marks et al. |
| 2004/0025180 A1 | 2/2004 | Begeja et al. |
| 2004/0221311 A1 * | 11/2004 | Dow et al. ................. 725/52 |
| 2005/0165626 A1 | 7/2005 | Karpf |
| 2005/0198677 A1 | 9/2005 | Lewis |
| 2005/0240456 A1 | 10/2005 | Ward et al. |
| 2005/0262151 A1 | 11/2005 | Plastina et al. |
| 2006/0031551 A1 | 2/2006 | Agresta et al. |

(56) References Cited

U.S. PATENT DOCUMENTS

| | | | |
|---|---|---|---|
| 2006/0167860 A1 | 7/2006 | Eliashberg et al. | |
| 2006/0184982 A1 | 8/2006 | Paz et al. | |
| 2006/0212900 A1* | 9/2006 | Ismail et al. | 725/34 |
| 2007/0113250 A1 | 5/2007 | Logan et al. | |
| 2007/0157275 A1 | 7/2007 | Marcus | |
| 2007/0180523 A1 | 8/2007 | Jablonski et al. | |
| 2007/0192401 A1 | 8/2007 | Weakliem et al. | |
| 2008/0010337 A1 | 1/2008 | Hayes et al. | |
| 2008/0092168 A1 | 4/2008 | Logan et al. | |
| 2008/0140674 A1 | 6/2008 | Ishikawa | |
| 2010/0049699 A1 | 2/2010 | Benschoter et al. | |
| 2011/0209172 A1* | 8/2011 | Redling et al. | 725/23 |
| 2012/0180083 A1 | 7/2012 | Marcus | |

FOREIGN PATENT DOCUMENTS

| | | |
|---|---|---|
| WO | WO 96/08108 | 3/1996 |
| WO | WO 96/19779 | 6/1996 |
| WO | WO 97/04596 | 2/1997 |
| WO | WO 97/17111 | 5/1997 |

OTHER PUBLICATIONS

International search report dated Feb. 25, 2008 for related application PCT/US 07/00207.

Kirda, Engin et al., "MYXML: An XML based template engine for the generation of flexible web content" [online]. In Proceedings of 2000 (pp. 317-322). Chesapeake, VA: AACE [retrieved on Sep. 8, 2007]. Retrieved from the Internet: <URL: http://media.inhatc.ac.kr/papers/hypermedia/KirdaOO.pdf>.

Lee, Taekyong, "Query Processing Technique for Multimedia Presentation Graphs", Eighth International Workshop on Research Issues in Fata Engineering, Continuous Media Databases and Applications. 1998, pp. 130-138.

Li, Chung-Sheng et al., "Multimedia Content Description in the Infopyramid", Proceedings of the 1998 IEEE International Conference on Acoustics, Speech and Signal Processing, 1998, vol. 6, pp. 3789-3792.

Owner's Manual, Sony Video Cassette Recorder Model SLV-662HF, 1999.

Paek et al., "Self-Describing Schemes for Interoperable MPGE-7 Multimedia Content Descriptions", CiteSeer, Department of Electrical Engineering, Columbia University, 1999, pp. 1-18.

Piamsa-Nga, Punpiti, "A Parallel Model for Multimedia Database on Cluster System Environment", Proceedings IEEE International Symposium on Industrial Electronics, ISIE, 1998, vol. 2, pp. 648-652.

Saraceno, C., "Video Content Extraction and Representation Using a Joint Audio and Video Processing", Proceedings of the 1999 IEEE International Conference on Acoustics, Speech and Signal Processing, vol. 6, Date: Mar. 15-19, 1999, pp. 3033-3036.

Smith, John R. et al., "Visually Searching the Web for Content", IEEE, 1997. pp. 12-20.

Wu, Chao-Hui, "Querying Multimedia Presentations", Proceedings IEEE Conference on Protocols for Multimedia Systems-Multimedia Networking, 1997, pp. 64-73.

* cited by examiner

METHOD AND APPARATUS FOR CREATION, DISTRIBUTION, ASSEMBLY AND VERIFICATION OF MEDIA

CROSS-REFERENCE TO RELATED APPLICATION

This application is a divisional of co-pending U.S. patent application Ser. No. 11/156,086 filed Nov. 28, 2005, which is a continuation-in-part application of U.S. patent application Ser. No. 09/953,086 filed Sep. 11, 2001 which claims the benefit of U.S. provisional patent application Ser. No. 60/231,259 filed Sep. 8, 2000, the entire contents of all of which are hereby incorporated by reference for all purposes.

BACKGROUND OF THE INVENTION

1. Field of the Invention

The present invention relates to the field of media distribution, and in particular to a method and apparatus for creation, distribution, assembly and verification of media.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. General Background and State of the Art

In typical media distribution systems (e.g., radio, cable TV), programming is generated in the hopes of attracting an audience. Frequently, one or more demographic aspects are associated with a set of programming. For example, one program may be popular among teenagers while another program is popular among senior citizens. Other demographic factors (e.g., race, religion, sex, interests, location, etc.) may also be associated with a program. Often, programming is intended to reach a particular demographic. However, as the demographic becomes more specific, the total population of the demographic may make programming for the demographic economically infeasible in typical media distribution systems. This problem can be better understood by a review of revenue models in typical media distribution systems.

Revenue Models in Typical Media Distribution Systems

Typical media distribution systems are generally categorized by the revenue model a particular system uses. For example, AM and FM radio stations and many "free" TV channels operate on an advertising model. In the advertising model, programming contains advertisements paid for by sponsors. Advertisers often desire to target certain demographics, so they typically advertise in programming that is viewed by the desired demographic.

Sometimes, the desired demographic is small relative to the general audience. For example, one advertiser desires to advertise to individuals who have an interest in professional wrestling. Such an advertiser would waste money advertising in general programming because the advertiser is paying based on the total population viewing rather than just the desired demographic viewing. Such an advertiser can more efficiently advertise on professional wrestling programming since a higher percentage of those consuming the programming are in the desired demographic.

However, if the desired demographic is too small, there is not sufficient advertising interest to financially support programming associated with that demographic. For example, one advertiser desires to advertise to women aged 12 to 18, who speak French, are interested in a particular professional wrestler and listen to classical music. The number fitting that demographic is too small to generate sufficient advertising interest to support a program associated with that demographic specifically. Thus, such an advertiser must advertise inefficiently on one or more programs to reach the desired demographic.

Subscription Model

Another revenue model is the subscription model. In this model, consumers of programming pay to receive the programming. Again, programming is typically associated with a demographic. Thus, when the population of a demographic is too small, there is insufficient subscription revenue to support programming associated with the demographic.

Other models mix advertising and subscription. These models also encounter difficulties involved with demographics. Other programming (e.g., infomercials) are supported by sales of the product or service that is the focus of the programming. However, such programs also encounter demographics limitations. For example, there is insufficient interest to produce a Million Dollar House Shopping Network on which homes worth one million dollars or more are sold to generate revenue.

INVENTION SUMMARY

Embodiments of the present invention are directed to a method and apparatus for creation, distribution, assembly and verification of media. In one embodiment of the present invention, media is transmitted to a receiver and the receiver assembles the media into programming. In one embodiment, media is transmitted to the receiver from a plurality of sources. In one embodiment, a source of media performs a tagging operation to associate sets of tags with elements of the stream of media. In one embodiment, some tags indicate content information about the media stream. In another embodiment, some tags indicate look and feel data about the media stream. In yet another embodiment, some tags indicate other information about the media stream. In various embodiments, different combinations of look and feel, content and other tags are associated with the media stream.

In one embodiment, tagging of the media stream is performed at the receiver. In one embodiment, an untagged media stream is received by the receiver. In various embodiments, the receiver tags the untagged media stream in any of a variety of ways. In one embodiment, the media stream is tagged using artificial intelligence (e.g., computer content analysis) methods. In another embodiment, the media stream is tagged according to a default tagging scheme. In one embodiment, one untagged media stream is the only media source.

In one embodiment, a user at the receiver provides data about the user to the receiver. In one embodiment, some of the data is demographic information (e.g., age, sex, race, location, interests, etc.). In another embodiment, some of the data indicates a desired level of advertising content. In yet another embodiment, some of the data indicates a desired look and feel for the programming. In yet another embodiment, some of the data indicates desired content for the programming. In one embodiment, the receiver uses the tags and user information to assemble the media into a program.

In one embodiment, a media stream is provided via AM radio. In another embodiment, a media stream is provided via FM radio. In yet another embodiment, a media stream is provided via broadcast TV. In another embodiment a media stream is provided via digital radio. In one embodiment, a media stream is provided via cable TV. In another embodiment, a media stream is provided via Video-On-Demand techniques. In yet another embodiment, a media stream is provided via the Internet. In one embodiment, the media stream contains web page data. In still another embodiment, a media stream is provided via satellite. In one embodiment, a media stream is provided via a cell phone. In other embodiments, media streams are provided via other wireless transmissions. In still another embodiment, a media stream is produced locally. In one embodiment, a media stream is produced in a local database.

In still further embodiments of the invention, various Royalty Only Aggregate Revenues or "ROAR" models and apparatus are disclosed.

These and other objects and advantages of the invention will become apparent from the following more detailed description, when taken in conjunction with the accompanying drawings of illustrative embodiments.

BRIEF DESCRIPTION OF THE DRAWINGS

These and other features, aspects and advantages of the present invention will become better understood with regard to the following description, appended claims and accompanying drawings where:

DETAILED DESCRIPTION OF THE PREFERRED EMBODIMENTS

The invention is a method and apparatus for creation, distribution, assembly and verification of media. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Receiver Media Assembly

In one embodiment of the present invention, media is transmitted to a receiver and the receiver assembles the media into programming. In one embodiment, media is transmitted to the receiver from a plurality of sources. In a variety of embodiments, media distribution systems described in U.S. Pat. No. 6,032,156 filed Apr. 1, 1998, herein incorporated by reference, are modified to receive media streams from sources in addition to the preexisting database of media. Other embodiments of the present invention are described in U.S. provisional patent application 60/231,259 filed Sep. 8, 2000, herein incorporated by reference.

Figure 1:
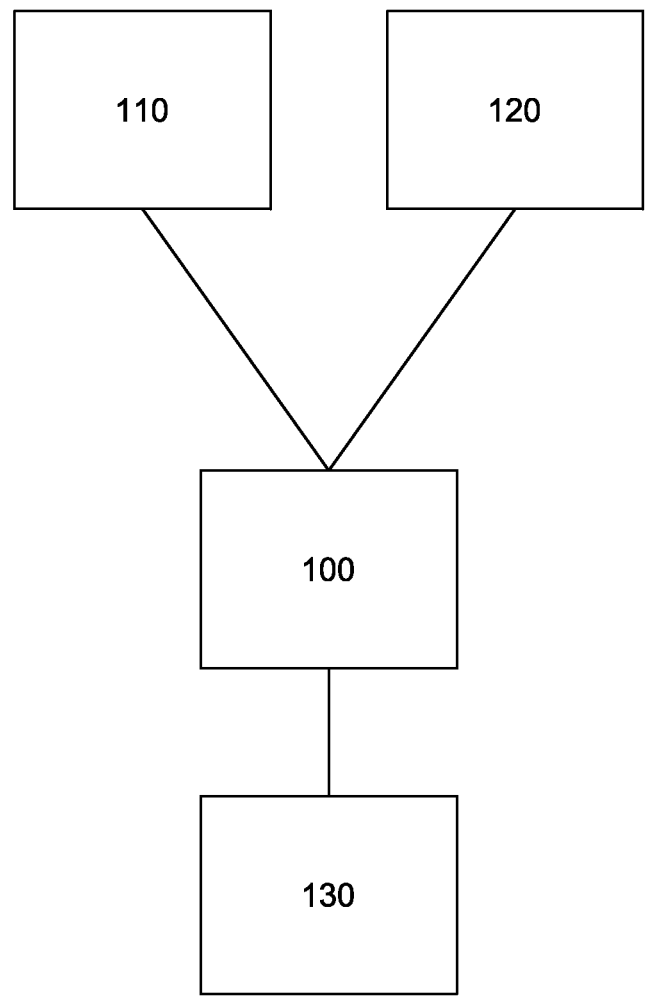
FIG. 1 is a block diagram of a data distribution system in accordance with one embodiment of the present invention.

FIG. 1 illustrates a data distribution system in accordance with one embodiment of the present invention. A receiver 100 is connected to a first media source 110 and a second media source 120. The receiver collects media from the media sources and assembles a program from the collected media. The program is displayed on a display 130 to a user.

Tags

In one embodiment, a source of media performs a tagging operation to associate sets of tags with elements of the stream of media. In one embodiment, some tags indicate content information about the media stream. In another embodiment, some tags indicate look and feel data about the media stream. In yet another embodiment, some tags indicate other information about the media stream. In various embodiments, different combinations of look and feel, content and other tags are associated with the media stream.

Figure 2:
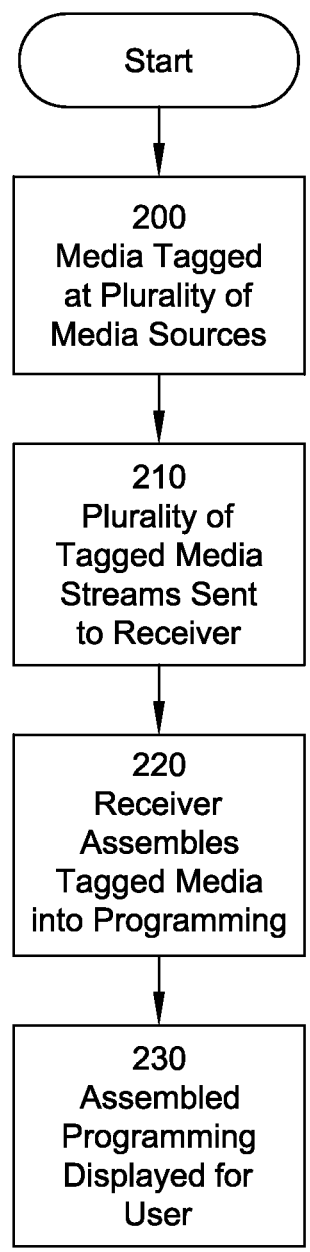
FIG. 2 is a flow diagram of the process of assembling media programming in accordance with one embodiment of the present invention.

FIG. 2 illustrates the process of assembling media programming in accordance with one embodiment of the present invention. At block 200, media is tagged at a plurality of media sources. At block 210, a plurality of tagged media streams are sent to a receiver. At block 220, the receiver assembles the tagged media into programming. At block 230, the assembled programming is displayed for the user.

In one embodiment. tagging of the media stream is performed at the receiver. In one embodiment, an untagged media stream is received by the receiver. In various embodiments, the receiver tags the untagged media stream in any of a variety of ways. In one embodiment, the media stream is tagged using artificial intelligence (e.g., computer content analysis) methods. In another embodiment, the media stream is tagged according to a default tagging scheme. In one embodiment, one untagged media stream is the only media source. The untagged media stream is tagged by the receiver and assembled into a program.

Figure 3:
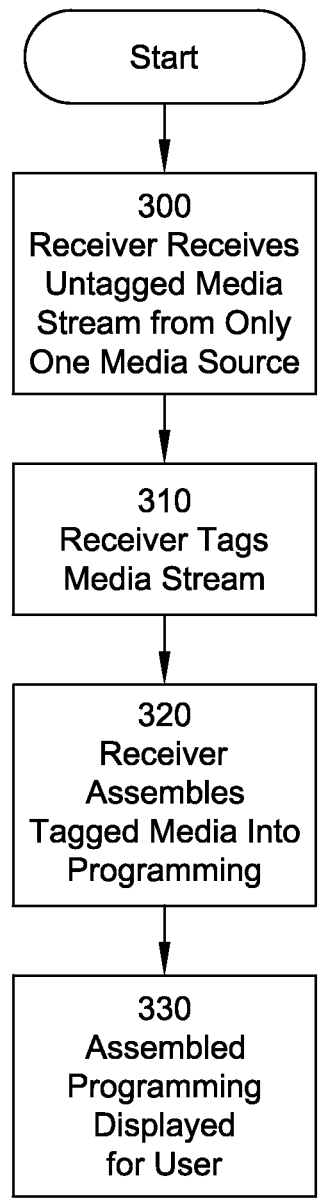
FIG. 3 is a flow diagram of the process of assembling media programming from a single untagged source in accordance with one embodiment of the present invention.

FIG. 3 illustrates the process of assembling media programming from a single untagged source in accordance with one embodiment of the present invention. At block 300, a receiver receives an untagged media stream from only one media source. At block 310, the receiver tags the media stream. At block 320, the receiver assembles the tagged media into programming. At block 330, the assembled programming is displayed for the user.

User Data in Program Assembly

In one embodiment, a user at the receiver provides data about the user to the receiver. In one embodiment, some of the data is demographic information (e.g., age, sex, race, location, interests, etc.). In another embodiment, some of the data indicates a desired level of advertising content. In yet another embodiment, some of the data indicates a desired look and feel for the programming. In yet another embodiment, some of the data indicates desired content for the programming.

Figure 4:
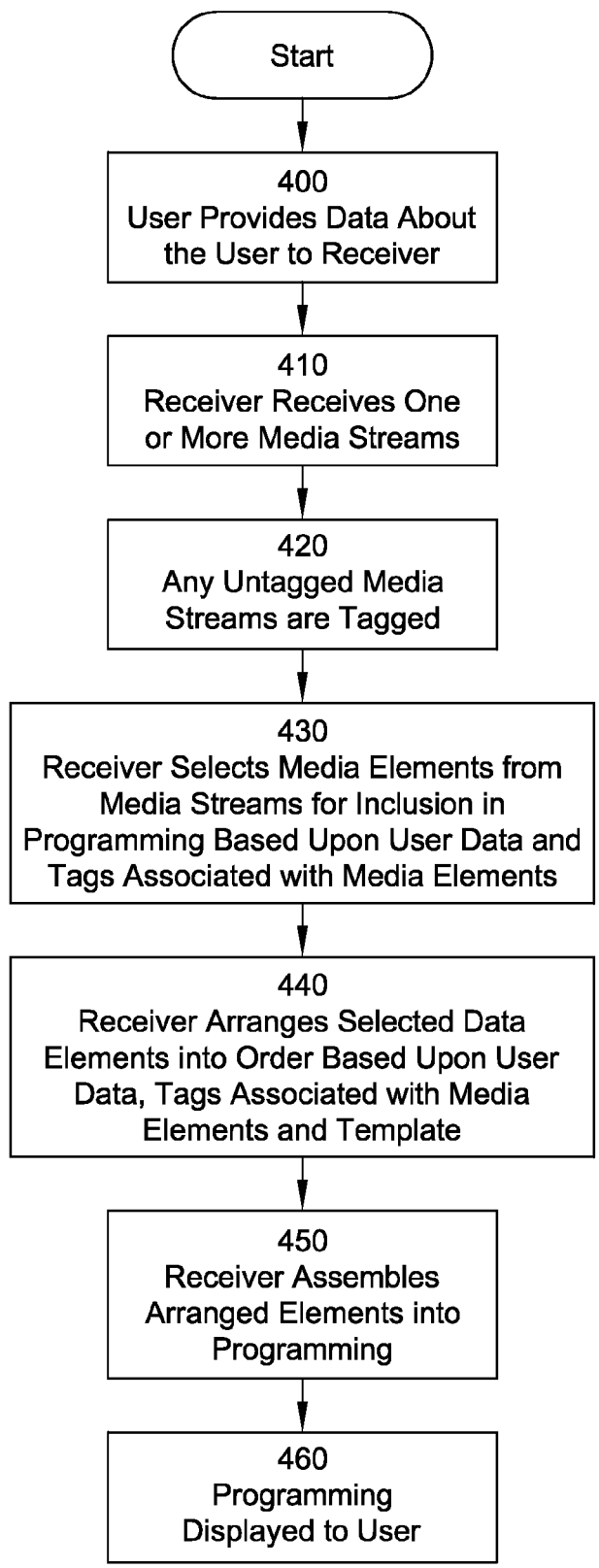
FIG. 4 is a flow diagram of the process of using user data and media tags to assemble programming for a user in accordance with one embodiment of the present invention.

In one embodiment, the receiver uses the user data and media tags to select media elements from a media stream to assemble programming for the user. In another embodiment, a template is used to assemble the media elements. FIG. 4 illustrates the process of using user data and media tags to assemble programming for a user in accordance with one embodiment of the present invention. At block 400, a user provides data about the user to the receiver. At block 410, the receiver receives one or more media streams. At block 420, any untagged media streams are tagged.

At block 430, the receiver selects media elements from the media streams for inclusion in the programming based upon the user data and the tags associated with the media elements. At block 440, the receiver arranges the selected data elements into an order based upon the user data, the tags associated with the media elements and a template. At block 450, the receiver assembles the arranged elements into programming. At block 460, the programming is displayed to the user.

Media Sources

In various embodiments, media sources are any data generating or data storing device and the media stream is delivered via any transmission method. In one embodiment, a media stream is provided via AM radio. In another embodiment, a media stream is provided via FM radio. In yet another embodiment, a media stream is provided via broadcast TV. In another embodiment a media stream is provided via digital radio. In one embodiment, a media stream is provided via cable TV. In yet another embodiment, a media stream is provided via the Internet. In one embodiment, the media stream contains web page data. In still another embodiment, a media stream is provided via satellite. In one embodiment, a media stream is provided via a cell phone. In other embodiments, media streams are provided via other wireless transmissions. In still another embodiment, a media stream is produced locally. In one embodiment, a media stream is produced in a local database.

Passive-Interactive Media Model

In one embodiment, a consumer precisely crafts the kinds of media experiences he or she desires with a minimum of clicking, pointing, and speaking. In one embodiment, the consumer is not presented with tedious lists of options unless it is decidedly important to do so. Instead, a detailed understanding of the consumer's needs and desires, combined with the programming savvy of the consumer's favorite personalities and media-types, is collected and used to deliver optimized programming style and content to a passive user of the media delivery system.

In one embodiment, media content is divorced from media structure. That is, the information contained in a well-crafted media program, whether it is simple radio patter or a complex interactive distance-learning video application, is of two identifiable types: the actual media content of the individual "atoms" of the media programming and the organization or mode of presentation of the programming. The system severs the links between the two classes of content-information, thus allowing small units of media to organize themselves under the sophisticated "templates" of instructional designers, celebrity personalities, and media producers. By establishing a standardized language and protocol, the overarching principles of effective, entertaining, and instructional programming are made universally available to disparate collections of media assets.

The Consumer-Controlled Deployment of Advertising

In one embodiment, media programming is delivered without embedded advertising. The user elects whether to receive: advertising and controls when, how, and what advertising (if any) is received. The user is credited with something of value (e.g., cash, points or other rewards) for receiving the advertising types selected.

Figure 5:
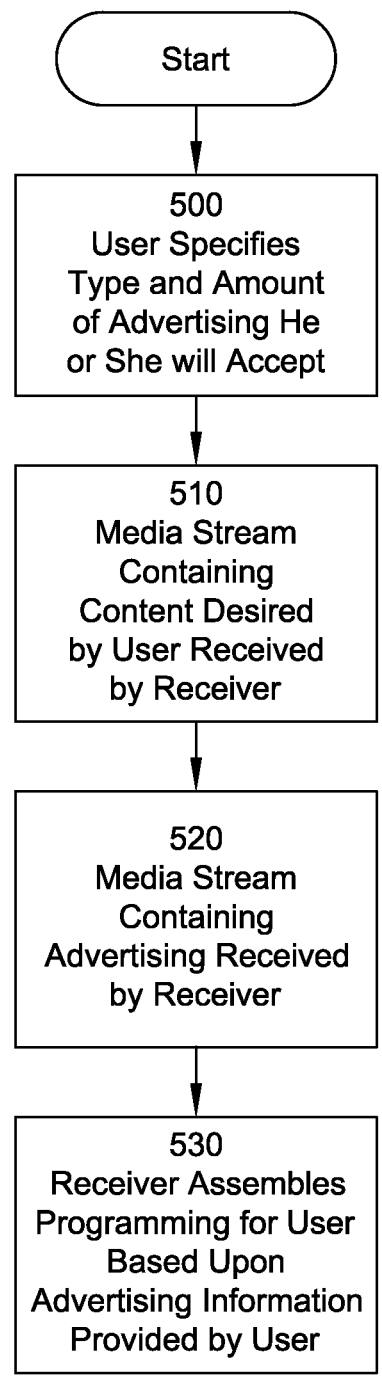
FIG. 5 is a flow diagram of the process of media delivery with separately delivered advertisements in accordance with one embodiment of the present invention.

FIG. 5 illustrates the process of media delivery with separately delivered advertisements in accordance with one embodiment of the present invention. At block 500, a user specifics the type and amount of advertising he or she will accept. At block 510, a media stream containing content desired by the user is received by the receiver. At block 520, a media stream containing advertising is received by the receiver. At block 530, the receiver assembles programming for the user based upon the advertising information provided by the user.

In one embodiment, advertising is delivered directly to the consumer, or user. This delivery is detached from the items or media traditionally utilizing, supporting, or supported by, such commercial messages. Also, media is delivered devoid of advertising and sponsorships. The consumer is in possession of a receiver capable of integrating these separate streams of media, or capable of otherwise associating delivered advertising and sponsorship messages with products, information, entertainment, or services.

In one embodiment, the consumer elects to accept or to reject certain kinds of advertising messages arriving at his or her receiver. The receiver is capable of storing and filtering the arriving media and saving only pertinent messages. An associating system (e.g., a remote database, a standardized code system or a receiver-resident database) is capable of associating the received advertising, sponsorship and similar messages with the appropriate media program-elements or with the receiver itself. This association is often performed in a manner that is sensitive to the temporal organization and repetition of those messages. In various embodiments, the receiver is capable of caching some or all of the received commercial messages and playing, or displaying, them appropriately once or several times as required. In one embodiment, the receiver is further capable of combining these messages and media elements into a seamless stream of viewable, readable or audible media.

Content Viewing Verification

In various embodiments, the receiver is capable of tracking and returning, by any of several means, the resultant exposures to advertising and promotion and the association of those messages with other media (both advertising media and program-content media). The consumption-records, or data resulting from them, are retrieved in any of several manners to cause consumption credits and/or debits to be made available to that consumer. In another embodiment, a consumer may also request re-direction of credits and/or debits to other entities.

Figure 6:
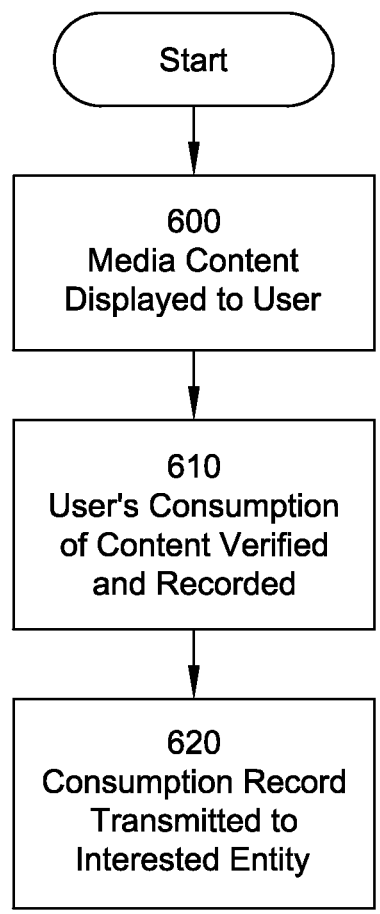
FIG. 6 is a flow diagram of the process of content viewing verification in accordance with one embodiment of the present invention.

FIG. 6 illustrates the process of content viewing verification in accordance with one embodiment of the present invention. At block 600, media content is displayed to a user. At block 610, the user's consumption of the content is verified (e.g., the user's presence and an audible volume level of an audio program are detected) and recorded. At block 620, tile consumption record is transmitted to an interested entity.

User-Verification Systems

In one embodiment, a media delivery system is used in distance learning applications to enable the rapid and inexpensive revision and customizing of programming without the need to recreate entire programs. In another embodiment, a media delivery system is used in advertising to provide the ability to know with certainty that advertising messages are not only delivered, but mindfully watched or heard. In other embodiments, media delivery systems are used in other niche applications (e.g., disseminated technical data and mission-critical corporate memos, in which it is imperative to ensure that delivered media is actually consumed).

In one embodiment, a media delivery system allows the broadest possible use of advertising media by allowing and encouraging the consumer to expose himself to advertising messages because they offer tangible benefits and rewards for their consumption. In another embodiment, the licensing profession benefits from this model because it encourages consumers to brand themselves and their audio/visual environments with licensed elements and media. In one embodiment, the media distribution system creates a flexible, dynamic framework for the use of and payment for licensed elements. Thus, licensed images and the like are deployed casually and paid for in micro-royalties, offset by advertising-message consumption.

In one embodiment, by creating an awareness of the state of the user's receiver at the time of deployment of a licensed element, the fees for such use are modified or waived. In the case of a user requesting a "special" program featuring the image, music, performances and/or other licensable items of a star, the fees for the use of a specific licensed element (e.g., the star's likeness) offsets the costs of viewing for such a "special".

Viewer/User Presence Monitoring as an Addition to Verification Systems

In various embodiments, the technology is in place to inexpensively sense the presence of a viewer, and (from a restricted family or group of individuals) the identity of a viewer at such things as a computer monitor or receiver of programming. This capability is used for tailored interaction with a specific individual without requiring user-initiated input. In one embodiment, a computer or other receiver of programming employs such devices as ultrasonic sensors (an inexpensive array of which can sense not only presence, but whether a user's head is actually facing the screen). capacitance-, magnetic- or inductance-sensors, video-cameras, Doppler-sensing of vital signs and/or RF field-shifts, to detect tile presence of a viewer in position at the screen.

Further, the sensing and reporting of viewed-channel, power-state (on/off/standby), mute-state, screen-on. volume, headset presence, mouse-motions or keystrokes and the like, are employed by various embodiments to rather reliably report user consumption of media programming. The simple response of a keystroke or mouse-click with, or without, the correlation of that action to an actual event, such as the recording of a signifier, or the response to a query or the response to an irresistible happening on screen. The foregoing techniques are used in various embodiments in the streamed programming method and systems discussed above. Data regarding viewer identity and attentiveness is captured by the receiver and furnished to a remote location for purposes such as gauging interest in programming, advertising revenue, or any other purpose.

Screen Contents Verified for Presence of Program Element

In one embodiment, the last stage in the video-display pathway to which system-access is available is the frame-buffer or its equivalent memory-location. The contents of all of or some of the frame buffer memory are compared to the known characteristics of the image for which it is desired to obtain a reliable proof-of-consumption by a remote user. This is a critical need in contemporary media, especially ad-sponsored or underwritten programming, since systems are in place and blossoming that will remove such things as advertising messages from a stream of programming.

In other embodiments, in the absence of a screen-buffer, numerous methods are employed to sample the video image, by means of such things as video-drivers voltage/time signatures that are fed-back inexpensively to the receiver or to a remote service or system. The contents of the frame-buffer of a given device, along with (if desired) verification that the frame-buffer address is the current address of the actual display contents of the screen, are compared in a given moment, to the intended or required displayed contents of the actual visible screen itself.

A pixel-by-pixel comparison is made, or, in other embodiments, use is made of less computing-time intensive comparisons, such as the use of momentary (such as one-frame) registration marks, or other codes located in an, ideally, restricted area of the frame, such as a frame edge, are captured and compared to the required media that generates viewer credits or debits. By inserting this data unobtrusively in the actual displayed contents of the screen, absolute assurance of the display of such information is achieved. This circumvents the use of such pernicious systems as "ad-removers" which can intercept a delivered or recorded stream of programming and remove the ad-insertions.

This system monitors the actual screen-buffer (or VRAM) contents, on a continuous, if momentary, basis for the presence of displayed frames or marks or codes. Such codes might actually contain such information as the content being viewed/apprehended and even appended with information as to the state of the viewing, such as volume/screen-brightness and user ID. By writing, in an inconspicuous way, such as in numbered frames, or timed intervals, or even random intervals (if the window/screen area employed is generally small enough for practical recognition of the displayed data on a continuous basis), proprietary information, and/or information sequences in the visible portion, or invisible data-stream of "sensitive" portions of a program-stream, such as an advertisement for which a broadcaster has been paid, it becomes difficult to remove such "marked" media without detection.

The detected stream is returned to the advertiser directly and/or to the placement agency, in order to verify targeted deliveries of that piece of media without any user or hacker access to the verifying screen-content data or its related codes. Markers are encoded in various ways to avoid accessing by hackers.

In one embodiment, the following steps are present. In other embodiments, some steps are removed:

At the point of origin, an image or instruction set, such as is described below, is embedded in a "clip" or media element, such as an advertisement. Alternately, some sampling of screen-areas, global or local or derived pixel values is made and the value stored for a given "clip" to be transmitted. For instance, average values of pixels on one half of the screen of a "clip" are weighted against the other half of the screen of a clip to be transmitted.

There is a standard location and/or color-vector or other such identifying mark, or rules of derivation for the location or other characteristics for an identifying, say, code. This "code" is any data or signifier or set of signifiers.

Upon receiving the above "code", an algorithm or operation is performed upon that algorithm to create a sample of certain characteristics derived from the screen-buffer. For example, the pattern indicates that the sum of all red-pixel luminosity values divided by the number of pixels was the desired variable to return to the verification system. Alternately, the values of all pixels in a line across the center of the screen, or the array of values in a restricted area of the screen-buffer, was the desired variable information to return to the verification system.

Further, only the master programming system knows the current pattern, because it is dynamically derived from the initial code, or peculiar to the clip.

Further, that for a given advertisement, the system requests a given piece of, or field of, data from the screen buffer that is not resident in the user's system. For instance, a particular x/y set of-coordinates in a given clip will return the values of the screen-buffer, perhaps in real-time or factored with, or included with, the system-date/time-clock's values. This information is coordinated with the known values of the screen and time of airing to ensure that the appropriate screen-buffer contents were present for that particular transmission.

All of the coded programming information in the user-machine resident verification program is in a fully-assembled and/or encrypted form to make it impossible to know the derived. transmitted, cached. or sampled pixel values.

As transmission occurs, or as advertising assets are played from memory, the samples are derived and either stored in encoded form, or transmitted by any means back to a source where the actual pixel-values sampled are known.

Only upon an appropriate match between the two sets of values will result in a valid credit being retained by the user/viewer.

In other embodiments, the same procedure is used for audio signals. In systems allowing "sizing" of the window in which displayed media is delivered, various strategies are employed. The memory-locations defining the window size and dominance in a stack of open windows are polled for size/priority information. Alternately, the digital snapshot of the window border, of a generated "standardized" image-border or a portion of it, or other pattern (including the code or mark described above), is continuously or momentarily monitored to derive the screen size and position in a stack, and the like, and "scale" the above-described screen information. When employed with a known and stable program, accessing the "window-size" and "priority" variables from within the screen-draw program-routines themselves, are taken.

In this way, both a one-to-one correspondence is achieved allowing verification to proceed, and the image size, priority and screen-position are determined to modify the credit/debit/reward records. A play-window below a certain size or priority or in certain partially obscured, or subordinate screen positions, for example, does not result in the generation of any credit record for the viewer.

Vehicle-Bound User Verification

In the confines of a vehicle, different conditions apply. In the driver's seat of an automobile, it is often contraindicated to request a complex action, such as the recording of a signifier string. If responses are recorded, the responses are ordinarily spoken responses to cues. In this embodiment, the state-sensing verifications outlined above are attractive. There is less likelihood of an absent listener in such a restricted environment. In one embodiment, the recording of listening-volume levels (a low threshold would be set below which no consumption of media would be credited), the program being received, the state of the receiver and/or the use of (often pre-existing) seat-pressure switches, such as are installed for seat-belt alarms to verify user-presence, are adequate for reliable feedback to programmers of apprehended programming.

In an example embodiment, seat pressure switches report the presence of multiple viewers in a vehicle and thus provide some kind of multiplier-factor to the "listening-credit" or similar viewer/listener-verification system. In various embodiments, the return path and final-use of these ad-credits is unimportant to the basic model. In various embodiments, they are cell-phoned in, collected in local memory, stored on credit-cards or chips and the like. They are, in some embodiments, retrieved in real-time to generate credits or prizes, or even specialized programming such as pay-per-view. That is, having perceived a selected amount measured in any suitable manner (e.g., 15 minutes or 30 exposures) of advertising, perhaps of a particular advertiser or blend of advertisers, a subscription program costing, for example, five dollars is offered as a free bonus, thus keeping the fees captured within the broadcaster's structure.

Such a bonus program is, in an example embodiment, a tax-planning seminar by a noted authority. What makes this feasible is the reliable return of actual listener/viewer/reader/player3 statistics to the programmer or other entity. Naturally, a privacy code could shield the viewer from the penetration of his/her identity. In one embodiment, such a code employs a privacy-level indicator. A code, for example, beginning with a numeral 1-10 is standardized to communicate to the system a universally-known level of privacy and security.

In one embodiment, the apprehended programming stream is, in fact, often unique for each subscriber. First the optimized signal arrives and secondary and tertiary components are cached. The profiling functions outlined below cause any of these to occur in a given time:

Alternative broadcast material is substituted for the already optimized stream from a background stream or cache.

Alternative material is selected from dedicated channels) for this purpose. This is, in various embodiments, material specifically broadcast because of active profiling.

Alternative media assets are inserted from existing, or third-party, stored assets, such as clips on DVD.

Short transitional elements and soundbites are played from ROM or other semi-permanent storehouse.

In some embodiments, the final stream of programming has only general resemblance to a given single stream of pre-optimized programming. The concatenation and streaming of these assets is done by a system like the one described in detail above, but resident in a remote location, like a traveling auto.

Whether the filtration of contents is not performed, performed largely in full, or partially performed the output, in some embodiments, is not a unitary stream for a singular viewer but an (optimized) family of streams for a "good-fit" set of viewers (or single viewer).

In one embodiment, this method functions as follows:

A multiplexed, compressed and encoded, or otherwise multiplied stream of programming, or parallel streams of programming, is provided to potential users. These streams are optimized for a particular potential demographic or other user/viewer/listener set. The stream or family of streams are given an identifying tag, or other real or derived marking, to indicate any element described above. In this example, the tags define content. A fixed tag, carrier-frequency, address, or other identifier might substitute for the tag, or be a part of the tagging system.

In another embodiment, a content-provider, broadcaster, or distributor of media optionally optimizes the content (including advertising and regional/local insertions) of the universe of all programming, or the contents of the individual streams themselves "transmitted" or otherwise made available to users based upon any algorithmic weighting (or none) of:

a/the universe of all users of the system based upon any of the profiling principles outlined herein weighted with general program guidelines. Profiles are obtained from third parties, may include first-person provided profiles, and further allows first-person profiling (with or w/o added third-party profiling or local/regional or other profile-modifying data) to be further modified by long term, permanent, or shifting media-programming choices made by, for example, the distributor of the programming. Thus "station-identity" (for example, the "look-and-feel" of a stream of programming) can be actively accommodated as can concepts like "drive-time" programming segments that temporarily modify the standard format.

b/the current known users of the system the programmer tags described above is, in one embodiment, dynamically-shifted in real-time according to the profiles and/or other received or modeled data from, or regarding, the current real or projected universe of users. That is, the general or specific master-contents of the programming streams themselves are, in various embodiments, controlled and dynamically-shifted according to feedback, indicating the real or estimated profiles of current users/viewers/listeners to/of the system. For two-way systems, the long term profiling and real-time profiling can be easily caused to modify the master contents of the streams. For one-way systems, any number of hybrid statistical models are, in various embodiments, employed to determine the current viewers. This includes, in some embodiments, a real-time, or near-real-time category embodying such factors as:

current geographical position or objective activity such as eating or beach-combing states (subjective and/or objective) such as driving, flying, hotel-dwelling, watching TV, listening to radio, eating, hungry, tired, in distress, in pain, sad or happy, current mood, and "mood-for" states ("mood-for" means a temporary state within, or outside of, a user's normal profile. An example would be a classical music lover who is in the mood-for country music, or a user who has preferences for both classical and country music, depending on mood) and the like.

c/immediate or distributed feedback to the system

Each user or group of users can provide feedback to the system by such means as Internet connections, cell-phones, and phone lines. The system may obtain feedback from a portion of current users and project overall user feedback by statistical modeling of a small known segment of audience, or a large posited audience behavior. This feedback is employed to optimize the contents of the custom-programming streams and/or their subordinate component media elements or clips.

Viewer Verification as a Business Model

In various embodiments, where a person or organization desires to deliver media to a consumer/user, and the organization or related third-party, such as ad-agency, wishes to verify, at minimum, the mindful consumption of that media. The organization embeds signifiers in media and causes to be recorded by any several means, and/or returned to that organization or third party, these signifiers or their derivatives. The organization responds with instructions to review material, or causes material to be redelivered, or modifies the cost of, or provision of, goods and services to the consumer, or provides other incentives (either positive-creating or negative-avoiding) in response to the signifier-string, or its resultant equivalent, or actions based upon it.

The benefits delivered are, in one embodiment, to lower or raise a health-insurance premium based upon the (remote and private) viewing of a program. The cost-per-exposure rates of advertising are modified by advertising agencies, or advertisers or programmer/broadcasters/narrowcasters in response to such verification data. Groups of programs in a series, or groups of advertisements and the like, are monitored for assured exposure/consumption.

Advertisement Deployment

In one embodiment, the advertising elements have the ability to deploy themselves independently of any normal stream of programming. These independent advertisements have the ability to detect and/or attach themselves to appropriate areas of a receiver's visible or audible environments. In another embodiment, the independent advertisements also have the ability to locate themselves in a stream of media presented by the consumer's receiver. In one embodiment, by doing so, the independent advertisements are also be given the ability to displace, or "eat", traditional advertisements by simply positioning themselves to assume the "positionings" of these advertisements.

In one embodiment, the consumer controlled advertising system allows levels of advertising consumption and sponsorship to be defined by the consumer. In one embodiment, the levels are globally defined within a receiver or by a consumer. In another embodiment, the levels are defined dynamically (e.g., by times of day, types of programming and/or types of advertising, and the acceptable levels of promotion and commercial message delivery for each of these particular "zones").

In one embodiment, the levels are defined as follows:

LEVEL P-1—will accept no advertising/promotion/licensed media

LEVEL P-2—will passively accept specifically-defined ad messages

LEVEL P-3—will passively accept general areas of advertising messages

LEVEL P-4—will passively accept all media

LEVEL A-1—will actively return signifiers for specific types of media

LEVEL A-2—will actively return specifically-defined ad messages

LEVEL A-3—will actively return general areas of advertising messages

LEVEL A-4—will actively return all media

LEVEL V-1—will participate no viral or forwarding of ad media

LEVEL V-2—will participate in viral forwarding of specific messages

LEVEL V-3—will virally forward general areas of advertising messages

LEVEL V-4—will virally forward all requested media

In this embodiment, the levels naturally break into degrees of advertising acceptance and participation. Other embodiments have different levels. In one embodiment, each consumer is given the opportunity to thus define his/her levels of acceptance. In one embodiment, the levels are set globally (i.e., for all media over all times). In another embodiment, the levels are defined for specific times and types of media. In one embodiment, the detailed profiles are collected over time as a user locates areas of benefit or annoyance as media is consumed in the system. For the purpose of detailing a profile, a GUI is made accessible to the consumer. In another embodiment, the profile is built up naturally, in a piecemeal fashion, through use and modification.

In one embodiment, a user begins with an unlimited barrage of advertising. In another embodiment, an acceptable initial level is been set. The use then simply responds "no" to permanently reject advertising of a particular type at certain temporal or contextual programming points. This rejection then forms a P-profile. Conversely, simply responding actively to a signifier string, or forwarding advertising messages, would generate appropriate A and V codes.

In one embodiment, levels of remuneration are defined as follows:

LEVEL R1—unverified delivery of advertising messages

LEVEL R2—message delivery verified by system buffers

LEVEL R3—message delivery verified by user presence sensing

LEVEL R4—mindful consumption of media, signifiers triggered

LEVEL R5—signifiers consumed and returned to advertiser

LEVEL R6—signifiers requiring brand—building routines returned

LEVEL R7—level IV+ achieved, viral elements forwarded by consumer

In other embodiments, other compensation levels are used. Once defined, advertising messages arrive that are tailored to the profiles created by the consumer, the advertiser, and the delivery system itself. Each exposure to a commercial message generates credits in the consumer's account. In various embodiments, the credits are consumed in a number of ways. In one embodiment, V and A level interactions result in significant per-exposure credits to the user, because such targeted, guaranteed and involving exposures are of significant worth to advertisers.

Business Model and Technology for Self-Inserting Advertisements and Messages

In one embodiment, a user agrees to permit, in exchange for something understood by the user to be a benefit, the insertion of content into any type of information viewed by the user. In one embodiment, such content is advertising. In other embodiments, other content that a sponsor fells requires an additional incentive for attending to, such as public service announcements, are also within such content. In various embodiments, such content appears anywhere that it can be perceived by the user. For example, the content might appear in applications used by a computer user, on cell phone screens, in audio in a computer, or elsewhere. These ads are made self-deploying within the user's receiver/computer.

The content of the ads is caused to be updated without any action taken by the consumer and, importantly, without any affiliation, or contact with, any provider, broadcaster, or website or the like. These independent advertisements stick themselves to browsers, to applications such as word-processors, to screen-savers and power-up sequences, to documents, task-bars, cursors, and/or into a stream of time-based programming. Within the system of streaming programming described above, these independent advertisements might self-insert into any programming or receiver elements such as those named above.

In one embodiment, manufacturers become involved in this independent-ad process in order to underwrite the costs of, for example, software or upgrades and additions to it. In other embodiments, use is made of the reverse flow of money by the use of licensed logos and likeness attached as independent advertisements to any element of the consumer's. It is unique to offer end-users direct access to licensed elements, such as the likeness of a lifestyle element like a favorite pop-star of surfboard-maker. It is further unique that those sponsorships costing a consumer money or credits is directly offset by ad-viewing and consumption credits. In some embodiments, the entire transaction is conducted in the user's system by use of secure record-keeping strategies, and/or in conjunction with, or solely by, the ad-server or main programming server or its equivalent.

Receivers Having No Direct Return Path to the Media Source

In one embodiment, a digital provider, or "broadcaster", of a stream of information, desires to customize his offerings beyond the multiple-choice model. The term "stream" must be understood as referring to any information delivered to the user. The term "stream" is not limited to "streaming video" delivered over the Internet, for example. Instead of simply allowing a subscriber to jump between preprogrammed channels (these channels may be all the property of the "broadcaster"), the broadcaster is desirous of customizing the listening experience for the user still further. In various embodiments, customization occurs in one or more of the following stages:

Subscribers to the system profile themselves both upon signing-up and, perhaps, in near-real time through the use a suitably-equipped cell-phone or other means. Profiling is providing any information about the subscriber, generally in response to questions furnished by the broadcaster. By means of this data, the real-time signal-content is modified to a best-fit of the subscriber's desires as a group. This is called the "signature" of the service. This information structures the content of the, for example, ten to one hundred independent "channels" of programming offered to subscribers.

For example, from several to most of the channels are employed in the normal way (if that is the plan of the broadcaster) but one to a few of the channels are reserved for background loading of variable programming data and media. This means that the receiver, which is a device for receiving signals in any format, is made able to receive background "channels" and to cache all, or selected parts (which parts are arrived at by means of matching content-tags and other appropriate descriptors to the decision-matrix of the receiver with its resident user-profile derived and broadcaster-instructed program-characteristics).

A receiver is any device for receiving signals, such as a television set, radio, cell phone, computer connected to a network through physical cabling or otherwise. The receiver includes memory devices, such as DRAM, and suitable software. At this point, the receiver is receiving, or has received and cached (probably with only slight delay), the main programming stream. It has also cached "secondary", "tertiary" and so on, programming elements, clips, or programming segments. These are all referred to as background programming. These background programming elements come from wireless Internet-delivered sources, from cell-phone delivered segments, from ROM or from similar long term resident clips.

The background clips are furnished in programming provided on physical media furnished to the subscriber, such as flash-cards and credit-cards. The background programming arrives on one or more auxiliary streams dedicated to this purpose or on sub-encoded portions of main-programming streams. The background programming to be inserted are, in some embodiments, saved elements from primary programming previously received by the receiver and stored for later reuse. Storing instructions are provided (e.g., in tags identifying the elements) in some embodiments. Users have, in less than fully-interactive embodiments, the voluntary decision or subscription/profiling choice to "tune" to a fundamental primary programming signal.

Channels are defined as any way of separating a particular stream of information. These channels need not be defined by frequency bands. For example, a satellite transmits a signal in a band of 1× to 10× Megahertz, or encodes a signal so that it can be de-multiplexed by any suitable hardware or software to achieve these unique streams of programming. These streams are identified anywhere in the system by hardware, firmware or programmable software in the transmitter, receiver or both dependent upon the embodiment, to contain media-programming optimized for each of those streams. In one embodiment, one stream user prefers sports-heavy programming, while another prefers popular-music-heavy programming. Regardless of the use, or lack of use, of this pre-selection process, each stream is further capable of containing (e.g., with the use of data compression) further unique streams of programming. Thus, the sports-heavy user is able to further refine his or her preferences (using profiling techniques) to, for example, American team-sports-heavy programming or international extreme-sports-heavy programming.

Now by use of the tags or other identifiers anticipated the user is able to optimize the viewing/listening/reading experience further than the broadly-segmented master program stream. Data compression of the individual channels, or, in other embodiments, other packeting, encoding, sub-carrier data-streams, or multiplexing techniques offers additional programming choices embedded within the stream of information provided for any individual channel. Anywhere in excess of a 1:1 correspondence between the "perceived" signal and the delivered signal may exist in various embodiments. In one embodiment with a simple 2:1 ratio of delivered programming there always is a cached series of clips to which a user can be re-directed. In another embodiment, a ratio of 1:1.5 provides the same benefits since caching is required to make elegant programming shifts between clips and streams.

In various embodiments, extra bandwidth, in the form of unused channels, multiplexed space or reserved space (e.g., the vertical blanking interval in video), is set aside for still more targeted insertions, such as advertising and sponsorship insertions and voiceovers. In various embodiments, two exceptions to the caching requirement exist. One exception is if cross-fades, interruptive inserts (such as music cues and sound-effects), beat-sensitive cuts and loops, or other aesthetically-acceptable devices are used to shift between streams of programming. The other exception is that in systems with a higher ratio of multiple programming available, shifts could be accomplished with a minimum of latency due to "waits" for the end of given song, news-story, clip or program. Stored or derived loops, ID's, inserts, sound-effects, and so forth are inserted to mask these wait-times without caching.

In various embodiments, certain elements of each main program stream are marked for use within alternate streams. By way of example, a human-interest news item is appropriate "color" to insert into all or many of the discrete programming streams. This information is used in real time or, if it were caused to be detected that the element has gone without being perceived by the subscriber, it would be routed into a cache, where it could be called-up and inserted into another stream of programming. While that clip or element is playing (i.e., being made perceptible to the user), the primary programming of the channel that is being listened to is directed into a cache in one embodiment. In various embodiments, pre-stored, purchased or other assets, such as those that might be caused to reside on a GPS-referenced collection of, say, maps, are made available to the system. In other embodiments, locally inserted assets, such as regional advertising insertions, are likewise made available to the receiver by local broadcast, such as sideband transmission of digitized inserts by conventional analog broadcasters or cell-phone cell-transmitters.

In one embodiment, the receiver also possess an analog or digital receiver of any existing band upon which local data is transmitted. This component is set to sweep to lock onto signals bearing the appropriate transmission signature. In one embodiment, a cell phone receiver gets completely personalized inserts (even voice-mail and e-mail). The cell phone, whether a part of the user's traditional cell-service or not, is the delivery medium for local insertions and personalized messages from a separate reception circuit into a cache. Upon completion of background downloading, for example, these assets are inserted into the program stream at points triggered by any of several triggers, such as a "play-local-insert-here" command embedded in the primary data-stream furnished by a broadcaster.

In other embodiments, the same model is applied to a satellite or ground-based video transmission, where background data is sent in the Vertical Blanking Interval, in modulated encoding, in side-bands or on extra/reserved channels.

Internet-Based Distributed Model

Various embodiments make use of the World Wide Web, or other systems and standards that serve to make a wide variety of elements available from servers to multiple client locations across a network, such as the Internet. The browser, or other component that enables the client to access the network, or a component functioning with the browser acts as the assembly component of the system. The term "browser" includes traditional browsers, such as are provided on personal computers that access the World Wide Web, and software and/or hardware for display of information for use on cell phones or other appliances.

In various embodiments, programming is streamed from a primary source, or sources. In some embodiments, that streamed programming is customized completely, generally or in varying temporal segments, to the desires or requirements of a user/viewer/listener/gamer (as is described in the non-distributed model of the system). In various embodiments, additional programming elements are inserted within or against that primary stream. A browser is programmed (by a programming guideline or command from the primary programming source and/or from resident user-profiles) to gather programming from a variety of sources on the Internet or other network.

In one embodiment, push-servers, traditional media-streaming servers or traditional asset-caching servers are contacted to retrieve media to be assembled in real-time or near-real-time or to be cached indefinitely. In various embodiments, e-mail of media-rich assets is employed, and the assembly/editing program or hardware is programmed to route certain e-mails from certain addresses or with certain identifying codes, cues or characteristics into a cache and thence into the programming stream. Unlike a system which serves simply as an aggregator-provider of information assembled from disparate sources, the system features the presence (at the point of aggregation server and/or at the user's location) of assembly tools to prioritize, discard, cache, and temporally-order those disparate streams into a satisfying temporally-based program.

In various embodiments, programming elements arrive at the aggregating database/server. The elements are made, under license, to conform to the tagging standards of the system. In one embodiment, the elements are prepared for streaming at the server-location or feeder-sites by the application of some, or all, of the proprietary tags. The tags allow any blend of data-mining by the user for assembly on-site or for transmission to the user's site for assembly. In one embodiment, non-conforming or conforming assets are also grabbed from various sites and e-mails. Advertising comes from a blend of supplier advertising packaged with the media, or from any blend of third-party sites or mail providers.

In one embodiment, after profiling himself or herself, a viewer/user downloads a browser plug-in enabling video capabilities in accordance with the system. A primary server assembles a core program according to the user's profile. Delivered programming bears markers indicating points appropriate for insertion of additional programming material. The parameters of such inserted content is transmitted in a header arriving with the onset of programming and/or the parameters are a part of the insertion-point marker tag or descriptor. The main program is cached for an adequate time-period to allow the local computer to retrieve second- and third-tier assets and to perform appropriate transitions, superimpositions, or simple hard-cuts between the various sources. Second-tier programming is requested from various third-party servers, which may or may not conform to the tagging standards of the system.

In one embodiment, the provider of second-tier programming is a third-party provider of advertising, or several distributed providers of advertising. Such a third-party provider causes advertising and sponsorships to conform to the tagging and other requirements of the system. Third-tier programming is in the form of personal media insertions delivered by e-mail. Specialized media programs such as entertainment-news highlights are delivered at any time prior to their use. Such media-mails have identifying titles or other factors allowing them to be actively sought by the assembly-system of the user-machine, decompressed or preconditioned if needed, and inserted at appropriate points in the programming.

In another embodiment, the broadcaster may or may not charge the subscriber. For at least some of the elements in the primary program, the broadcaster will purchase the right to incorporate the elements and broadcast those elements. Some content, such as advertising, will be furnished by payment from a sponsoring advertiser to a broadcaster.

New Model for Distributed Delivery

In an example embodiment, a digital radio provider installs a background music system in a hotel or restaurant. Some or all of the broadcast channels are, in various embodiments, reserved for the optimization of such a system to the needs of that group buyer. As subscribers to that service entered the restaurant or paid for services or goods, or as patrons of the restaurant signed-up to the service, the establishment might receive a credit or outright payment for those users.

In another embodiment, a visitor checks into a hotel. Finding a customizable video and/or audio service there, he is offered free access to the programming, and perhaps a higher degree of access to the programming in exchange for a, say, one-year subscription to the service. In the case of digital radio, the bonus to the buyer in this case is the availability of the programming while traveling if he also purchases a receiver, premiums for which can be awarded in the form of, say, a discount on the hotel bill. The hotel benefits by offering improved services to the traveler, and by long-term increased customer loyalty. Loyalty can also be improved by integrating an advertising or sponsorship type of plan into the programming that the member subsequently receives.

In various embodiments with an active return-path to the broadcaster/narrowcaster, user programming preferences and delivered content including sponsorships, sponsored programming and advertising are caused to reduce the cost of goods or services rendered by the broadcaster and/or its affiliated businesses. In various embodiments with a passive return path, the viewer-verification system and signifiers are used to provide these same incentives.

The following example embodiment is described as an intermittent return path system. A response-grid or similar device is provided to a user of the system (e.g., in the form of keypad, touchpad, or other response-registration device). These responses are returned to the system by any suitable form of communication, such as cell phone data-transmission. Upon completion of the recording of a signifier sequence, without further effort by the user, the signifier sequence is returned to a system for verification. For example, in the cell-phone example, the phone number is auto-dialed and the sequence included in the message, or in a computer model, an e-mail containing the signifier series is returned to the provider or other party. The (levels of) correct responses provide incentive to the user, or corrective information or other feedback to the user. In one embodiment, the signifier-string returned indicates mindful consumption of a stream of promotion or advertising. One use for this is to underwrite the subscription costs of the broadcast service itself.

Third Party Groups as Customers

In various embodiments, a refinement of the "third-party" concept is that, even systems without feedback from the user, such as one-way radio broadcasting systems, achieve some level of optimization by signing-up, third parties. These are, in various embodiments, business establishments, such as retailers, hotels, restaurants and the like, institutions such as schools, medical facilities and museums, or other third parties. These "group" responses provide significant feedback to the broadcaster to further optimize the character of the stream of programming or the selection of a stream of programming. Specific users of such a system receive a premium from such third parties in exchange for the presentation of proof-of subscription or other such information to the third party, and/or premiums are, in various embodiments, returned to the third party by the programming provider for the servicing of registered users.

In one embodiment, a digital radio recipient traveling in an automobile has his listening patterns "logged" onto a storage medium (e.g., a credit card). This logging is, in various embodiments, the actual time and/or duration of listening, the volume settings of the listening, the channel and sub-channels listened to, or even the specific advertising/promotional exposures apprehended. Volume settings are, in various embodiments, specifically recorded during message-critical periods and a variety of methods are employed. For instance a volume setting below some threshold causes the message-critical section (say an advertisement or promotional message) to register as unplayed/unheard. The listening pattern is used to generate credits on the purchase of items, or on a credit card associated physically or abstractly with the transaction. The use of a credit card, or like object with on-board memory, issued to store these credits.

Credit Card Store and Credit/Viewing Records

One embodiment uses a traditional credit card and card-reader. Once the reader had captured the primary (standard) durable account data, a second swipe of the card with a similarly positioned, volatile and writable mag-stripe on the opposite half of the card, or on the other side of the card, allows the entry of information about credit into the account. A dating, or other ID system in the credit-recording process allows the stripe to be deactivated, once read, without the need to modify the reader to enable erasure of the credit/usage record on the stripe. In store coordination with such systems as bar code readers provides immediate credits, incentives, freebies, and modifications to the stored credits (such as multiples of the stored credit for purchasing a product such as a co-promoted product to the advertised one). Many modifications are possible in other embodiments such as optical data, erasable and writable stripes or regions that are obvious to a person experienced in the art.

Bar Codes Retrieve Credits

For user-printing of credits on an unmodified printer, existing bar code scanners are, in various embodiments, employed to up-load user records such as those described above. For this use, the user might print his credits on a standard piece of paper and take/send this to a merchant for "spending". One variant is the provision, by downloading, purchase, or free delivery of printable media modifying the user's printed output. For example, a printable insert is included in a magazine bearing bar codes needed to activate or otherwise modify or interact with the user's credits. The user removes the magazine, or other printed (or electronic) medium's advertisement. The page is then placed in the user's printer for overprinting with additional information. The resultant unique composite (e.g., bar codes) yield such results as the multiplication of credits.

In one embodiment, a user must visit a website and perform some task (e.g., joining a service) in order to be delivered the primary bar code, or data. Alternately, the user must log into the service-provider's, advertiser's or related website to obtain significant data. This data need not be printed, but stored in the user's machine in an application provided by the service-provider or advertiser or third party. The application resides wholly or partly in the user's machine, or entirely or partly in the provider's or third party's server. The user's credits are now also uploaded into that (possibly remote) application. These credits are also verified for accuracy with the provider(s).

The application then creates a custom bar code from the two, or more, data-elements. This bar code and its associated graphics are printed on paper at the user's site for delivery to a store for credit or other consideration. The use of multiple pieces of bar code-generating data render falsification impossible in some embodiments, especially through the use of "secret" identifiers mixed with the user's data to generate bar codes of specific unknown content. The user's ID is, in one embodiment, embedded in the codes, thus, through any of several methods, requiring the verification of identity through the use of such traditional means as Driver's Licenses at the time of purchase.

Cell Phone Return Path

In another embodiment, the user's cell phone is used to provide a return path of the memorized viewing/listening data as well as, if desired, preference data and user-state data such as provided above. The phone is, in various embodiments, preset to autodial the log-in number, or to otherwise locate, for example, an Internet connection, of the provider or its representative and to automatically execute the above-described transaction. Also note that the schemes described above do not take into account the signifier-based system of verification. All prior implementations of that system of verification are also used in various embodiments, with or w/o the refinements listed here.

In the home, monitoring the state and position of the user is difficult, and so simply monitoring the state of the receiver (looking at channels watched, mute-button status, volume and so on) while tightening the feedback to the advertiser, don't provide the same guarantees that the signifier system does. In airline seats and automobiles, though, the control is significantly tighter without the use of a signifier string making these passive verification proposals more attractive.

In conjunction with a GPS system, the location of a subscriber is made known to the system. In wide-bandwidth delivery systems, or in systems otherwise capable of delivering highly-customized programming, this information (along with other information such as is, in one embodiment, provided by a small input screen indicating, for instance, a desire for restaurant information) the correct informational, promotional or advertising messages can be inserted into the delivered program stream. But in the case of a traditional model, say one-way broadcast of no, or limited, user-customization-ability, the appropriate commercial or informational insertions are, in various embodiments, made from a local cache. The "positionings" of these local insertions are made by use of a triggering element in the programming stream which call them up and insert them over some default programming of the same length.

This system is, in various embodiments, used without the broadcast component by, for instance, embedding targeted advertisements, informational segments, or promotional elements such as sponsorships, onto a memory element of, say, a car. Specifically, the memory-element provided with a GPS system, such as a DVD/ROM, could contain (pre-sold) advertising that is called up upon the presence of appropriate conditions such as those described above. Any stored or returned record of the apprehensions (with or with out the control factors outlined above such as a signifier string use) is, in various embodiments, used to underwrite the cost of the GPS system, its disc, or any third-party item, energy, or information.

In various embodiments, the disc or other memory element, whether or not a GPS system is employed (which is mentioned because it is suited to the task of regional insertions) is used to deliver independently, or within such a programming stream, customized messages. The receiver in (e.g., a moving vehicle) is equipped with a cache in which to store customized insertions such as these. If the insertions are not a part (completely or partially) of some other sub-system such as a CD or DVD or memory-card, then any of several methods supply the cached material, or even real-time insertions.

For example, a single channel or a group of channels of a multi-channel system are, in various embodiments, dedicated to the purpose of specialized ad-insertions and sponsorships and the like. Alternatively, a portion of a digital or analog signal is set aside for such a purpose (multiplexed for instance). The entry of variables such as geographical position then selects for the insertion of the new "clip" and, in other embodiments, also periodically erases irrelevant or outmoded cached material. A user-profile resident in such a remote system causes the retention or discard of selected portions of such a secondary signal.

The "variable" delivered or stored/cached media assets carry a designation called, for example, channel/user appropriateness. This tag or designation would allow significant economy in the transmission of multiple programs by defining which channels or user-states allow the media-assets transmitted on a given channel or cached to be routed to more than one designated "channels" or delivered streams of programming.

Website Advertising Business Model

An example embodiment interacts with a website such as the one described below that houses a universe of deliverable assets defined as:

worldwide, national, regional, local and site-specific conventional spot advertisement;

sponsorships of programming or individuals or other products or services or concepts;

bugs of all categories;

banners of all categories;

pinned and mapped image-insertions4;

audio and visual insertions and other forms of stream insertions and superimpositions like keyed-visual and mixed-audio;

agents and proxies and animated/emulated characters;

cybernetic and physical (personal or business) screen and object sponsorships;

downloadable and fabricatable and printable/viewable elements and objects.

Each of these categories and sub-categories is stored with identifying tags, or other suitable identifiers as well as content tags, and, optionally, transition and other tags. The site delivers, upon request from a sponsored browser or autonomously to a (sponsored) browser promotional objects/elements/assets/clips such as those described above.

In a stream of programming, spaces for each type of ad-object are defined in advance without actually filling the defined slot with ad-content. Upon requesting any sponsored, or underwritten by external parties, programming or assets the appropriate ad-objects are called up and real-time or background pre-loaded and cached or viewed as needed. The system inserts them under the same templated and tagged guidelines as normal programming.

A browser or a back-up web-address-resident service is made capable of performing the insertions, whether fades/dissolves/keys or pinning. In various embodiments, varying levels of capability exist in each given browser and user's system. These capabilities are defined in the point-of-consumption system and made known to the asset-supplying systems. In this way computationally-intensive tasks are selectively off-loaded to Internet-based, or networked, remote systems for assembly.

In various embodiments, the final play of assets is assembled from any combination of user-machine-resident caching, remote (and even distributed) caching and real-time or near-real-time calls to locations where assets are stored awaiting delivery. In various embodiments, much of the assembly is performed in tiny several-millisecond-long clips comprised of inter-clip assembly sub-clips and/or partial image-zones/spectral zones of superimposed or other image and audio superimposed information. This implies the creation of zone-tracking and re-assembly to speed up the insertion of unique imagery/sound over an existing image and/or sound stream.

The ad-zone server, in some embodiments in a separate server from the one(s) actually delivering the core media assets, supplies much of this assembly capability remotely and simply sends completed truncated and modified portions of assets, like "fuzzy-ends" assembled into transitioned pairs for butt-splice assembly in the user's machine. The body of assets (meaning all portions not modified by assembly procedures—levels of user-machine capabilities being (dynamically) defined as to current capability) are sent to the user's (or linked) machine for full caching, short-term delay caching or real-time streaming, while the fuzzy ends, superimposed areas, and any other portion of an asset in need of assembly or modification before viewing/listening is sent to a sub-system or any number of subsystems for assembly before viewing.

In various embodiments, these assembled portions are then also sent to the user's machine in real-time or for caching. All of the predicted and actual execution and delivery times for this process can be dynamically defined and communicated over the network/Internet to minimize latency.

During the latency period, however, or as requested by the ad-management or program-management software, user-machine resident advertising is called up for viewing/listening/printing/forwarding or other operation. This resident advertising is placed in the user's machine in accordance with sponsorship program deals or any other ad-driven or public-service announcement or other (usually cost-underwriting) form of advertising and programming. It is also desirable to have station-ID's, bumpers and the like resident in the user's machine to deploy profitably during these latency periods. Another implied feature here is, in one embodiment, that in the event of a failure to retrieve or assemble assets in a timely manner, the user's system be programmed to default to a deployment of these resident media assets in order to make an income or impression opportunity of these annoying glitches.

Outsourced services (e.g., "Driveway"-style on-line storage providers) are, in various embodiments, employed in the delivery process. They generate a new category of sub-sponsorship which is, in various embodiments, recognized with (dynamic) bugs and the like during play of the (primarily-sponsored) programming. A new category of "program-enhancing or de-glitching or accelerating services" is thus created by this model.

An assembly engine, or viewing kernel or driver resident in the user's machine is, in various embodiments, validated or capable of unique decoding or otherwise inserting itself reliably in the viewing/listening path of the user's machine. That is, along with the volume-sensing, screen-on status, machine-on status, viewer-presence sensing (including viewer-presence sensing by ultrasound/capacitance/seat-pressure-sensing) and signifier-streams, that the system senses "presence of unfiltered-viewing". This status is presented to the asset-providers by the presence of the suitably-configured video drivers or other key elements. This includes a comparison of the data leaving the assembled program-stream with the data arriving at the point of the screen-drivers and audio-pre-amps (or other suitably late-cycle points). Any incongruence causes the interruption of programming and/or the loss of advertising/sponsorship/information-provider "credits".

In another embodiment, a further form of advertising, or other promotional device, is the special case of sponsored printable elements. An example is material provided with a media storage device, such as the sleeve and/or insert of a DVD or CD or other media storage element. These are, in various embodiments, sponsored and downloaded for printing free of charge, thus making, if appropriate advertising, for example, were purchased or printed, the purchase of a song or film or collection free or reduced in cost, or accompanied by some other benefit to the purchaser.

Standardized (which is, in various embodiments, high-quality coated-stock and pre-scored) blanks are made widely available to consumers for this purpose. Recordable media such as Flash-cards and DVDs are, in various embodiments, supplied with pre-scored standardized blanks, or a third-party like an ad-sponsor may provide these blanks with their products.

In various embodiments, some value to the user is returned for the logging-on and downloading of the cover-art and liner-notes to a given media piece. This could return royalties to the artists in conjunction with the amount of sponsorship at the point of download and/or on the printed piece.

These strategies also allow standardized and superimposed printed sponsorships. For instance, the object in the band of a star is, in various embodiments, altered according to sponsorship and licensing agreements in place with the star's management.

Re-Deployment of Assets

In various embodiments, a mediating layer is inserted in the receiver/browser itself. This mediating layer prevents, under normal settings, the user from accessing media that is awaiting assembly or currently arriving. An "always-on", or 24/7 state, is the default state for the receiver. In this way, say, things like news items and stories/reports of interest to the profiled-viewer/listener/reader, and to his history-of-viewing profile, are collected and cached. While this is, in various embodiments, a time-based-programming adaptation of an intelligent-agent type of model for static-media, or for cached dynamic media, there are fundamental innovations to this model.

In another embodiment, in addition to the basic model above, the following elements are included:
  media would bear tags marking, for example:
  priority according to user-profile; this will be used to set the delivery order of the assembled media;
  delivery time of item to system or time of occurrence;
  source of clip or item;
  mandatory advertisement or promotion family of considerations to be associated with clip;
  expiration time/date of the clip;
  last mandatory date of presentation;
  value received, or debited, for the clip;
  reallocation of linear programming channels to multi-purpose and cross/functional channels.

One embodiment marks/tags regions or elements of program-streams (then called clips or assets) to indicate their reusability in time or across multiple programming channels. This is accomplished without affecting the traditional linear programming stream delivered in legacy systems to users without interactive receivers. For example, a broadcaster (meaning any entity, or cooperating group of entities, disseminating media) has x-number of channels, or x-amount of bandwidth, within which to provide programming. In the traditional model, this means broadcasting pre-assembled streams of media, each focused to a target market and core-interest. This model is very wasteful because large quantities of air-time, bandwidth and/or data are wasted through the repeated use of reusable and re-deployable assets across time and channels and users.

In one embodiment, elements such as programmer-ID's, the bookends of recurring programming, repeated announcements and advertisements are, in various embodiments, transmitted once and then, by use of caching and/or channel-reassignment, reused again and again from memory until either an expiration date is reached or an overwrite function simply replaces the elements with new ones, or directs the receiver/browser to default to the currently-transmitted programming. For example, a broadcaster with an installed base of passive receivers desires to make caching receivers available without disturbing the base of linear/legacy receivers. Any number of codes are, in various embodiments, embedded or otherwise associated with the media-assets in an undetectable or acceptable way.

For example, codes in the vertical-blanking interval, shifts, such as recognizable patterns of L/R time coherence, in the FM multiplex-signal are, in various embodiments, employed or, in primitive systems like AM-radio, even audible trigger-tones, or micro-shifts, in discernible temporal/amplitude/frequency patterns, of the carrier-wave are, in various embodiments, employed. That is, shifts of amplitude and/or frequency and/or phase too small to be meaningfully detected by a legacy receiver, are, in various embodiments, made in the carrier-wave, or in one or more sub-carriers (which themselves are, in various embodiments, amplitude-shifted singly or in relation to one another).

Micro-shifts are, in various embodiments, induced in recognizable patterns to aid in their reliable detection as trigging information. Such a pattern is, in one embodiment, reducing the carrier-wave amplitude by 1 dB on every other cycle of the carrier waveform. Repeated, for example, 5 times and rested five times, such an amplitude variation (referenced of course to a reference carrier signal level averaged over the longest-possible transmission series) provides a reliable trigger to begin a data-transmission using a similar strategy. In multi-plexed signals, for example, the same strategy is used in stereo-pairs where modulation-amplitude or time-coherence of monaural signal-components, is compared between normalized L/R pairs.

In embodiments with higher frequency sub-carriers, the audio or possibly the visual portion of the inserted clip could also be transmitted at modest speeds for conversion/assembly in a cache by conversion into a data-stream, or by frequency-shifting the signal in the analog domain to a low-enough point to be acceptably modulated upon a sub-carrier, or across two or more sub-carriers, by the above-described, or traditional means. In the case of the (analog)-pitch-shifted signal, the carrier (or sub-carrier) is, in one embodiment, used as a clocking mechanism, the multiplier of which is, in one embodiment, set in the header patterns or initial-information.

The clock, derived from the sub-carrier frequency, is then used to automatically set the playback speed of the signal to the original rate or speed upon retrieval or processing from cache-memory or other recording medium.

Having inserted these codes at the edit-points between assets desirous of interactive replacement, the receiver inserts from memory, or from an alternate stream of programming, the desired replacement element. This allows far less information to be sent on any given channel of programming, while creating the impression of a great deal of customization at the user's end.

In another embodiment, the following model is employed:

By way of example, only advertisements and sponsorships are made mutable in such a legacy system, such as AM/FM radio, or the emerging satellite-delivered digital radio for which many standards are already set. The owner of a passive receiver is unaware of the request-for-insert points broadcast in the stream to which he is, in one embodiment, listening. In this case the user hears only those ads that are normally inserted in the delivered primary programming stream. This generates one set of (advertising) revenues based upon estimations of say, quarter-hour, listener base in the passive receiver market.

Meanwhile, a user of an enhanced receiver is in possession of cached, alternatively delivered, ROM-based (advertising) insertions that might, depending upon a priority code contained in tags or similar elements, be delivered in lieu of the linear insertions. A record of this transaction (that is, precisely what was played to a user) is, in various embodiments, returned via cell-phone, mobile Internet, Bluetooth or its equivalent short-range networking protocols, independent transmission, or storage for later retrieval in any form, including credit cards, Flash-cards, magnetic or optical stripes and the like.

This forms a second advertising stream, based upon actual known exposures. The various verification strategies outlined elsewhere in this document (such as verification of volume settings or signifier-strings (the results of which also be stored in the card or similar device)) could of course further increase the accuracy of this data.

Advertiser-Themed Dramatic and Promotional Media-Content Creation Model

In various embodiments, a company or organization desires to employ various media to promote their goods, services, presence in a market, or mere existence. In one embodiment, all association of company logos and services to third parties is rendered superfluous by creating dramatic and/or entertainment programming based directly upon the company, or its activities.

In an example embodiment, a retailer of recorded entertainment (e.g., a CD and video retail chain) is desirous of increasing their market share and strengthening a positive profile with consumers. Rather than advertising within, or sponsoring, or engaging in product-placement within, an existing program, the company elects to create an entertainment program.

This new program uses as its premise the activities, employees and/or products of the company. Simply stated, the sponsored programming is a wholly or partially fictionalized story of the sponsoring advertiser. In one embodiment, the name of the program is the name of the sponsor, or a phrase containing the sponsor's name (e.g., "Pure NTECH"). For instance, for the CD and video-retailer mentioned above, the show's premise is, in one embodiment, about the personal lives and struggles of a group of young management professionals from that video-retailer interacting with entertainment stars and industry leaders in order to, for example, encourage the star's presence at actual in-store events and promotional concerts. These are actions that transfer easily into real-world events of additional promotional value to the retailer.

Further, in the course of the programming, actor-employees are, in various embodiments, called upon to interact with the buying public. The concept is further enhanced, in various embodiments, by blurring the lines of distinction between fiction and reality by placing actors in actual functional positions within the company or its customers, such as are represented in the programming, and by further utilizing actual non-acting employees and customers in real and/or wholly- or partially-scripted events.

While elements of this approach bear similarity to the emerging reality-based entertainment, there is a clear and defining difference. The elimination (through fusion) of the entire concept of traditional sponsorship and advertising is accomplished by the creation of a direct reflection of the advertising entity in the underlying premise of the media programming. This is not to be taken to mean that traditional advertising roles must be eliminated in the execution of this programming concept. These roles are now secondary roles suitable for advertising matching the demographics, not simply of the show, but of the product or service provided by the premise-sponsor itself.

In an example embodiment, an athletic-shoe company no longer has to sponsor, for example, a sporting event or sports-personality in an unrelated arena (e.g., a high-profile ball-team, or a youth-skewed television show with a sports/lifestyle premise matching the demographics of the company's desired customer). The premise now is, for example, the daily lives of the company's celebrity sales force or designers and scientists. The viewers watch the actors and/or real employees of the company's sales and/or engineering team and as they cater to real celebrities in a mix of real-life and fictionalized events.

Likewise, the fiction/reality blur continues into the sales people's dealing within the company's activities at corporate meetings, retail stores and the like, thus crafting and projecting the precisely-desired corporate image in the context of an entertaining television program of, otherwise, traditional characteristics.

Naturally, such a boundary-blurring promotional idea invites the staging of episodes, or portions of them, in actual company and company-related locations such as corporate offices and retail outlets. The stars and guests of such programming, if popular, offer numerous forms of spin-off promotions as these reality-actors appear publicly and, conversely, as the public appears in the entertainment and promotional elements of the programming or related it by traditional advertising/promotional methodologies. In various embodiments, such programming is part of the media content delivered to a user of the media assembly system.

Additions to the Model

In a variety of embodiments, a customer purchases or is presented with a winning opportunity in the form of any number of for example, store-based giveaways or hidden prizes in products/services, yet a winning status results in appearance on such a reality-based program, or the promotion is a part of the program. The event of winning, thus, becomes the prize.

Similarly, the premise of such a show includes numerous actual company locations in the course of a series. In this way the reality-based program appears in real-life in actual, dispersed, trade locations in the course of its creation, thus affording customer/audience involvement at a new level. For example, instead of an actor making an in-store appearance to promote a show or to draw customers to a retail location of a company, the two events become naturally fused. Actors, employees and/or actor-employees and customers (and/or actor-customers) appear naturally and seamlessly at a company location for the creation of a segment of entertainment programming based upon that company's activities as seen in the programming.

In another embodiment, confidential sections of programming are only available to customers of (or visitors to) the premise-company's real or virtual locations. For example, intimate or secret background scenes exposing such details as romantic encounters between employee-actors and customers, business associates or other employees are only made available by visiting a store location and buying/receiving a DVD, or website keyword containing these ancillary scenes. In another novel twist, an unlocking element such as this keyword is only provided on some, or all, physical or virtual sales-receipts originating at company stores or sites.

In other embodiments, co-promotions are accomplished within the plot/situational context of a show. For example, a shoe company and a sport league co-promote by creating a premise involving both companies/organizations or their products, locations or personnel and the like. The promoters, PR-executives (even those retained in reality or by premise, from a third party) and sales people interact with the players, coaches and management from major teams.

In various embodiments, any way of knowing position (including global positioning systems and cellular transceiver use) allows any source of local media (including Internet, cell-phone, and traditional radio/television and their, say, sub-carrier signals) to insert localized programming (including advertisements) into any primary stream of programming (including wireless Internet and satellite programming). In one embodiment, the concatenation engine is in the user's receiver, rather than at the transmission end.

Internet Auto Receivers

In a variety of embodiments associated with auto-based systems which are Internet-based, spoken commands will emerge as the de facto standard. This means signifier strings are spoken as the method of returning them to the system.

An advertiser, for example, or provider of educational programming, for example, may request a response of any kind to indicate mindful consumption of a programming segment. That is, the signifier is now an embedded query or call-to-action of a slightly different form, such as, "Do you agree?" or "Crunchie-Pops". The return response, such as a voice-response, need not be predefined, but is, in various embodiments, of a general character as well.

One embodiment requires the consumer of media to speak or otherwise input the name of a company, product or service, or benefit resulting from the product or service or information provided, in order to receive tangible benefits from advertising, promotion and the like. This is a small, but highly significant, sub-set of the already described IP. Studies have proven that eliciting this type of involvement from a user, especially three or more times, has great benefit in establishing the message contents as a long-term memory in the user.

In a variety of embodiments, a new class of advertising and sponsorship is described called independent advertisements. These are defined by the fact that they are, delivered, usually directly to the consumer, with the directive to apply themselves to appropriate surfaces. Surfaces means any place, predefined or not, virtual or physical where these independent advertisements can position themselves. Attributes such as the size and permanence/mutability of these advertisements can be contained in their internal properties or scripts. Another aspect of these independent advertisements is the following: independent advertisements can be programmed, or otherwise caused, to "eat" or displace or otherwise disrupt or subsume existing commercial messages and sponsorships. Any means of identifying existing messages and/or their locations can be employed, including with limitation the following: the cybernetic detection, or human-directed detection, of existing messages, knowledge of, or detection of, the location(s) for/of existing messages, icons, logos, sponsoring/licensed images, and the like—or anticipated messages, icons, logos and the like.

Underwriting Real-World Products with Advertising

The provision of goods and services is, in various embodiments, wholly or partly underwritten, or other benefits are derived from, the placement at the consumer's or his intermediary's discretion, of sponsorship and/or advertising messages, icons, logos and the like upon tangible physical or virtual goods to be used by the consumer and/or his intermediary. The end-user, not the manufacturer/provider of service, controls deployment of the messages for his personal gain, or the gain of others, probably, of interest to him. The size, duration or durability, positioning, as well as the mix of messages (supportive or neutral or antagonistic to a given message) and number of placements, among other factors, are, in various embodiments, caused to determine the amount and nature of benefits, tangible or imagined, to the consumer.

In an example embodiment, a consumer wishes to purchase a pair of athletic shoes. At the point of sale he is offered a selection of messages, icons, logos, sponsoring/licensing images and the like for placement upon or within the shoes. The consumer selects a single dominant corporate logo for placement on the outer sides of the shoes and then elects to further adopt the corporate color scheme of the selected corporation as the colors of the shoes and laces themselves. Further, he selects a small, but repetitive pattern of a related corporate product as the background for his selected design. A computer program that controls the placement and execution of the consumer's choices then makes a calculation and/ or consults a look-up table. The consumer is informed that his selection will reduce the cost of the shoes by ten percent. He agrees to execute the deal. The vendor places the shoes in an appropriate device to transfer the selected images and text or three-dimensional objects to the shoes.

In another example embodiment, the purchaser of an automobile makes a similar selection and creates a blend of lifestyle-enhancing choices for his new automobile. By the selection of, say, a grid of intertwined logos of a car-wash franchise and a fast-food restaurant he obtains a 5% reduction in price of the automobile, or of an element such as a paint (or repaint) job. He then elects to place a popular soft drink manufacturer's colors and logo patterns as the underlying template for the fast-food-chain's logos (that is, they may in fact compose the fast-food chain's logo(s) out of tiny soft-drink imagery and logos, or employ a similar scheme). The consumer is then informed, that because of a synergy between these two brands, there will now be an 8% reduction in price. Programs are, in various embodiments, created to optimize and suggest these synergies and even match these suggestions to a profile of the consumer.

In yet another example embodiment, a purchaser of sportswear elects to have his slacks entirely composed of an alternating plaid pattern of his favorite tennis racket manufacturer's product and their name and slogan intermixed with the image of his favorite current and historical player's of the game. A computation is performed allowing him to pay only an additional dollar for the use of the licensed images of his favorite players, because the fees charged by the licensing organizations and/or estates of the players are largely offset by the use of the fee-paying tennis racket manufacturer's imagery. Those fees are, in one embodiment, amplified in a given instance because the retailer, for example, is made aware that the purchaser is an instructor at a local tennis academy.

The image/shape/texture or text transfer device includes, without limitation, such devices as a printer, paint or ink spraying device or image and shape/texture transfer-device such as embroidery or weaving devices or plastic molding and fusing devices for the affixing of, for example, three dimensional logos and designs, optical devices such as lenticular coverings. A generic device is anticipated as well in the form of an array of image- and message-bearing material such as a flexible video screen, and/or an array of small or nano-scaled lamps or motional elements capable of displaying the desired messages, patterns, textures, shapes or colors.

In a variety of embodiments, intentionally antagonistic messages are selected by hip or well-off consumers to willfully "hacks" the system. For example, a well-known cartoon figure whose owners charge a hefty license fee is patterned with a condom manufacturer's logo that pays a hefty usage fee. This results in no cost benefits at all to the purchaser, or even in an additional fee. Such antagonistic uses are, in various embodiments, specifically disallowed or penalties charged by the system or the vendors. While specific combinations are, in various embodiments, forbidden, extravagant fees are charged for these misuses that result in revenue streams for manufacturers and licensing entities, while incurring prestige to consumers willing to flaunt such abuses.

Re-Purposing Linear-Program Transmission Media

In various embodiments, linear program providers provide what appears to be completed programming to their legacy subscriber-base, or they entirely decommission their legacy base. In either event, the new (usually cache-enabled) family of players, by means of intelligent filters and/or embedded markers or cues in the transmitted signal, reorganize the linear stream of programming by means of either or both caching of a given stream, or switching between streams of cached and/ or un-cached programming arriving from other transmitted channels of the same, or different, providers and/or transmission media. Likewise, all or part of the signal capacity and channel-spread of a transmitter is, in various embodiments, allocated to provide background and/or cached media to be inserted in a primary stream arriving from the same or other transmission source.

Thus, the media/data stream of an (existing) medium is entirely or partially repurposed to become a source for insertion media, such as advertising media. The idea of piling-up of media assets that appears to be normal programming from certain channels into a receiver-resident caching/switching system is not obvious.

Passive-Interactive-Compliant Programming Model

In one embodiment, the limitations of bandwidth present certain challenges to the seamless assembly of unique programming tailored to individual viewers/users/listeners/readers/garners. The solution is as follows:

Allow unlimited access to existing media streams, regardless of their source. These are incorporated into the proposed model inelegantly unless systems are in place in the user's receiver to at least recognize the beginnings and ends of clips within a stream of programming. In this way, a song is, in one embodiment, effectively separated from the talk or advertising attached to either end of the song. Maximally, the actual contents of a clip, such as a song, are, in various embodiments, identified by such systems as are described herein. Likewise, if recognizable search-terms and content- or demographic-information were made available to such devices as search engines and crawlers and agents, then the internal system of the receiver intelligently cache and concatenate these non-conforming assets. Such devices and/or their software equivalents are proposed to be in place in fully realized versions of the receiver.

In this regard, slightly delay current non-conforming programming at a transmission site that aggregates existing content, tags it with standardized headers and tags and other suitable markers, and retransmits it over one to several channels.

Also create a unique spread of programming on high-bandwidth systems capable of supporting several channels simultaneously by organizing some or all of the channels or bandwidth into conforming media bearing tags as described herein.

Make available secondary and tertiary conforming assets or clips by means of additional bandwidth provided, for example, by existing or unsaturated new bandwidth and maintains a file of local and regional secondary providers and their transmission frequencies, modulation modes, sub-carrier frequencies, data-formats, URLs, telephone numbers, compression-schemes and other data. This data is, in various embodiments, updated regularly within the receiver itself from a stored database of transmission partners by region. This data causes the secondary channel(s) to be identified and properly configured for caching.

In a variety of embodiments, a transmission source presents to the user one or more primary programming streams. These streams are, in various embodiments, derived from one or more primary programming channels. In one example embodiment, there are, 45 primary programming channels. These channels appear to be self-contained programming. That is, without the aid of a passive-interactive receiver, the programming appears to be satisfyingly tailored to user desires and demands by simply tuning or surfing to the various channels. This feature is an added complexity, not a prerequisite requirement.

This programming model, referred to as spread-programming, allows vast access to media assets. While broad access to existing program streams such as are, in various embodiments, available on the Internet is available using such a mediated system is possible, other embodiments anticipate a preconditioned source for passive-interactive programming.

In various embodiments, the spread of programming, or radio-style audio-dominant programming is for a system with a capacity of, for example, 100 Channels, as follows: from Channels 1-5 is Serious Music Programming—1-Baroque, 2-Classical, 3-Romantic, 4-Twentieth Century, 5-Twenty-First Century. There is a similar spread for World Music, Jazz, Pop Classics, Contemporary Urban, Contemporary Pop, Great Soloists, Classic Country, Modem Country, Classic Rock, Contemporary Rock, College Rock, College Pop. Then, there is a News Spread: World News, National News, Business News, Technology News, Issues, Human Interest, Politics. Then, there is a Sports Spread: 3 Channels of U.S. League Team Sports, Golf, Tennis, Extreme Sports, Skiing and Snowboarding, World Sports Scene. Then, there are 5 Channels of dedicated Personality programming and Commentary—again these divide into categories along the guidelines of key programmers and/or along similar lines to those above—Historical Humor, Contemporary Humor, Historical Commentary, Contemporary Social Commentary, Contemporary Business and Political Commentary. Then, there are Radio Drama, Musicals, Opera, Hollywood People and Happenings, Film Scene, Weather and the like spread across another, for example, five channels.

It is clear that a rather comprehensive universe of audio-driven programming is achieved in 45 Channels. This schema leaves us with from 5 to 50 multi-purpose channels not normally needed in the linear model. In one embodiment, 45 of these channels carry the usual preprogrammed fare. The list above is illustrative only. The list of programming may be any configuration of channel subjects. Traditional pre-programmed fare is, in various embodiments, employed that roughly approximates the kind of selective differentiation imagined above in an idealized model. This includes Internet-sourced programming as well.

This leaves about 10 remaining channels (50-60 Channels if pre-programmed channels are employed in the basic model). These remaining channels are, in various embodiments, suitably encoded and/or compressed so that they are unusable/inaudible/invisible to a non-compliant receiver. Alternately, they carry sub-carrier or similar secondary programming only accessible to a compliant receiver, and have in the perceivable area of the channel, linear-receiver compatible programming of a lower bandwidth (e.g., speech-only programming). These channels support the talk-radio functions anticipated above, thus freeing up, for example, 5 to 10 more channels.

In various embodiments, each of the program streams described above carry a series of tags. These tags arrive in brief bursts, or headers. One class of tags is described as headers. These headers carry long-term definitions and program-structure as well as master demographic information. Thus, a header describes, for example, a 24-hour block of programming in detail, describing the demographic and other information envisioned herein, for each element of that 24-hour block. These headers are, in various embodiments, transmitted as often as every few milliseconds, or as seldom as once a week. The likely range is at the beginning of each programming-segment or, if it were impossible to encode the header information inaudibly/invisibly to a legacy receiver, once a day in, for example, the small hours of the night.

In addition to the headers, or even subsuming the function of the headers entirely into themselves, tags are, in various embodiments, associated temporally with (in any relationship, but most simply just prior to) each unit, or clip of programming. The tags associated temporally with the clips are, in various embodiments, reduced to simple marker devices. That is, in order for the system to work, each psychographically/demographically meaningful element or segment of programming must be delineated from the adjacent programming elements (or broadly—clips).

In one embodiment, this is accomplished using speech and/or image recognition systems. In other embodiments, each segment is marked with at least a start and stop marker however and whenever that marker is deployed. All other system tag information is, in various embodiments, held in those markers or in headers. These markers or headers occupy any usable space in the analog and/or digital bandwidth of the system, as described elsewhere.

In one embodiment, the following data is contained in the headers:

1. durability;
2. reusability;
3. date/time of use and date/time of expiration;
4. credit/debit value for the clip 11;
5. the whole family of demographic/psychographic descriptor tags;
6. the family of non-content related tags.

The appropriate use of the linear channels above still, with modest caching requirements, yields a staggering breadth of actual programming under the passive-interactive model.

In various embodiments, linear assets appear in an apparently complete order. If perceived by a non-compliant receiver, the actual assets delivered in the compliant receiver are, in various embodiments, dramatically different. In one embodiment, a channel is dedicated to advertising only. These ads are cached and deployed to replace the ads in a fixed programming stream. Likewise any ad-placement from any time-period in any of the many streams is, in various embodiments, cached and redeployed into a different stream or at a different time than the original time of the linearly-perceived ad.

The same is possible with programming clips as well. In, for example, a 24/7 receiver-on model, the linear stream is functioning as a separate income model entirely. While it can generate revenue in non-compliant systems, it is essentially a dynamically-changing source of cached materials. Playing out from cache memory, all of the temporal and channel-specific relationships of the linearly-perceived programming are rearranged. A new income stream is born, and from the original n-channels countless virtual channels are created which more specifically target users.

In an embodiment with no legacy/linear programming needs an even more startling economy enters. A surprising number of assets are repeated both in time and across channels. These assets need only be transmitted once. In the case of things like station IDS, they only need a single transmission or placement in ROM. This renders the density of the possible programming significantly higher, because all redundancy is engineered out of the programming stream and replaced in the receiver itself from cached elements.

It is also worth noting that spoken-word elements like DJ patter, news and the like are, in various embodiments, transmitted separately from the bandwidth-intensive clips or assets. This allows very efficient (loss-y) compression to be employed on those voice-only channels, or advertising-content channels, thus allowing a greater number of effective channels in a given bandwidth signal. This also means that tagging, header, local, and profile data for instance are allocated to these lower-bandwidth-requirement channels.

Structure of a Passive-Interactive Receiver

In various embodiments, the characteristics of the receiver include some or all of the following attributes:

can receive more than one channel simultaneously;
can route one or more of the channels received into memory without playing the contents of those channels;
has the ability to monitor and cache program content and/or associated data even when the receiver is off and no user is present;
can register user's requests for programming style/type or channel or source by providing a venue (such as touch-screen or voice-response system) for accepting user programming requests—which requests may do either or both in any combination select or modify templates and/or select programming sources;
can evaluate headers and/or tags and determine which clips to cache and which to discard or play at once;
can evaluate headers to determine when to play clips and how often/how many times to play clips;
can concatenate clips into a seamless stream using either hard cuts or the NTECH transition system;
has the ability to recognize programming created under the NTECH guidelines, and non-compliant programming that is merely marked or tagged according to NTECH guidelines and appropriately assemble an intermix either set of assets;
has the ability to download templates that embody programming rules and styles and to store those templates until new templates are requested or issued as overwrites;
has the ability to store multiple templates such as the aforementioned, for multiple users or listening moods or requirements;
offers the user the ability to select these templates;
offers a method to upload and/or download created templates;
offers a method to switch between several templates;
offers the user the ability to tune/select from basic programming streams/services;
can receive, decode and cache additional programming streams from secondary sources such as cell-phones, wireless Internet protocols, AM/FM/satellite/TV signals (as described before);
can issue signifiers and/or recognize the need for the issuance and return of signifiers;
can accept voice commands or prompts and/or other verification inputs such as from any form of user-presence sensors or actions 12;
can qualify and/or store user responses to signifiers;
can transmit or otherwise provide to outside sources such as advertisers or vendors a record of a user's successful response to signifiers, this is, in various embodiments, done through any return path such as cell-phones, floppy discs, flash cards, printers, and the like;
has, in the context of a suitable system, the ability to return a record of actual media clips or programming consumed and/or billing and credit information to programmers, artists representatives, advertisers and the like by the same several means described above;
has the ability to actively, and with temporal reference, switch between the cached/provided channels or to actively, and with temporal reference or other cues, gather material sequentially or in parallel from several URLs, e-mail address and/or similar sources of programming;
Contains, or has the ability to coordinate with, location-positioning systems such as a global-positioning-satellite receivers or portable-phone cell transceivers and the like and to appropriately cache and/or selectively receive local programming for insertion or delivery as programming in the manner detailed earlier.

Workflow within the Posited Receiver

In one embodiment, one or more user profiles are resident within a receiver, usually in the form of RAM-resident templates. These templates are, in various embodiments, distributed in such a way that the programming arriving on one or several channels or from one or several other sources, such as URLs, has been wholly, partially, or not, preconditioned by that template. That is, all of, part of, or none, of the template, or of its functions, resides in either the remote receiver or at the transmitter or transmitting source.

At a given time it is assumed that the user template(s) resident in the receiver have cached relevant programming information received in the prior minutes, hours, or days. At the moment that the user turns on the receiver, or otherwise requests programming to be delivered, the receiver, in some embodiments, turns to cached programming to immediately satisfy the user demand. If a currently transmitted clip is appropriate, then the receiver defaults first to the currently played clip.

In one embodiment, the receiver always defaults to sponsoring and/or commercial or identifying or other significant sequences at the start of a programming session. These are delivered from RAM or ROM containing programming derived from any of several sources. That is, having paid for a sponsorship, or being the delivering entity, manufacturer of the receiver or related components or software, a bookend type sequence is, in various embodiments, initiated and repeated that brands the programming. Such uses are, in one embodiment, logged, verified for mindful consumption, and transmitted as, for example, credits to appropriate third parties.

Simultaneously, the receiver, in the background, queries (or has queried prior to startup) its positioning system for location information in various embodiments. This information is used to locate, by means of lookup tables, channel-scanning, remote database resources, communication with the host system(s), and similar methods to determine an appropriate source for locally-relevant insertions. Once located, these are inserted into the concatenated stream at the designated times/points in the programming delivered to the user.

In one embodiment, such a receiver, having access to a user profile provided by a programmer or a user, requests programming on a 24/7 basis from appropriate websites or other sources identified by the system and/or the user. Thus, if the receiver has adequate storage capacity and/or appropriately aggressive data-compression strategies are employed, the demands upon the primary programming bandwidth are greatly reduced by the preloading and storing of assets or clips.

The receiver is capable of identifying appropriate (default?) transitions for noncompliant media and for reading and storing the available content identifying information obtained from, for example, a website. This is, in various embodiments, done with the cooperative processing and/or tagging efforts of the service provider. Many forms of media already carry proprietary ID-material in their data-stream that is, in various embodiments, apprehended and translated to the system without human intervention.

Advertisements and Programming Shift Spokespeople by Demographics

Spokespeople such as anchor-people on talk, news and weather shows and celebrity spokespeople featured in advertisements, are, in various embodiments, altered according to psychographic, demographic and other characteristics of the end-user of the media. In one embodiment, one set of assets feature product footage, text or verbiage. This set also includes background settings, visuals, sound-effects and underscore and the like. A second set of assets includes the recognizable image, voice, or descriptions of, for example, a celebrity spokesperson or endorsing group. These assets are, in various embodiments, wedded in the system—at the transmitting and/or the receiving end—by any means including without limitation editing, intercutting, mixing, keying, pinning, window-in-window and the like.

This allows the same advertisement or program element to be split into sub-groups and customized to individual consumers of the final media. The benefits to the program/ad creator are greater targeted appeal, broader potential demographics (even within the same media-buy), and lower potential costs for the use of multiple spokespeople, while maintaining lower cost for the creation of a series of such elements. The benefit to the actors and celebrities is that, while individual costs may reflect more targeted use of their likenesses, the opportunity for the use of their likenesses is dramatically increased.

Shifting MC's Celebrities and Personalities Host Virtual Shows

In one embodiment, one of many individual celebrities or other persons are substituted into programming. In one embodiment, the selected individual is the host. This method includes the assembly of personality-programmed shows in the privacy of the individual user's receiver. A database is maintained of hosting patter, one-liners, interviews, commentary and the like. These elements are grouped by type, potential use, content, demographic specificity and the like. The elements, or clips, are, in various embodiments, performed by various talent, and in various styles. In an example embodiment, a major comedic celebrity records one-hour a month of patter and commentary. A major news anchorperson or radio shock-jock records a similar universe of assets. These assets, and their historical equivalents recorded both by these same individuals and/or culled from television shows, movies, radio specials and the like are similarly maintained.

These historical elements are similarly typed and tagged. Any programming desired by a user can be hosted by a contemporary or historical figure. These assets can be licensed or sold or placed in programming on a shared ownership or royalty basis. In various embodiments, templates reside in the receiver and/or the database (where the effective delivery of such assets is conditioned or templated by the talent producing them) or in the transmitting device. Whether the assets were recorded specifically for the purpose of creating a hosting database, or whether they were repurposed from existing contemporary or historical media, the result is the same. A user has Lucille Ball as the host of his morning drive-time show or Robin Williams Good Morning Vietnam DJ reappear as the host or co-host of a contemporary audio or visual program unrelated in form or content to the original envisioned purpose of these performances.

In various embodiments, revenues from the use of such materials flow back to the copyright owners and/or to the talent or the talent's estates. Revenue is paid by the content creators and/or distributors, or in a new model is, in various embodiments, wholly or partly underwritten by volitional payments by the end user/viewer/listeners themselves. These usage fees are offset by advertising revenue.

Ad Revenue Automatically Offsets Pay-Per-View Program Elements

In one embodiment, a user designates an Ad-Frequency constant or variable for himself. This constant/variable informs the system of the user's desire to have costs offset or to gather credits for viewing subsidized material. In one embodiment, the scale is from zero to ten. At a setting of 0, the user desires no advertising. At 5, the user desires to exactly offset his programming costs. At 10, the viewer desires to maximize his exposure to advertising and promotion in order to build up a credit that can be spent internally in the system or elsewhere as envisioned above.

In various embodiments, the user defines this constant dynamically across any programming axis (e.g., time of day or type of programming). In one embodiment, the constant is defined in several zones of use. It is further possible to define the type of advertising that one accepts, and the frequency of that acceptance. In an example embodiment, an affluent user allow factor 6 advertising of golf-related products, or of home security and investment products, but block all other advertising to level 0.

A Revenue and Business Model Employed in the System

In one embodiment, an entity exists to aggregate media. The aggregator(s) present their end user as a new and defined marketplace. Thus, a popular show allows its program to be delayed, for example, a few minutes in its first airing in order to allow that show to be broken into component pieces and tagged. Macro-tags containing the defining tagging characteristics of the show are, in various embodiments, created in advance of the airing, thus allowing the smaller family of clip-specific tags to be swiftly added to the show. Existing advertising, sponsorship, and commercial messages is, in various embodiments, removed at this point. Regardless of the durability of the existing advertising, new target-specific advertising are, in various embodiments, inserted at any point, and from any source, with the delivery chain of the programming.

All of the techniques for viewer-verification strategies, as well as traditional ratings style, CPM, and similar brute-force methods of costing-out a media buy or use are also employed. The tracking data from the verification methodologies makes its way back to the transmission end and/or to the advertisers and sponsors. Based upon this combination of data, the sponsor/advertiser/ad-agency pays the required fees. These fees, minus, for example, the aggregator fees and the royalties distributed, potentially directly, to talent such as actors and composers and writers, are then used by the consumer to underwrite programming. costs and/or potentially re-directed by the consumer to independent uses by the types of systems described earlier.

The consumer is put in charge of all stages of the advertising chain from delivery to payment. The consumer profits directly and incrementally, if desired, from the advertising revenues. The talent involved in the creation of any such programming can be paid directly from the fees paid by the, say, producers of a program or the agencies of the advertiser. These dramatic shifts set new dynamics and economies in motion in these industries.

Templated Program Aesthetics and User Resetting/Setting of Broadcast Times

In one embodiment, templates are created of, essentially, sub-templates. In various embodiments, the system allows for the creation of virtual programming. The user's profile and listening/viewing patterns is weighted into such a system, but templates set by experts in programming and popular producers and artists and even templates derived from the analysis of existing shows, are, in various embodiments, employed together with the user's desires for specific artists or personalities or content, to create shows that maintain the well-regulated features such as pacing and content-flow and personality, but yet fit the psychographic/demographic profile and/or specific desires of the end user.

It is possible under such a system to create highly individual templates that are shared, sold, or licensed to other end-users. In one embodiment, a user creates a template using a children's show host with a hard-core rap music format and a selection of farm news items. This template is deployed and endlessly repeated without duplicating the actual content of the show, and still allowing further customization or tweaking of the show's format by additional user's of the new format template.

Unlike systems that allow users to spool their viewing selections for later viewing, this system allows the complete restructuring or even initial structuring of program delivery schedules. Also, entire programs can be created from aggregates of other program elements to not only shift the time-of-viewing globally, but atomistically. Thus a favorite morning weather personality appear next to a favorite late-night talk-show host, while vintage clips of music performances mined from the legacy database punctuate these elements. These decisions are created from user preferences and simple or compound program templates.

A Model for Integrating User Programming into a Multi-User System

It is common practice for computer users to maintain files of their favorite songs, and soon it will be common to do the same for videos. In one embodiment, this practice is supported in a radio/television environment. The receiver is integrated with the stored assets provided by, or organized by, the user. This means that a user's CD/DVD collection is organized by the user and MC'd by an announcer/host downloaded in real-time/near-real-time from any transmitted source, including the Internet.

In various embodiments, the level of organization is determined by the user and spans the range from no organization, that is simply random play, to complete song-selection and ordering. In the middle range are general style rules that spread the selections according to general guidelines provided by the user and/or the system and/or, say, a DJ's templates. A GUI or plug-in to another asset-playing application are, in various embodiments, provided to allow the interface to the template forms and the user's playlists. The enabled receiver is equipped to upload or accept input of this data. As with the template concerns, this is by any method, including simple e-mailing to a receiver address.

In another embodiment, final assembled programming is made available for sharing, as well as any other data from within the receiver, by allowing the receiver to, for example, dial-in or otherwise contact a website or send e-mail to, for example, a user's home account with any data in the receiver. The viewing/listening/reading/gaming credits are also sent in this manner to, for example, a home or office computer or similar Internet-capable device. This lower manufacturing costs for a fully-capable receiver.

In another embodiment, each receiver is given a durable (even manufactured-in) ID-number or similar identifying sign. The process of uploading the data, however it is accomplished, is, in various embodiments, done to (a) central web-site(s) or e-mail address(es). In this way several thing are accomplished:

usage patterns are tracked;
ownership and perhaps location of the receiver is tracked;
all user data is aggregated in one place such as: templates, play lists, debits & credits, profiles, preferences, location, and so on;
a simple location is provided for both checking on the status of things like credits and debits, and for refining programming or programming for special occasions such as a long trip; programming is modified for various travel or location related criteria, such as a long trip, an extended stay in an airport, or a particular geographic region or feature;
a central clearing-house for swapping and licensing templates and playlists and proprietary clips (assets) is provided. Shared authorship of such templates is managed at the micro-royalty level. Thus one or more users who had refined or altered the template provided by a company or, say, personality or star could share with the star in the royalties received by others swapping such templates or programming.

Users or affiliates of such a program are able to earn credits for such templates and programming with the provider, for example, of such a service or site. These credits are, in various embodiments, rewarded for the mass-distribution of such a template or programming or they are rewarded for each download and/or use of such a template. While credits are, in various embodiments, employed for any number of things mentioned before, they also be employed to send advertisements or messages or post advertisements or messages at that site, at other sites, or to send messages, advertising, or programming to the receivers of the users of the system. Such transmissions are capable of highly targeted delivery by demographic/psychographic characteristics, and are verified for consumption as well.

This is, in various embodiments, employed on the Internet generally, or other networks, for media-sharing, renting, delivery and use. Promotion or remuneration is rewarded for service to the community of users of a system or site. In various embodiments, that remuneration is in the form of increased exposure for the user's product, likeness, services and the like. The exposure is, in one embodiment, in the form of advertising messages at the shared-use site (or elsewhere) or it is, in another embodiment, in the form of the delivery of the user's product, likeness, services and the like (say, media) to the user's of the system (or elsewhere).

The effortless tracking of (micro-) royalties in such a system both eliminates the cost and error-prone-ness of intermediaries.

Satellite (or Internet) Transmission with Excess Bandwidth

In various embodiments, a satellite or Internet-based transmission service provide all advertising insertions directly for an international/national/regional area. The ad-site model feeds independent advertisements and other advertising-related media to a central satellite, or server, where the satellite signal is received on one or more channels simultaneously and forms a secondary signal allowing the caching of advertising assets within a receiver.

In various embodiments, local radio and television stations, or their advertisers (actual or potential), and even possibly newspapers, magazines and the like feed their insertions by Internet, phone, or conventional mail to the server which broadcasts them nationally/internationally, but with a localized code. This code then marks these insertions in such a way that the receiver ignores them or casts them out of memory until the receiver, or user, indicated the appropriateness of those messages. This is, in one embodiment, done by data interchange with, say, a global positioning device.

For some messages, it is desirable to relate the desirability to the user's home address; an example is advertisements for home repairs. For others, such as restaurants and hotels, the present location of the receiver is more appropriate. At this time the local advertising is inserted into the stream of programming or otherwise displayed or played for the user. Of course it must be said that the advertising server or any equivalent aggregation or distributed source of these ad-offerings could also ignore the differences between local and national spots and transmit them as a single signal that is sorted in the receiver as described above.

In one embodiment, a satellite transmitter divides the ad messages and profile and template elements by channels in any number of ways. The markers/tags then perform the sorting functions. Channels are dedicated in such a way that dedicated receiver-channels are employed to spread the burden of the various functions in some pre-described manner. In one embodiment, it is assumed that there is some return-path to the controlling locus/database of the transmitting entity. All other elements described above also are potentially employed.

In one embodiment, the media delivery system is implemented within a single satellite service provider. If a user were willing to leave his computer/receiver turned on, all distance learning is, in various embodiments, accomplished by the use of multiple broadcast channels and predefined broadcast times. In the model described above, the definition of the desired programming is, in various embodiments, accomplished completely within the user's computer or receiver. Alternately, this definition is downloaded from a website, or even broadcast as a data-stream from the satellite.

A Refinement of the Passive-Interactive Business Model and Technology

In various embodiments, passive-interactive programming and independently-delivered and deployed advertising are refined to work efficiently and profitably in a distributed model, and without the need for blanket-adoption by large venture partners.

One embodiment requires the atomization of the full-blown engine and media-reception and tagging model into isolated forms and types of media, with an emphasis on the advertising/commercial underwriting of media. The components arrive in the user's machinery quietly and over time, thus enabling further application of the passive-interactive system of programming.

Mediating Layer Expands

In one embodiment, the mediating layer interposed between the user and the arriving media is expanded to include interaction with non-compliant media. For example, a user requests data from a URL. A window, or similar device, appears presenting something like the query: "Do you want this now?" With this simple query, a mediating process begins that redefines the Internet experience. A layer is interposed, or a monitoring program working in the background is put into place that acts as such a mediating layer. Such a program, plug-in, or layer, looks for clicks, shifting URLs being sought, or any other action indicating the beginning of opening a web-page or similar element.

Upon the sensing of a request, the system moves to intercept, or opens a window in parallel that queries the user to determine whether the requested media is urgently needed or not. Such a query includes the ability to select levels of need or urgency relating to the sought information or media. In the event of a non-urgent request, the request is cached/stored and removed from the immediate goto window of, say, a browser.

Alternately, an appropriate amount of time is allocated to the retrieval task, during which time previously cached media is deployed before the data arrives suitably. Failing a timely arrival, or in the event of a non-urgent deferred request, the request action itself is cached for later execution. The background program, or its equivalent, now looks for idle CPU time, use of other non-Internet programs and/or other factors to decide whether to initiate the series of searches stored in the search-cache memory. The searches are performed in the order of their urgency factored against the order of their request.

At any such later time, including late-night hours for example, the various locations are visited in any way. One method is to simply locate the link's URL remotely and to store the result of such a visit or search in any number of ways. The levels of exhaustion of the contents of such a visit are, in various embodiments, set in any number of ways. The sought content is, in one embodiment, entered in the retrieval element of the system and keywords and the like matched upon arrival at the URL, an exhaustive pattern of clicking-through is employed to attempt to exhaust the server's contents, or a modest best-guess method is employed—any, or all, of these in a weighted algorithm.

An intermediary database service that caches sub-pages of queried websites is, in one embodiment, maintained and consulted to streamline such a process. Regardless of the methods employed, the results are returned to the user in any of several ways. Pages are indexed and stored as HTML documents, TIFFS, QuickTime movies, MP3 files, and the like. They are returned as pages to a browser and lifted out for storage, or they are returned as e-mails containing the text, images and/or multimedia data. The various web-pages sought are reduced to immediately-accessible cached files for swift perusal.

Further, links of interest embedded in those retrieved and requested links, either remain active, or, if they are judged by the system's analysis of the user's profile and request to be of a sufficiently high priority, they are followed and downloaded and cached, thus allowing the user instant access to their contents.

In one embodiment, the desired URLs and research and advertising links are transmitted to a remote server. The links are mined for data by that server without employing any user-computer time. The results are sorted and/or organized or prioritized and/or filtered. Advertisements is removed and/or replaced in the mined materials. Independent advertisements are inserted or forwarded along with the resultant media, data, and pages to the user's receiver. The revenue portion of the model negotiates a fee from the advertiser, media programmer, manufacturer and the like for the forwarding to the user of the advertisements and data/media.

The server administrator splits these royalties and payments with the consumer. Likewise, the administrator charges the consumer for additional mining services. These fees are offset by the application, at the consumer's request, of those ad-credits to their account with the service provider. The user's e-mail client, upon receiving an e-mail containing the sought-for information/media is caused to recognize the administrator-originated e-mail and to open it and display, play and/or cache it, as the user and the state of the user's receiving system require.

As a user is perusing the results of these searches, he/she can mark items for keeping and prioritize/organize them, or mark them for destruction. In this way the user's archive of needed data grows.

Cached Assets Mask Wait-Times

In various embodiments, the searches above are mediated. By estimating the timing of delays associated with linking to URLs, cached media is reliably deployed to mask, and make profitable, these wait times. A brief query is sent to a server to log its bandwidth and/or wait-times associated with the pipeline and server. Such a query, along with a history of response times and estimated task-timings, cause the reasonably accurate estimation of turnaround time to the user for such a query. In addition to triggering cached assets, such a test result in the user automatically electing to defer (by means of the mediator) the collection of Internet-resident information until a later time.

Remote Library

In one embodiment, a library is established for each user. The library is maintained in the user's machine or at a central server. As the searches described above are requested, they are cached. They are later mined as described above. The results of the mining sessions are stored in such a research room/library. Anything put in such a research room or library can send information to relevant advertisers/adsite(s) or related and value-added services and manufacturers. In accordance with the sponsorship profile of the user, various sponsorships are solicited for pre-arranged for the media and documents stored in the library.

Ads and media or documents arriving as a result can be stored in the library. A fee is, in various embodiments, charged to advertisers for placing ads in, on, and around, each requested and stored document or media file. These fees are shared with the user or some other benefit provided. For a higher fee charged to the advertiser, ads and media/docs are sent priority to the user directly. In addition to the media/document itself, ads attach themselves to shelves, bins, and other virtual features of the user's library. The revenue model floats from a negligible fee for such a positioning, to a significant fee for an opened and verified, or responded-to retrieved item.

The storage of the user's library of assets may occur as follows.

This storage can occur in a remote on-line server. location or within the user's receiver (meaning, without limitation, a laptop computer, PDA, desktop computer, or other compliant receiver). In one embodiment, the storage is distributed seamlessly across user receiver/computer resident library assets and server-resident library assets.

Mediating Non-Web/Non-Media Items

In one embodiment, all clicks, voice-commands and mouse motions are mediated with powerful results. In one embodiment, whenever the save commands are requested, the system offers to optimize the categories for such save requests. These categories correspond to the user's library. By requesting such things as keywords and categories from the user, or by performing a word-count or context-recognizing search of the user's documents or media, the system makes possible the targeted sponsorship of that media. This is also true for retrieved documents using the open command, or simple clicks.

Any of the ad-attachment models discussed herein then sponsor the search, and by so doing earn any of the benefits discussed herein. Each sponsoring ad has the ability to explode into other search-functions and/or types of related media.

Auto-Detection of Windows in Pages Arriving from Servers

In various embodiments, banners and display ads are reliably detected in arriving displayable data and replace by independent advertisements or other content selected by the service-provider.

Mine-Able Ads

Any internal databases or trees, and their associated search engines, are, in various embodiments, employed as part of the internal structure of the envisioned advertisements/promotions. An advertisement modifies itself, or extends and augments itself, in the user's receiver. This modification, for example, employs the profiles, templates, and user-histories normally employed for the assembly of the media assets themselves. Advertisements are self-deploying or have several parts. These ads, which are best implemented as independent advertisements (though need not be) contain clips within themselves that bear tagging of attributes and contents like those of the core programming. Thus a single communication provided by an advertiser split itself after arrival at the receiver into several elements like bookends, bugs, banners, voice-overs, as well as, for example, 5-, 10-, 15-, and 60-second spots of varying types and character.

Music tracks, voice-overs and the like modify themselves to the desires of the user or needs of the current or upcoming programming. The type, and even key and tempo of music, are shifted to accommodate style parameters. Virus-like alterations of templates are, in various embodiments, introduced by a smart-ad. These modify and otherwise disrupt the state or contents of a template or other organizing principle. In the case of self-extending/augmenting ads, the ad contains related assets within itself. Things like clips of celebrities employing the products or services featured in the ad, or links to (or actual media of) related items/products of interest.

While these items are, in various embodiments, made explodable (the user may select the items to be displayed in greater detail) out of the ad or clip, it is enough to know that effective, savvy advertisements inject appropriate programming elements or enhancements to existing program streams. By using the same tagging system, these elements do not have to be known in advance of the reception of such an ad.

Ads arrive with their alternate contents interlaced in any number of modes. Clips are, in various embodiments, strung-together serially. They also are, in various embodiments, visually-subcarried in a novel scheme. The common thread of either method is that, upon determination of the needs of, and state of, the user/receiving environment, only the appropriate elements are displayed and/or heard. Such an ad contains, for example, 4 clips. In the case of the serially presented clips, all but one is discarded because they did not match the needs/profile of the user. The one remaining clip is deployed.

Alternately, all of the ads are reserved for appropriate viewing times, or simply to create variety. In another embodiment, the clips are structured as a package; one clip is a tiny screen corner motif like a bug, another is a short interstitial, while another two are actual spots with variations. Tags may allow re-deployment of assets, so that the spots are deployed for viewing/listening/reading multiple times and in various patterns.

In the visual-subcarrier model, any distribution of data or imagery that resulted in a display of multiple images in parallel forms the basis of the concept. In one embodiment, an advertisement, or clip, is divided into four regions. For example, these regions are typical split-screen quadrants. Each quadrant contains unique programming. The audio track of such a clip is, in various embodiments, similarly divided or multiplexed and then selected. A tag identifies the contents of each quadrant, or standardized criteria are employed to identify, for example, the suitable demographic for each quadrant. Upon sampling the receiver environment to determine the suitable imagery/sound to deploy, a mating and selection device selects only the appropriate quadrant.

This quadrant is, in various embodiments, enlarged and/or relocated to the appropriate part of the viewing screen. In this way, each recipient gets the same media, but it self-modifies in the user's receiver to an appropriate form.

Any number of methods for encoding or interleaving the coexistent clips are, in various embodiments, employed. Individual frames from each clip are, in various embodiments, sequentially interleaved, pixels are, in various embodiments, interleaved, the data itself is, in various embodiments, woven together. In systems of sufficient power the individual pixels are averaged according to, say, the pixel-group system described above, and subsequently averaged or blurred into a contiguous image. An image, for example, arrives in layers, each of which layers are separately address and displayed, or keyed, or otherwise interacted. A purely visual spot then appear with several different text overlays, for example.

Passive-Interactivity Methods Employed in Non-Compliant Systems and Receivers

In various embodiments using advertisements with multiple parts or multiple related clips, the system is structured to work entirely outside of the receiver described above in the following way: The suitable clip, or an individual downloadable plug-in or program, arrives carrying its own lightweight version of the an assembly engine used in the receiver. A small set of tagged assets arrives inside the clip. The first element blossoms into a small profile form allowing the setting of acceptance-of-advertising levels, and the other basic profiling functions as desired. These are then memorized and the assembly engine is installed in such a way that it monitors incoming media and/or e-mail.

In the event of incoming conforming advertising and clip media and e-mail, these are snatched out of the viewable stream or the incoming mail queue by the plug-in(s) and cached without the user's knowledge, or they are simply played/opened and then cached as is indicated by the tags. All of the signifier functions, both query and response, also dwell in the advertisement or clip.

In the case of mine-able clips or ads, subjects and content of interest are, in various embodiments, stored in the initial clip, or background loaded and deployed as is requested and appropriate by the version of the receiver engine. That is, small collections of passive-interactive-capable clips ride inside these mineable advertisements and emulate in a microcosm the functions of the larger system.

The entire passive-interactive system is, in various embodiments, eased in to a traditional web-media system. Individual building blocks of the actual system arrive in any form of media and assemble the receiver engine in the background over time. Various pieces of the engine with additional functionality are received and installed automatically over a series of media.

By downloading, or receiving by e-mail, or receiving the installation kernel alongside or within some viewable/listenable media, the ability is, in various embodiments, granted to a user's system to inform a master system, perhaps by e-mail (or direct connection to a URL, although e-mail has interesting benefits) of the need for additional modules/components and/or of the readiness of the system to accept passive-interactive compliant media. The browser then is given the ability to strip e-mails bearing identifying names or codes from the browser and to cache them in the background or build them into templates and plug-ins.

Likewise the ability is, in various embodiments, granted to cache streamed or downloaded media or data. The download times of such commandeered media is, in various embodiments, made transparent to the user by the deployment of cached assets during the to-be-cached download.

At intervals, the receiver engine could cause the sending of an e-mail or the contacting of a server for the purpose of uploading the user's credits (and, in the case of licensed media, user debits) to a central clearing-house. Alternatively, any of the several methods for outputting credits discussed above are, in various embodiments, employed.

Set-Top Boxes and Wireless-Networks

In one embodiment, a set-top box serves as a receiver. Here the convergence of telephone, Internet, and cable and/or satellite media forms the perfect mixed-media soil in which to grow such a system. In one embodiment, the television signal arrives with standardized codes indicating the presence of interactive components to the programming. Standardized protocols allow the user-clicking of certain screen areas to elicit responses from web-based media which are then delivered to enhance the linear programming experience.

Advertising arrives from everywhere and is displayed/deployed under multiple models without significant consumer controls, unless they have installed ad-filters. In the present model, media arrives across one or more mediums and is generally cached. That is, the primary stream is, in various embodiments, of Internet origin or, normally, of broadcast origin. Advertisements are largely delivered with the intention of separating them, filtering and conditioning them, and displaying/deploying them according to largely consumer-generated patterns. The assets are then played largely out of cache. The consumption of advertising and pay-per-view programming and elements is tracked and returned by Internet or conventional telephone.

In a wireless embodiment, assets arrive as data over a low-power transceiver system, or by cellular telephone data/voice technology. The present system makes use of satellite media and legacy FM/AM/VHF/UHF radio and TV signals. These are cached to create the impression of an unbroken line of communication with the host server, and deployed under the templates and play-rules of the embedded system. Advertisements are also handled largely separately and cached and re-deployed.

Frequency/Amplitude and DATA-RATE Micro-Variations as Sub-Carrier Data

Advances in the ability to reliably detect nearly insignificant variations in such things as amplitude, phase and frequency on a nanosecond-by-nanosecond basis, as well as the availability of inexpensive processing power and memory, now make it feasible, in various embodiments, to employ insignificant variations in amplitude, phase and frequency as data and signal-carrying entities.

System that employ calculated micro-variations in the carrier or sub-carrier frequencies, temporal position or phase, and/or carver/subcarrier amplitude, or carrier/subcarrier modulation depth, when referenced either to a standard created by the averaging of such levels, phases, or frequencies over a moderate time (or to a known/stored reference-standard), or by referencing them to one another that is carrier-to-subcarrier, left-to-right multiplexed signals, sub-carrier-to-subcarrier, and so on, are, in various embodiments, used to carry both broadcast media and advertisements and other insertions.

In one embodiment, a carrier frequency is transmitted with frequency-modulated signal superimposed upon it. The amplitude of such a carrier is fixed and, because of fluctuating conditions, unknown at the point of reception. By causing a recognizable pattern of fluctuations in the transmitted amplitude of that FM signal, a receiver equipped to recognize such patterns decode data or signal from them. The amplitude fluctuation is, in one embodiment, so small as to have no perceivable effect upon the strength of the signal at the point of reception. The types of patterns that are so employed are numerous and described elsewhere in this application, but follow the general pattern of a repetitive header followed by a burst of data. Each header/data burst is transmitted multiple times and the best-guess average, or the signal with an intact error-correction scheme (such as bit-parity), is forwarded to the data-storage or interpretation device.

In another embodiment, a symmetrical and synchronous, shift in the parameter(s) of some other signal-value, such as the amplitude or frequency of a sub-carrier is employed as an error reduction and/or sensing scheme. That is, by way of example, the amplitude of a subcarrier signal increase by one-half dB as the amplitude of the carrier decreased by one-half dB. The comparison between these two values, which could not be randomly injected into the signal by transmission or reception flaws, yields more reliable information transmission than the single variation alone. It should be evident to those skilled in the art that there are numerous variations on such a scheme involving comparisons between, or references to known characteristics of, multiple sub-carriers and multiplex signals and/or their modulation components.

A, P, V LEVELS of Reimbursement Float with Each Event

The voluntary advertising-participation levels described above, while they are, in various embodiments, globally set and even micro-defined, are, in other embodiments, available by a consumer action, such as a right-click on the mouse or any other voluntary action, for immediate one-time-only definition by the user. This permits a consumer to define sponsorship and informational levels of advertising on an immediate (and global) basis. It is further probable that the consumer likes to define levels and types of commercial messages received. For instance, while a scuba diver does not want, at a given time, to see ads for a particular regulator, he/she is interested in a spec-sheet on a new regulator from a trusted manufacturer. While these specifics are defined on an ongoing basis, an intelligent moderating program that remembers user choices and makes predictive filtering decisions is, in various embodiments, employed.

Independent advertisements resident in the user's receiver immediately respond by such actions as the opening of a fact sheet, news clips, or article by positioning themselves around the media like value-added satellites. Also, in the case of cached linked-URL-contents and the like, the act of stripping off advertisements and potentially replacing them with independent advertisements allows the instantaneous modification of advertising and value-added ad-sponsored information like manufacturer spec-sheets.

In various embodiments, advertisements with multiple components have a unique internal vector. An advertisement or clip with multiple components, or similar self-deploying media device with several components within it of varying character has additional benefits. Instead of variant forms of, for example, traditional web or television/radio advertising, the clip contains a re-sizable ad, a professional endorsement, a price/spec sheet, and a detailed technical/professional review or feature article or video/audio story. According to the desires of the user and system states, various components of the clip appear. Tags and levels are, in various embodiments, available to address the selection of content. In one embodiment, levels are as follows:

LEVEL C1—show all forms of advertising;

LEVEL C2—show all forms but traditional ads (this is, in various embodiments, broken out into C2a, C2b, etc. defining the size and length of the presented media);

LEVEL C3—show only professional or unpaid endorsements;

LEVEL C5—show only informational clips and articles on the product or service.

Each of these contains nuances, and the specific list can be modified.

Alternate Clicks Forward Regarded Items to Associates

In one embodiment, it is commonplace to forward webpage contents, e-mail, links and the like to associates. These associates usually fall into two or three key groups. It is laborious to page through assets and cut and paste them into an e-mail client and address them each time. The following function to create groups automatically overcomes this problem. Some voluntary action by the user of a device (which need not be a client computer browsing the Internet) like a right click over a browsed asset, or tiny translucent screen displays of forward and file buttons indicate the desire to forward and file items.

Common e-mail addresses of individuals and groups to whom things are regularly forwarded open up in the window opening as a result of the appropriate user action. The list is automatically generated by observing the user's habits, created solely by the user or a combination of these two types. The correct choice is checked and this mails the chosen item, or otherwise brings the item to the intended recipient's attention. Importantly, this action qualify as a V-level (viral) action and credits are offered as a reward to the user.

RAM/ROM Resident Bugs

In various embodiments, a screen-area is identified in which to superimpose bugs or similar, usually-miniature, screen IDs over received images. These bugs indicate the present methods-in-operation as well as carry commercial messages and broadcaster/provider brandings. The screen-buffer, or other suitable location, is, in various embodiments, sampled to locate areas of little or no change in image content. These locations are overwritten and a new, sponsored viral-bug is placed in its place. The new bug surrounds, or otherwise incorporates some, or all, of the original bug.

On Switch/Volume Control Returns a User-Present Signal to Providers/Advertisers

Any user/viewer/listener/player verification strategies is, in various embodiments, caused to return a viewer-present signal to the providing server, broadcaster, or interested third-party in real-time or near real-time in addition to simply caching the state of the receiver for later transmission of credits/debits. The information provided, as well as the frequency or timeliness of reporting, is, in various embodiments, regulated by a viewer in exchange for varying levels of real/perceived benefits.

Fuzzy Concept May Also be Spatial and Temporal Clip Locations

In various embodiments, the concept of fuzzy-ends of clips is extended to include fuzzy-zones within the clips. This is particularly useful for the insertion of, for example, chroma- and luma-keyed or pinned imagery over an internal segment of a clip. Additionally, clips (which are already tagged) contain, in one embodiment, a tagging subset that delineates the characteristics of an internal area of such a clip.

Scan-Feature Announces Cached Assets

Especially useful in some embodiments involving a car is having, for example, celebrity announcers, or simple electronic voices or read-outs informing the user of the media contents that are currently cached in his/her player. Such scans are, in various embodiments, the subject of ad-sponsorship. By allowing a brought-to-you-by type of message, the user, and the service provider, could earn credits for such a search. Once again, the mediating layer extends, and such a search is, in various embodiments, performed beneath an organizing template, making it pleasant and entertaining.

Priority Interrupts in P/I Programs

A priority interrupt feature is, in various embodiments, included in a tag. This is part of an existing tag, or an additional tag. Clips bearing this element in a tag by-pass the normal caching system. The method includes a single level or multiple levels of priority. In an example embodiment, there are three levels. A level 1 interrupt causes programming to be delivered immediately, interrupting program-in-progress. A level 2 interrupt delivers the clip immediately at the completion of the clip playing when delivery of the level 2 clip was complete. A level 3 interrupt places the clip at the head of a queue for the next programming segment, but does not interrupt a related programming segment. Other levels of priority are, in various embodiments, designed.

Broadcasters Transmitting Insert-Cues Share in Revenues

In one embodiment, a broadcaster or transmitter of media is encouraged to become compliant with receivers of the invention by, at first, inserting minimal compliant cues in the broadcast stream. These cues contain the stations/server's ID and the ID of the programming in which the individual cue/tag was embedded. The next level of compliance is the insertion of similar cues/tags/headers to indicate the larger segments of programming. These tags may, at first, indicate the identity of the program itself. By attaching such markers, cooperating entities participate in the ad-revenues generated by the method attached to their programming. In another embodiment, non-compliant media does not.

Credit Card Technology

All references to credits, payments and the like include all present and future forms of payment. Indeed, the expansion of wireless technology in all its forms is creating new payment transaction opportunities, including Internet transactions that do not originate from personal computers, for merchant acquirers and the processors that serve them. In one embodiment, digital certificates are used.

Digital certificates are security software, distributed by a so-called trusted third party, that are used to authenticate parties in an Internet transaction and to encrypt data related to that transaction during the exchange process. Similarly, wireless application protocol (WAP) certificates are designed specifically to secure Internet transactions involving wireless devices.

In various embodiments, new merchant terminals support delivery of Netbased advertising and promotional content that will be viewed by consumers at check-out counters. The new terminals, loaded with software that acts like a Web browser, are also used to support business-to-business e-commerce transactions. Methods of the present invention are installed in such terminals. The above system is used with systems in which advertisements are displayed on wireless devices in specific locales, with direct links to the advertisers, such as the automatic dialing of the telephone number of a business in response to clicking on or otherwise indicating interest in an ad.

In one embodiment, phones are equipped with so-called SIM cards, or Subscriber Identity Module chips, tiny microchips that carry information about the phone's user. Right now, people mostly program them full of telephone numbers of friends or business clients. However, in one embodiment, they are packed with bank account numbers, credit card limits, and billing addresses. Information on such chips is, in various embodiments, used in billing and crediting in connection with methods of the invention.

Rewards are, in various embodiments, provided in the above system by providing files that are suitable for printing by the user at a local printer, and then are redeemed for something of value. For example, consumers print labels with coupons, including bar codes. Standard label sheet (Avery-style) are, in various embodiments, provided to users through advertising and promotions in standard print and mail media (like letters, magazines, newspapers, flyers). These labels bear promotional advertising and promotion and coupons. In one embodiment, several of the labels themselves are coupons ready to be applied to products in a store prior to purchase. In another embodiment, they bear lottery-style gaming elements. They employ their peel-off labels to create a variety of couponing strategies.

In various embodiments, labels are repositioned side-by-side, or, in the case of clear or translucent labels, on top of one another in order to see a winning pattern or image or number/text emerge. Similarly, such an assemblage forms a bar code element. These elements also are applied to gaming/lottery style cards to either replace, form, or augment their identifying marks, winning numbers, images, or symbols, or scannable items like OCR elements and bar codes.

All references above to the use of bar codes are understood as including any optical machine-readable element, including without limitation standard text that can be perceived by OCR-equipped reader systems. The foregoing methods are also, in various embodiments, combined with proposed chip-based card that gives consumers discounts and other incentives when shopping on the Internet.

Sponsored Cursor

In various embodiments, the ad-sponsored or licensed media bearing cursor includes any recognizable element of the computing and/or receiving environment, including elements or environments that are made perceivable by the addition of defining qualities such as sponsoring or licensed media. For example, this is menus, task-bars, borders, pull-downs, cursors and pointers, any user-controlled element.

In an example embodiment, a kid wants a popular actor or pop-star's likeness or brief acting and/or dancing and/or speaking/singing likeness to be the defining element of their cursor. This is accomplished by the likeness shrinking and/or becoming translucent to assume a workable form. A variety of forms and appearances/disappearances of the sponsorship are, in various embodiments, performed in response to the shifting uses and contexts of the cursor. For example, in exacting positional uses such as with drawing programs, the decorative elements shrink to simply branded colors or to nothing, while in browsing or searching modes full-blown uses even involving pointing and excited context-sensitive commands are employed.

In various embodiments, dependent upon the levels of sponsorship selected, the cursor become a strong decision-making voice for the user. A mediating layer/monitoring-program may cause certain states to allow third-party control of the cursor. The cursor, or its sponsoring/licensed entity say, "Hey! Check this one out!" and, for example, the user momentarily loose control of his/her cursor as the cursor is dragged (even with visible animations of a tiny-person/endorser/celebrity/host doing the dragging) to a specific location or task and, for example, even auto-clicked to open.

Thus a small or invisible article or ad becomes more powerful than a large or frequent commercial placement. Secondly, this extends the model of the receiver-resident host a step further. The host now is allowed to take control of such things as selected links, viewed or heard media, URLs visited and/or channels selected. Hosts even shrink or expand screens, print documents, turn up or down volumes, they in fact, are given any level of control by a user. For example, a Howard Stern fan likes to see these antics enacted, thus taking a favorite host out of the purely visible/audible realm and allowing them to extend their (unique) interactions into the user's conventional territory.

In various embodiments, a mediating layer, or equivalent monitoring program allows control over all functions. A menu is supplied to allow user-controlled limitation of the potential actions of such a template or host. This is especially useful when used with a system such is described herein that performs visits to selected links in the background to avoid the expenditure of user time.

This also relates to a new celebrity endorsement model. Say the cursor moves toward, or hovers over, or lies idle (near), for example, an advertisement, radio or TV program or feature article of interest. The cursor, in the visible form of a personality or in the form of a prompting voice or text overlay (or similar device), suggests a particular action. These suggestions are, in various embodiments, based upon a user-profile or user-history. A background program, such as the ones envisioned herein, informs the cursor/user of the promising or profitable choices presenting, or possible, as well. "Why don't you check out this link?" is spoken/typed and a suggested link, for example, appear nearby. There are numerous enhancements possible with such a model.

In various embodiments, the voice of the sponsoring entity interject appropriate comments as the cursor is employed, like "What now?" or "Why not click here?" In various embodiments, the celebrity suggests "Did you know that Coca Cola® will let you use me for free?" By selecting the appropriate response, the cursor become doubly-branded in space or time or with shared integrated imagery (the celeb drinking Coke®). It alternates between, for example, Britney Spears and Coke®. This alternation is calculated/weighted to cause the fees paid by Coke® to cover the licensing fees charged by Britney. The user is in charge of the results of such a transaction. Selecting a Coke® border or background screen could allow Britney to stay on the cursor, or even to dance and sing across the user's screen.

In various embodiments, the user accepts the sponsored cursor software, which are embedded in the initial offering of a likeness or lifestyle element (like a surfboard) as a cursor. Options such as profiling and acceptance areas and types are offered along with the promise of remuneration for advanced or targeted uses of the sponsoring model. Then, such things as e-mails (with identifying titles or markings described before) are sent to a user's mailbox and snatched away for background deployment. Britney announces her new CD, her new Mattel® nail-polish set, or simply performs some routines that are periodically updated transparently in the background.

In various embodiments, the consumer is unaware of the method and times by which such updating occurs. An entity, such as a celeb, desiring to charge a significant fee for such a service, creates regular updates, thus becoming the MC or personality of the user's computing/receiving environment. This is related to the disclosure above of a templated host. That is, the sponsored cursor arrives with a deployment-template as a separate element from the media elements themselves. Thus, as more compliant elements arrive at the receiver and are cached, the personality becomes the hosting moderator for the delivery of cached and received elements and programming.

Like the general model of cached media that self-deploys during non-productive states, wait states, and similar appropriate points like during the examination of pull-down menus, the cursor element comes to life or increases its hosting activities dynamically with these use-events/periods. As cached media accrues, such a host even suggests sorted media programs and documents of interest to the user. By tracking the items used/clicked-on/pursued and those left unexamined a refined dynamic profile of the user is, in various embodiments, built. This profile then is sent to the originating server for such cached programming to modify the items sent for future caching, and deletion notices for items already cached.

All of the collection and customization of such a model occurs, in various embodiments, in the confines of a user's receiver/computer. That the results of such refinements, in addition to controlling the internal selection and retention of cached assets, modify the general character of the items sent is superfluous.

The Computer or Receiver as a Hosted Device

In various embodiments, the convergence of media will place an appliance in the hands of a consumer that will be able to combine approximately the functions of a computer and a traditional receiver. This involves the integration of mediating layers into all aspects of a receiving/computing environment.

The traditional associations of advertising, sponsorship and licensing with broadcast and print media are challenged by the model of independent advertisement. It is no longer necessary for the broadcaster to obtain sponsorship. Rather, the user votes with his or her volitional use of re-purposed advertising and marketing revenues and allow the independent placement of everything from ads to endorsements and manufacturer spec and sell-sheets in his receiving environment. This is severing of the hard links between media and sponsorship and licensing and products/media. Likewise, the passive-interactive system severs the historical link between hosts, stars, celebrities and media programming.

In various embodiments, the current personal computer with a web browser connected to the Internet is an example of a receiver capable of gathering media and data and mail from a nearly unlimited number of sources. Yet, unwittingly, this shifts too much burden to the user. But the methods described above solve the problem. The term authorial imperative is used to describe the useful restrictions and organizing patterns imposed upon media elements in order to render them relevant and enjoyable to the reader/viewer/listener/user of media. The method above has severed the content ordering templates from the media and now the embodiment of, and function of, the host from the programming.

In accordance with the description above, the computing environment of the future is a collection of appropriately selected cached/stored assets combined with a collection of appropriately selected arriving assets organized, mediated, and presented by an entity of the user's choice. That entity, or collection of entities for different tasks, moods, or times, resides locally in the receiver (and is updated regularly in the background) and hosts the receiver.

In various embodiments, the personality, operating characteristics, templates, choices and preferences may arrive as separate elements to create the ideal host, or set of hosts, for a user's receiver. It is further posited that users, or third parties, assemble such hosting entities, or collections of them and make them available for licensing/use to others. Thus, the selection of a host/host-family is optimized by the provider of the host's likeness, action-sequences, dialog, templates, and operating characteristics. Each of these elements is, in various embodiments, provided by a unique service, and/or by each user. Thus Groucho Marx's licensed patter and likeness is, in one embodiment, combined with the templated characteristics built by a team of producers, perhaps upon the recognizable characteristics of Groucho Marx—The Groucho-isms—and finally optimized by a savvy user for the searching of, say, high-fidelity components. In various embodiments, the three or four sources share in the revenues from all users electing to employ the Groucho+ as their sometime (receiver-resident) host or agent.

The use of such a potentially expensive host is, in various embodiments, offset (in the user's machine, or by traditional means) by the (often user-selected) sponsorship of Groucho+ by, for example, a bottled water company.

Redefinition of Existing Headers in Third Party Media

In various embodiments, a database or other suitable cybernetic structure is maintained that converts the simple identifying information in program-headers or any data or information or image or sound that is readable/perceivable in any way, into information of use to advertisers, sponsors, industry, manufacturers and/or information-providers. That is, the header of an extreme-sports program or of a popular song or artist is converted by the database/expert-system into either information about the projected psychographic profile of the clips user/viewer/listener, or into an actual commercial insertion optimized by such a header-conversion-to-profile operation.

Sponsored Programming Sold at Retail

In various embodiments, at the time of purchase, or at any later time, packages of hosts, music, videos, legacy programming, collected programming, packages of humor, packages of ads, packages of information of interest to certain customers, and so on, are offered or provided to purchasers, downloaders, or users of the receivers or software embodying the methods of the invention. These are to subsidize the purchase or use of such a system. These packages are made available on any storage medium compliant with the player, including Internet-based downloaded packages.

Such packages need not constitute contiguous or completed linear ad-sponsored-programming to be of value. A host alone is, in various embodiments, provided. Such a host is, in one embodiment, brief humorous clips designed to coexist with other host media or to operate under other host-templates. Likewise a package of; say, musical oldies or vintage TV shows, are provided that is, in various embodiments, plugged-in (like, for example, a card) to co-exist or displace received/cached programming. Problems with the rampant replication of such materials as CDs and videos are, in various embodiments, solved by the use of ad-sponsored models. Unlike linear models which require such a CD to contain ad-placements, this business/revenue model (which can exist independently of the model for creation of programming and rewards for viewing) cause advertisers to pay the royalties and fees associated with the creation or sale of an atist's/company's CD and to establish in media-resident software, the ratio of listening/viewing/reading/gaming to advertising/commercial message reception.

While this, in a traditional model, still requires the presentation of advertisements before, during, or after, the listening experience, in a moderated or hosted model the effect is quite different. A user selects the level of sponsorship for a given incident of use of the ad-sponsored media. The software allows some averaging over time of the density/length and timing of the playing of the commercial messages in order to allow the seamless play of, say, a CD if the next play were more heavily sponsored. Advertisers or groups of sponsors also elect to sponsor such a CD or media element at varying levels. A well sponsored CD requires only, for example, two messages per play, while a cheapo CD requires twenty messages per play. The advertisers make this known as a way of building customer good-will.

Similarly, the purchase price of a product containing programming of some type, such as a CD or DVD, could vary with sponsorship levels. The price is, in various embodiments, fixed by a fixed sponsorship level, or the price is, in various embodiments, varied at the point-of-purchase/time-of-purchase (or later), by, for example, being given a code that allows less or more sponsored play to occur. Such a code is given on the receipt, for example, at the time that the preferred/acceptable purchase price of the media was set by the consumer. A DVD purchased for five dollars requires the playing of several ads and announcements by several vendors; this requires a particular code to be issued, or data-burn to be placed on the DVD (DVD/ROM) unlocking the contents of the DVD at the appropriate level.

The same DVD purchased for ten dollars requires only one ad per play, perhaps when the DVD is first inserted. Significantly, the number of plays is, in various embodiments, recorded in a given player, and advertising could, if desired, eventually be terminated. Alternately, a consumer elects to receive the maximum amount of all or some levels/types of advertising thus, potentially, making the DVD a source of credit-derived revenue. This is true if the DVD or the resident computer/receiver were compliant with the methods described above in some way. Then numerous commercial messages are, in various embodiments, contained on media such as DVDs that unlock according to the deployment rules outlined above. The deployment of this unlocked media then gives credits or rewards to the user. One of these rewards is, in one embodiment, media assets.

The exposure to, for example, commercial media or other messages (such as artist-recorded public-service announcements, or political speeches) unlocks bonus media assets such as interviews and backstage-footage or bonus tracks. It should be said that the use of signifier-strings and other verification strategies outlined heretofore also are employed to secure the reliable consumption of, or to modify the remuneration for, such consumption.

In various embodiments, the above concepts make their way into consumer's computers/receivers as add-ons to their, say, stored MP3 collections. Such a sponsored element introduces a host or hosting package (a virtual DJ, ability to sense BPMs and other factors) to either/both organize stored assets for play with such features as emulation of the host's selection criteria for organizing assets the same as, or similar to, those on the user's machine, or to actually insert patter and the like, some of which are derived (that is, unlocked and played) by sensing the contents of the user's machine.

The commercial messages (or other messages that someone is willing to provide a benefit in exchange for viewing), together with such things as hosting templates and/or assets are, in various embodiments, on a DVD or CD or other medium. These will be provided as stand-alone hosting media both with existing stored media, and with downloadable compliant assets from a website. These assets will underwrite up to 100% of the costs of such media for the consumer, and/or offer consumer incentives and rewards.

In various embodiments, techniques for insertion of advertising are also applied to electronically downloaded books. For example, a book includes opportunities for reference to products within the text depending on reader selection. A reader pays a maximum price to avoid any branding, and one or more lesser prices for one or more degrees of branding. For example, in a first degree of branding, the beverages of characters are branded. In a second degree of branding, a larger universe of products and services are branded. In a third degree of branding, one or more characters is an employee of or otherwise involved with an advertiser. Suitable psychographic and demographic criteria are applied to select the suitable products or services to advertise for particular users.

Mark-to-Save Function and Durable Commentary Envisioned

A consumer is, in various embodiments, given the ability through any of several means to mark media elements for saving in their receiver environment. Such marking requires the replay of commercial assets in order to sponsor it. Some assets are retained with the retained programming elements, or they are caused to attract new commercial messages in the manner already described.

In various embodiments, all, or most, income from media is to be split into royalty classes and the problem of rampant copying of media is greatly alleviated (in addition to the great relief possible from the systems described herein). We convert what is now a blanket fee paid on a given piece of purchased media into a blanket royalty fee. Within this fee there are, in various embodiments, without limitation, various talent/performance royalties, writer/author/editor royalties, director/producer royalties, manufacturer royalties, media company royalties, distributor royalties, and even retailer royalties. This stream of royalties tracked centrally by a clearinghouse, which is, in various embodiments, an organization(s) is like Harry Fox, SAG, ASCAP and the like, or it are, in some embodiments, contained in whole or in part, by headers and tags described elsewhere in this paper (for a generally different purpose).

Payments are thus sent to the controlling bodies such as those above, or directly to the recipients of those payments. Additionally, by allowing advertisers and others to underwrite the costs of certain media, those payments are made directly to the appropriate organizations and individuals by those advertising, commercial, foundations, and other sponsors. A radio station today, for example, pays only a royalty to the publisher(s) of a played song. By elevating the royalty to include the artists, record companies and the like, which elevation is, in various embodiments, offset in whole or in part by the ad-sponsors of that station directly, the entire process is streamlined and made more uniform.

While the selection of a radio station as an example is somewhat controversial, the same model is applied to, say, the purchase of a DVD from a dotcom. Instead of setting a purchase price (plus potentially a retailer margin), which price is routed to an originating film company (or distributor, then originating company) for dispersal to artists and publishers and the like, the entire pricing procedure is reduce to a royalty alone.

By way of example in accordance with the present invention, the following Royalty Only Aggregate Revenues or "ROAR" model is described:

BACKGROUND

The concept of "profits" has become the source of intractable problems for web-based commerce. The creeping social virus of "data as a birthright" threatens to undermine the robust economy that has made such spectacular proliferation of goods and services possible. The following description outlines a radical plan for the redistribution of value between services and products that forms the basis for a new 21st Century commerce that is attuned to the requirements of e-commerce.

In essence, all streams of income specific to the delivery of a product, service, information, entertainment, coupon, or anything of real or perceived value are reduced to a royalty-like description. This description is securely attached to each purchased element or service. Peer-to-peer style commerce is carried out within the structures of these headers to underwrite all or part of the costs of the creation and/or delivery of the desired product or service. Additionally, consumers can be rewarded for consumption of advertising that is specifically tailored to be appropriate to them. Finally, consumers and other entities can sponsor the creation or delivery of products and services.

Historical View of Entertainment Remuneration

The ROAR model has specific relevance to the online sale of entertainment media products. A brief history is relevant. Music composer's of the Seventeenth to Nineteenth Centuries were promoted and remunerated by their publishers. In the era before recorded sound and video, the only income available to a composer was through the use of printed versions of the composer's work that were made available for sale through the efforts of companies capable of rendering the music in reproducible printed form. It was customary for a publisher to make available to a 'published' composer a percentage of the wholesale costs charged to music stores, magazine vendors, and sheet-music dealers. Abuses of this trust were common, even with major composers such as Beethoven. There were no known actual salable records of the performances themselves of such compositions.

With the coming of the 20th Century, technology posed a threat to the income of publishers by the ephemeralization of the concept of "publishing". It became apparent that the sale of audio transcriptions of published works, and soon, the "airing" of such recordings on the then-emerging radio format, would eclipse the historical sale of sheet music and scores. The publishers were able to secure a Federally-mandated publishing royalty that was attached to all audio recordings and their electronic performances. Performers themselves, long accustomed to making their livings simply by means of live performances, welcomed the new medium of sound-recording as a way to enhance the public's knowledge of their interpretive and technical skills—thus leading to larger and more loyal and geographically-diverse audiences.

As the record business matured, it became evident that the process of ephemeralization was continuing and that the recorded performances themselves were of significant value. Rather than obtain a government mandate for such royalties, however, the record companies simply agreed to pay performers a percentage of their net profits from the sale of such recordings. The abuses of such a system have left a trail of tears nearly a century long, as some record companies made a nearly-routine practice of defrauding artists. It was left to a relatively frail musician's union, and to the isolated efforts of producers, arrangers, conductors, and, most recently, sound-mixers, to create a reasonable restoration of balance in such a flawed system. For the record company's part, the enormous load of paperwork required to track and dispense these fractional earnings soon became enormous.

With the introduction of the easy digital transfer of huge files, ephemeralization has taken its toll once again, but it seems that no one has learned from the errors and successes of past systems to make a workable and durable correction to a historically-flawed system of remuneration for the creation of value.

A Brief Background on Advertising and Endorsement

Advertising has traditionally helped to close the information gap between the creators of value and the consumers of value. Endorsement, and its recent close relative brand-name and celebrity licensing, have traditionally performed a related function—to add credence to the claims of advertisers. Thus these business forms are also related to scarcity and poor product-information flow and retrieval. The traditional advertising agency was formed primarily to bridge the twin chasms of seller to media and seller to consumer. As search engines and customized media proliferate and gain in power and breadth, these very chasms are shrinking and disappearing, The creative design, naming, copyrighting, media production, as well as the strategic and positioning-logic functions of the agency are increasingly coming to the fore.

As the placement function of the ad agency has eroded, there has been an unprecedented growth in the business of licensing. Consumers, attuned to electronic media, have become ever more enamored of the purveyors of that media. Brands have built themselves into household names within both broad and narrow markets by employing sophisticated brand positioning techniques. This has created star status for the brands and products themselves, which has in turn allowed them to function as endorsees and branding for other products and services—even those that are remote from the core brand strength and identity. Nike® cereal, if it existed for example, might easily be construed to increase a consumer's energy for sports performance. This is a tertiary effect, yet even this power can be creatively harnessed within the ROAR specification.

Consumer Behavior in E-Markets

In extensive informal canvassing of the youthful high-volume users of peer-to-peer services such as Napster, it has become apparent that user fees or charges, such as those now envisioned, will be well tolerated by these users. Significantly, honest consumers are known to feel little remorse when cheating a big company, even when they would never be inclined to cheat a street-corner merchant. Simultaneously, there is considerable animosity towards advertising in the young, but at the same time there is increased dependence upon, and confidence in, the use of licensed brand-names and celebrity likenesses and endorsements in the selection of products and services.

While it approaches the problem from an economic and business process point-of-view, the ROAR system harnesses these attitudes for the benefit of those reliant on contemporary commerce processes.

Accordingly, the following methodology is suggested for dealing with the aforedescribed issues.

ONE: Elimination, in whole or in part, of the current profit model derived from brick-and-mortar commerce. The archaic notion of profits is derived from the economics of scarcity. That is, in bygone times it was imperative to bring products within range of local consumers. This involved considerable effort, expense and the carrying costs of excess inventory. Profit, or an arbitrary difference between the acquisition cost and the sale cost of such scarce products, was the natural and viable result. No wonder that children of the information age find the concept so alien, especially when it is applied to the ephemeral products of knowledge work.

With ROAR, all proceeds from the sale of goods and services are described and computed as royalties. These royalties are employed to secure remuneration to the individuals and entities contributing to the creation of value. This is a key concept. Any person or entity contributing to the creation of value, who has not been remunerated for their services and products in advance, is a part of the value chain rewarded by royalty flow. The traditional concept of profits is thus redefined as a simple royalty flowing to those value creators.

The pure idea inherent in this model is the elimination of the concept of profits, which are recast as an artifact of scarcity, and which is no longer an issue in the e-commerce world. This document does NOT address the real value of profits when scarcity IS an issue, for example with works of art by deceased artists. It should be clear, though, that the concepts contained here are useful even when used, in whole or in part, within the profit model of commerce.

Three considerations arise at this point:

1. the return of capital invested with benefits for its conversion to non-liquidity and dormancy during value creation and sales cycles;

2. the variable value of products and services in various geographic and use-specific marketplaces; and 3. the positive- and negative-tiered variable return on the investment of time, skills, services, products, materials, money, facility, and effort.

For a royalty-based remunerative model like ROAR to work, each of these considerations needs to be anticipated and implemented for it to be viable. The needs of each of these three special case considerations can be met by allowing the royalty system to be dynamically variable. This means that formulas that implement the contractual obligations between the parties in each transaction relative to the product or service being 'bought' or employed can be placed within the royalty-defining structures of that transaction. Further they must be sensitive to feedback from the marketplace in the form of sales figures, geographic and marketplace location, vendor and consumer information and the like. These goals are easily met by ROAR.

TWO: Consumers indicate the kind and quantity of advertising and sponsorship that they will allow to occur in their computing or purchasing environment, Depending on these choices, as well as upon the level of interaction of the consumer with the advertising messages and data, the consumer collects credits that are spend-able like cash. At the same time the creators of value are encouraged to cross-promote one another's products and services through a ROAR Endorsement Exchange, and thus trade the value of consumer loyalty and exposure for reduced cost to the consumer for those products or services. This system, when implemented, dramatically reduces entropy in the advertising chain by deploying a seller's resources directly at the appropriate consumer's point, and time, of purchase. This reduction of entropy is converted directly into a reduced cost of delivery for the goods or services thus endorsed.

THREE: In the consumer's quest for free media and data, the full value of the product or service offered is withheld. Online music and film and software offer no packaging and few value-added elements of value outside of the browsing/shopping experience. The perceived and real value of an entertainment or intellectual property product is far greater in scope, and more important to consumers, than the end product itself. This is true in all fields of human endeavor from mountain climbing to software design. The human beings who add value to ventures are of interest to consumers. ROAR takes packaging and value-added media seriously by providing an open, standardized platform for the creation and dissemination of promotional and packaging materials.

FOUR: Individual consumers and commercial entities are allowed to enter the branding and sponsorship marketplace for local, regional, and under-sponsored national and international artists, products and services. Under the ROAR model, any element of a product or service can be supported, for instance, by means of underwriting, by a company or other entity. For example, the mixer of a popular record (a person, persons, or company) might be endorsed by the manufacturer or seller of professional audio gear. The ROAR system provides a structure within which that manufacturer, for example, might underwrite the delivery costs (whether for purchase of the item or service or for mere viewing or discovery/examination of such item or service, say of such costs as click-through or delivery fees) of media mixed by, or otherwise endorsed by, that mixer. Such underwriting might be typically for the portion of royalty due to the mixer for his/her participation in the creation of the media being purchased or even for abstract association with the item, which association would typically be expressed through the use of endorsement metadata. Such tagging, or metadata, would usually be by means of mutual agreement between the sponsoring entity or the sponsored person or entity and the sponsored item's owners or sellers. An appropriate infrastructure is put in place for the expression of such associations. This structure is discussed elsewhere in my related patent applications, but might typically consist of a site open to potential and current sponsors for the expression of their desires to the owners and sellers of items being offered for sale or searching for sponsorship. These "requests" might be funneled to the appropriate parties to allow them to simply accept, reject, or negotiate-such underwriting by third parties.

In exchange for this total or partial underwriting promotional value would accrue to the sponsoring entity. This might be done in several ways and the tracking methodologies employed will be obvious to those skilled in the art. Examining the particular example above, the following permutations are suggested:

(a) Blanket endorsement whereby the sponsoring entity is desirous of expressing their association with the product or service sold across abroad demographic range. For example, it is believed by the sponsor that a high percentage of the purchasers of the item are, themselves, potential users of the sponsors product or service. In this case, the sponsor arranges prominent placement of sponsorship through the use, without limitation, of any device such as logo placement, optional or mandatory video clip display, links to advertising or promo sites, sponsorship branding such as "brought to you by Sony" or promotional items like coupons.

(b) Selective endorsement whereby the sponsor is desirous of placement only for professional purposes only (another example would be for limited exposure, which might be geographical, psychographical (for example, only to known users of nail polish), or demographical.

(c) User initiated endorsement whereby a viewer or purchaser of a product or serviced might elect to accept or reject a sponsor's help in the execution of a transaction. For example, Greenpeace offers to pay ten cents of the purchase price for a toxin-free battery if the purchaser agrees to certain things. These things might include the watching of a video on the dangers of the manufacturing methods employed by other battery makers, the agreement to accept their newsletter, or a donation of some amount (presumably probably more than ten cents!) to Greenpeace or another entity.

While the flavors of sponsorship above give a glimpse into the concept of ROAR-based sponsorship, the actual methods are many. What is important is that the ROAR system provides a comprehensive framework for the expression of, and execution of such underwriting and associative procedures.

Elements of the ROAR Model

Overview of the ROAR Header

Attached to each item or service for sale is a ROAR header. When a file is viewed the first thing to be apprehended is the header. If encryption has been employed, the header can be within, or outside of, the encrypted file. The header is a place for the potential or actual consumer of a product to be engaged fully in the experience of that product. It essentially performs the function of packaging, promotion, and transaction workspace for the product under consideration.

The header appears to be packaging/promotional/descriptive element. There is an electronic label, perhaps a graphic akin to a box cover, and often the logo and name of one or more sponsors. In special cases the package may have active elements on its presenting "surface".

Clicking on the package opens it and begins the background loading and/or cache recall of a variety of graphical or rich-media elements corresponding to the displayed categories. Within the header there are one or more promotional messages. Usually there is a trailer or Electronic Press Kit type of promotional element. There may be endorsements and technical specifications. There are detailed descriptions of the creators and creating entities of the product. There are packaging elements available for display and printing. There are opportunities to get and give sponsorship and endorsement to the product or service being sold, as well as to the promoting. If a consumer is to receive full underwriting of the costs of a product, there are likely to be mandatory experiences that have to be engaged in order to receive compensation for such a promotion such as the viewing/reading of commercial messages.

Overview of the Branding Marketplace

An exciting adjunct to ROAR is an e-bay-like marketplace for the swapping of branding. Unlike e-bay, though, there are no visits to the site required of the users of the system. Let's call such a service BRANDSWAP. Such a service allows the profiles of both products and consumers to be profiled. The profiling engages a peer-to-peer exchange of brand-value and consumer marketplace that automatically optimizes the cross-promotional opportunities available on a worldwide basis to each product and service sold on the web. Profits are created through the accumulation of credits on each transaction made through the brand exchange. Credits might be accumulated by levying a small fee, perhaps on the order of 3%, or such a service might be load-free and simply run as a part of the ROAR infrastructure. This type of structure is just one of the possible implementations of the sponsorship methods outlined above. Open-structure advertising and sponsorship methods of this type are also feasible.

An Example of the System in Use

The following descriptions are non-exclusive and intended to clarify the above concepts by specific illustration and are not exclusive. The execution of sponsorship and ad-underwritten products and services can also be accomplished entirely without the knowledge of the end-consumer. In practice, some combination of the volitional techniques outlined below and the purely automated methods might be implemented.

Product Categories and their Display—Level One

When a consumer is presented with a list of desired items, such as certain songs on a service such as a search engine results list, a broadcast database service like StimTV™, or peer-to-peer system, a visual indicator such as an alphanumeric character or color code might indicate the status of a desired item.

For example, a small LED-like indicator might appear next to each selection with the following type of characteristics:

RED might mean an unsponsored item. Full price will be paid for this item. To avoid cash costs, a user can elect to employ credits earned from the consumption of advertising, or from other promotions, to defray all, or some, of the purchase price.

YELLOW might mean that an item is partly underwritten. That is, a one dollar item might cost the consumer only fifty cents in cash or credits, with the other fifty cents paid by a sponsoring entity.

GREEN might mean that an item, or selection, is fully sponsored, and is available free of charge.

BLUE might mean that an item is a promotional unit, and will be free of charge, but may require participation or cooperation by the consumer in order to receive the free item or service.

The Main ROAR Header—Level Two

Let us say the consumer elects to click on a green item. This action loads the display of the external container of the item bearing the names and/or logos or promotional imagery of the sponsoring entity. It also begins the background loading of the full ROAR header. Perhaps three choices appear below the item: DOWNLOAD, ROYALTIES, PACKAGING.

The Main ROAR Header—Packaging

Imagine that the consumer elects to continue and clicks on the PACKAGING button of the sponsored container of the desired item. The container now opens to reveal a layer of the header contents. Bios, instructions, lyrics, fact-sheets, photos, video clips and the like are now presented as options while the assets themselves typically load in the background. The consumer is given the option to print any of these value-added items. Fortunately, an open-standard format will likely be agreed upon by the industry, and so printable elements are available free, or cheaply, that conform to these standards. In fact, the consumer may have received a free standardized blank lyric-book form bound in to a magazine that morning. By placing the form in the printer, a standard lyric book is created.

Because the desired item is a Green item, that is, a fully underwritten one, if the consumer now clicks DOWNLOAD the following choice appears: MEDIA ONLY and FULL PACKAGE. Clicking on FULL PACKAGE begins the background downloading of the file, while displaying the following message, INSERT ROAR COVER FORM. The user inserts the Cover Form and clicks on GO and the printing of the standardized packaging begins. Upon completion, the screen asks: INSERT ROAR BOOKLET FORM. The user inserts the Booklet Form and clicks GO, and the accompanying booklet is printed. The process might continue to allow the printing of an oversize poster. The system will then request INSERT 4 ROAR POSTER FORMS. This will result in the printing of a standardized four-by-four array that assembles easily into an oversize poster of the athlete, artist, product, logo, product in use, and so on.

The Main ROAR Header—Royalties

Now suppose the user had clicked on ROYALTIES. The faces, logos, or relevant images of the creators of the item appear. Next to each one is a breakdown of the tasks performed in the creation of the item and the relative royalties each creator will receive from the anticipated download of the item. Scrolling down, the faces of several other lesser participants appear with similar data available. E-mail or contact information is available for each creator by clicking on a CONTACT button next to each image. Background information is available by clicking BIO, or in the case of business entities, WHO?

The Main ROAR Header—Sponsorship

The user has now clicked on SPONSORSHIP. The page opens revealing images or logos and names of the top six sponsors of the perused item. Each image affords links to websites and further information and/or promotions for the sponsors of the item. There are three types of sponsorships;

1. Blanket commercial sponsorships that display sponsorship information, such as logos and branding, regardless of the viewer/buyer interested in the sponsored product or service.

2. Focused commercial sponsorships that modify and scale their display and ancillary promotional elements according to the viewer/buyer currently perusing the sponsored item or service.

3. Non-commercial sponsorships that are placed for the sole purpose of disseminating the sponsored item or service. These sponsors underwrite the product without receiving any commercial return. Even so, the sponsor can direct viewers/users of the item to websites, charities, items of personal interest (such as similar products or works), political events and campaigns, items of interest, and the like.

Beyond the traditional role of sponsorship is the more modern role of branding and endorsement. Licensing such as this is supported in depth by ROAR. There are four types of branding:

1. Blanket Income branding provides a source of reliable income to the branding entity for all users/viewers of the sponsored item or service. That is, in the example of Nike® cereal above, a portion of the royalty earned for the sale of the cereal is diverted to Nike® for the use of their positioning brand. The amount of royalty is dynamic and depends upon the circumstances of the consumption of the product or service as well as other factors. This echoes closely the traditional licensing model, however, in the actual marketplace for branding, little actual cash value needs to exchange between entities.

2. Focused Income branding is the same as above, but is dynamically altered to fit consumer characteristics, as in item 2 above.

3. Blanket Swap branding provides the new economy solution for sophisticated promotional strategies. The ROAR—compliant clearinghouse matches the potential synergies offered by both sponsoring brand or entity and product/service (and its associated consumer base).

4. Focused Swap Branding.

Within each of the categories of advertising and branding, provision is made in the ROAR specification for sub-advertising and sub-branding. The marketplace can be thought of as a large swap-meet where brand value and name value is exchanged for demographic and psychographic delivery—that is, for eyes, ears and consumer and business "mind-space".

One of the most compelling aspects of the ROAR vision of sponsorship is that multiple sponsors might coexist in a single item or service offered for sale or perusal. That is, rather than, or in addition to, a traditional blanket sponsorship ("This product or service brought to you by Ford") a media entity, for instance, employing the ROAR system might allow the individuals of the value chain to help bring sponsorship value to the experience. For example, the cinematographer of a film shown on StimTV™ is sponsored by Panavision. A viewer of a title shot by that cinematographer is viewed by someone who examines information about the cinematographer of that title and sees that that person is sponsored by Panavision through the simple display of the Panavision logo next to his/her bio or photo. Further, if that viewer then clicks on the Panavision logo further "click-through" value accrues to (in this case) either the broadcaster/narrowcaster/unicaster and/or the viewer. That broadcaster/narrowcaster might get an additional payment for example from Panavision, and/or the viewer might be offered, or simply receive, a small underwriting from Panavision on the price of purchasing that title (by, for example, downloading) from it's owner or distributor. Alternatively, perhaps Panavision provides a free "making-of" video to the consumer who clicked through to the bio of the cinematographer, simply because that person is far more likely to be interested in the products of Panavision. This example is a specific description of many possible permutations, and while it is specific to the media industry it can be equally applied to any type of product or service offering.

Direct Advertising and Consumer Reimbursement

The ROAR proposal understands the problems and opportunities lurking in a wired world fraught with intelligent agents, easy channel-surfing, and filtration systems set to remove unwanted programming and advertisements. In this brave new world, the advertising itself, and not the delivery media or distributor and programmer originating the advertisement, becomes the only path of focus to a viable ad-driven future, which is the most likely future of a free media-rich Internet. By embedding the consumption of advertising and/or the mere expression of affinity of products/services offered for sale, or of persons or entities associated with the value-chain of the creation of such products or services, or finally the end-consumer's or viewer's (of such sponsored items) expression of association with such sponsoring entities, the flow of commercial or informational messages is made integral to the transactional process. Yes, the delivery of commercial messages can be time-shifted away from the time of transaction or viewing. Yes, the form of such sponsoring or advertising affiliation with a product or service might be abstracted—for example, Nike® might cause the form of it's sponsorship of an item to be in the form of directing a viewer to simply watch (by any means, including direct link, email or snail mail link or provision of the media through any other form) a video of a particular sports star (presumably associated in the public's mind with Nike®) in action, although that video might contain no overt reference to Nike®.

Licensing, Sponsorship and Sub-Sponsorship

One of the most commercially-useful elements of the ROAR system is the rethinking of the structure of the marketplace for advertising and sponsorship. This model is entirely compatible with the ROAR proposal. In brief, the sponsorship structures of ROAR allow for many simultaneous elements (of, typically, the value-chain) to be sponsored separately and essentially simultaneously. What is added below is the powerful notion that not only do media describe themselves in enough detail to allow fractional sponsorships, but sponsors can also describe their needs in enough detail that an automated marketplace is created—one which allows unprecedented penetration into niche markets without exhaustive research and deal-making with the items that best penetrate the desired niche.

By rethinking the uses of advertising sponsorship, the ROAR system harnesses ad-derived credits and other valued things such as incentives of various types to, say, sponsor purchase and downloads. To those skilled in the art and utilizing the teachings of the present invention the system is easy to build, make secure, and use. The following will outline the basic form of ROAR sponsorship and trading.

A marketplace is established through the use of existing licensing and advertising agencies, combined with direct commerce through a web-based brand clearinghouse or other methodology including, for example, a database resident at the broadcaster/unicaster's location. Each purveyor of goods and services defines the following data:

1. By means of a profiling tool, vendors or "creators of value", profile their advertising and promotional needs by geographic and psychographic regions. The budgetary limitations of such need is described by, say, calendar dates and by physical and virtual markets.

2. Each purveyed product, service, and brand is assessed for need, current market acceptance, projected and desired market penetration, and subjective market-power and share. This assessment is performed for each actual and potential marketplace.

Rather than bring particular products and services offered for sale or for distribution to consumers/viewers to the attention of advertisers and entities looking to sponsor items that are conducive to the propagation of their brand or message, the ROAR system abstracts products by defining their important marketplace characteristics in terms that are often, or generally, divorced from the specifics of the brand. Concurrently, those entities looking to penetrate specific marketplace demographics, geographies, or psychographics describe the abstracted kinds of products or services, or the specific geo/demo/psychographic markets themselves, that they are interested in accessing.

Under ROAR, each "clip" or item in the unicaster's database, for example, holds a market profile of itself. Each sponsoring/advertising entity holds one or more market profiles that it is desirous of reaching. The logic of the database simply looks for affinities between delivered items—presumably media items—and potential sponsors. If a match is found, then the sponsor/advertiser simply becomes associated with that "clip". When an actual viewer, who is demo/psycho/geographically (any or all of these as described by the sponsor's profile) is delivered the "clip" or product/service, then a transaction occurs, or is made available to occur. The temporal order of the above system above is only one of several workable types; that is, the appropriate viewer might be sponsored directly, or located in advance of the "clip", or the clip might simply indicate, perhaps through the return of a signifier, that it is being accessed or viewed, or "mindfully consumed". The mere fact of consumption of a particular clip might sometimes, of necessity, guarantee the presence of a certain type of viewer.

It should also be repeated that advertisers and sponsors such as those envisioned above might be in multiple, often nearly simultaneous, layers, that is, they might be "umbrella" sponsors of an item (and such umbrella sponsors might shift with the particulars of the viewer of that item) or they might be sponsors of the individual elements of a header or its equivalent. The sponsors or underwriters of the particulars of an item, for example, the sponsors desirous of associating commercially with the designer of an aircraft like Burt Rutan (or with his many niche-market "fans"), as contrasted with those desirous of associating with a particular aircraft manufacturer or operator might exist simultaneously with sponsors desirous of associating with the manufacturer of a special all-weather aircraft paint. Each of these "sponsors" might add to the consumer's experience, both by providing an often-relevant layer of value-added data to the experience of interacting with an item or "clip" and also by potentially offering tangible benefits, which might include lowering the cost of delivery of certain media or items, or other perceived value.

Open-Standard Packaging

A Sample Use

Let us say a unique signifier is assigned to each product, service, and the like. Such a signifier might be similar to a UPC-code or SKU. This signifier would be caused to always accompany the delivery of a given valued-entity[1]. The signifier might be caused to additionally contain, or be referenced to, say, an industry-specific royalty-collection and distribution service. Such a service would probably be provided on a fee-free, or low-load basis—like for example, the Harry Fax Agency, which charges a flat 3% administration fee. Significantly, even this intermediary step could be eliminated through the placement of the entire royalty distribution data in for example the header of the valued-entity. This would allow the direct distribution of

[1] The term signifier as used here may be somewhat distinct from the idea of signifiers discussed in the patent A System for the Automated Generation of Media, U.S. Pat. No. 6,032,156. While it can be employed in the same manner, that is, as a unique identifier capable of verifying the consumption of media. It is simultaneously a mere class of reference to which other information is linked, which information may include metadata related to the product or service delivered or otherwise accessed. Significantly, additional signifiers might be placed at any level within the header or its equivalent. Each creator of value or other entity within the header or equivalent might bear a unique signifier, which might properly be known as a sub-signifier because it would generally fall under the taxonomy described by the primary product/service header. In general, such a sub-signifier would be returned whenever a particular element of the header (say, the bin of the director of a film) was accessed or viewed. Multiple families or variants of these signifiers might be returned (to the appropriate location for the tallying or generation of credit or incentives and the like, such location being at the client or server level or, in fact, anywhere locally or remotely) in response to varying levels of interaction with the header content. A mere viewing of the director's bio, for instance, might return one variant, while the opening and mindful consumption of the bio (as defined in the referenced patent) might return one or more variants; for example, one signifier per page read. These might be purely passive markers registering such things as clicks and page-turns, or they might be active signifiers such as those scattered around a text or video as described in the patent. What is most significant is that multiple sponsors and advertisers (as well as other useful events and information) could be tracked and triggered from within a single product or service item.

royalties to the creators-of-value themselves. The royalty-collection service, in the above example, would distribute royalties directly to the creators-of-value.

A descriptor, such as a header, might contain the following data:

PART ONE:
DATA CHANNEL/CARRIER(S) SIGNIFIERS AND ROYALTIES
  RETAILER CODE AND ROYALTY
  WHOLESALER CODE AND ROYALTY
  REP-CODES AND ROYALTIES
  REFERRING ENTITY CODES AND ROYALTIES
PART TWO:
  COLLECTION ENTITY AND ROYALTY
  PRODUCT CODE OF VALUED-ENTITY
  NAME OF ENTITY
  ELEMENT-TITLE
  RESERVED FIELDS
PART THREE:
  ROYALTY PARTICIPANT FIELDS:
  NAME OF PARTICIPANT
  ROLE OF PARTICIPANT
  PROFESSIONAL AFFILIATION OF PARTICIPANT
  ROYALTY EXPRESSED PERCENTAGE

The above fields would be repeated any number of times and, perhaps, followed by an END OF ROYALTY RECORD STRING AND PARITY CHECK.

PART FOUR:
  NON-ROYALTY CREDIT LIST
PART FIVE:
  DESIGNATED ASSIGNEES OF ROYALTIES:
  ENTITY/PARTICIPANT SIGNIFIER AND RECIPIENT SIGNIFIER
PART SIX:
  SPONSORSHIP AND AD-UNDERWRITING FIELDS
  MASTER SPONSORSHIP
  SUB-SPONSORSHIPS BY CATEGORY

The above data might be, to restate, made a part of a header (or similar data-structure attached to a transactional record and/or product) or it might be kept at the "server" as described above. In this case it might be triggered by the reception of, say, a UPC-code, a user-number, a carrier ID and the like.

While the header structure shown above is only one of myriad possibilities, it does allow the following to occur:

A royalty might be provided to the data carriers and any retailers, wholesalers, channels, reps and the like. Royalties might be described as Gross, Distributed Gross, Retail/wholesale/additive Margin, Adjusted Gross, Net, sub-royalty on any other element's royalty, and the like. It is suggested that these headers be made open to public inspection, with proprietary elements electively made open to secure inspection and audit.

The theory is that any participant in the creation of value should be able to view the distribution of profit among the participants swiftly and casually. Secure relationships such as sub-contractor percentages, and, perhaps, profit-margins might be made subject to password-protected viewing.

By way of example, consider the representative case of a recorded musical performance. Publishing and writer's royalties remain intact. The producer's royalties are now distributed directly from the purchaser or his/her financial intermediary. Engineers, arrangers and conductors might be directly represented, or might be defined as sub-royalties within another class of royalty. A record company might divide royalties into promotional, recording, administrative, packaging, and distribution royalties, or simply roll them into one master royalty. The retailer, say an Amazon.com would be entitled to a retail royalty. The provider of bandwidth might receive yet another. By use of an intermediary service, even dynamically-shifting royalties could be tracked and dispersed. Header contents could be viewed in their updated form by visiting such a "clearinghouse", or static royalty definitions could be viewed directly from the product tags or headers themselves. Importantly, each portion of such a header can be uniquely underwritten by an advertiser or sponsor and such underwriting can be automatic or made at the election of the consumer/viewer as described above.

Advertising and Promotional Licensing Compensation Offsets

The above concept might also be extended to track both the underwriting of valued-entities provision, and the distribution of licensing fees. Advertisers might indicate their willingness, or contractual commitment, to underwrite the delivery and/or creation of all or part of the valued-item[2]. This would cause a shift in the pay-through process, thus requiring less from the user/consumer of the valued item. The licenser of, for example, a likeness or brand-name, might also be attached as a participant in the creation of value.

[2] Significantly, this underwriting might be made variable with the "consumption-indicators". Consumption indicators include the demographics, psychographics, user-histories, level of verification, and similar elements discussed in the above paper. Significantly, this data could also be made a part of the "header" data. We could create reserved fields for the user/consumer data as well, or this information might be collected and processed separately and, say, reconciled at the central royalty-distribution sewer level.

Voluntary Participation and Re-Direction of Royalties

The system, at any level, could easily accommodate some elusive goals. Creators-of-value wishing to redirect all, or part, of their royalty-stream to such entities as non-profit organizations and Foundations could do so publicly. If equipped with tag/header reading, viewing (or display/listening) and writing software, which would be made universally available, even the consumer of valued entities could cause the selective (and vendor-approved) modification and/or re-direction of royalties. If such header records were made publicly-viewable then user skepticism and doubt regarding the disposition of such royalties would be easily dispelled. Additionally, consumer perception of the monolithic, faceless character of the entities receiving such royalties would be positively affected.

An additional novel twist is that provision might be made for the user/consumer of valued-items to electively pay, augment, diminish, or waive certain elements of, or all of, a royalty due on a valued-entity. Such information could be captured and routed separately, or it might be included in a header as well through the use of an additional "user" field.

Security and Signifiers

A system may be utilized which employs 'signifiers' to prove the "mindful consumption of media" as set forth in previous patents and applications by this inventor. Advertisers might object that, although they are willing to sponsor the items received, they need assurance that their sponsoring messages have been mindfully viewed. These signifier-based systems are a natural adjunct to the ROAR process that can effectively close the loop on the consumption of sponsoring messages delivered within the ROAR framework. Under this system, tokens are returned to sponsors or their affiliated parties that indicate mindful consumption of their messages or sponsoring processes. The return of such tokens might be required for the activation of the underwriting processes described herein, or their presence might amplify (as their absence might diminish) the scope, size, quality, or type of such underwriting.

Implementation

By way of example only: Headers such as those described could be made retroactively available at e-commerce sites where they would be associated with their respective products/services, or could be attached in advance to each valued entity. A user visiting a vending site could cause the header to be displayed concurrently with the overall royalty (or "price") suggested for the valued item. Any modifications allowed by the creators-of-value, and desired by the user, might be made to the header at this time. Advertising-funded 'credits' might additionally be attached and forwarded at this juncture—as could payment and debit codes such as credit/debit card numbers.

CONCLUSIONS AND SUMMARY

The system outlined here represents a radical departure from legacy commerce, pricing, and remuneration models—both business models and revenue models. It further refines, or ephemeralizes, the concepts of advertising, marketing, and licensing. And, seen in a purely on-line environment, it suggests a clear solution the rampant problems of piracy of software and media on the web by imposing a clear revenue model in the form of a uniformly-designed royalty upon all on-line transactions. At the same time ROAR personalizes theft and piracy, greatly increasing the psychological bathers to casual deception. Moreover, it modernizes the notion of remuneration through the partial or complete elimination of the notion of scarcity-driven "markup"—or profit added to an item without added value to the delivery or creation chain.

Although royalties might be collectively processed by a central entity as in the example used above was "Harry Fox" the possible use of such an entity does not rule out the use of no central entity or any combination of entities for the dissemination of royalties or 'profits'. That is, royalties can be paid to individual members of the 'value creation' team directly, or through rights organizations like ASCAP, through one or more companies (including through a central company such as a movie studio, manufacturer or the like whether or not they recognize the elimination of traditional "profits"). Thus we can press the sophisticated header concepts here into service without restructuring an industry into the recognition of the elimination of profits to do it.

The nature of ROAR includes the more nuanced concept of the mere "conversion of the notion of profits" into the notion of "royalties paid for value added". Importantly, this added value (in a corporate view) extends to the idea that a corporation adds value simply through the aggregation of needed capital, both human and financial—even, in fact, informational capital and other abstract resources that are traditionally understood as worthy of profit-taking are recast as additions to the value chain that can be expressed as royalties. This concept is abstract, but significant. That said, it's only an abstraction and the continued use of profits as a concept within the ROAR methodology is possible and would not undermine the other elements of the system.

In addition, ROAR may be implemented by means of two methods, which are not mutually exclusive. First, we might sell the kinds of fractional sponsorships envisioned here and described most completely in the "Main ROAR Header-Sponsorship" section above.

The second method is the use of the detailed graphical and textual headers described above. A broadcaster/unicaster might want to add, at least, the most prominent members of the value-creation team to the visible headers described. That is, in addition to the searchable metadata—to use media as an example again—these might include the names of such people and organizations as directors, writers, special effects houses or artists, editors, and composers, The unicaster/distributor might include photos of these people and entities along with visible or easily obtainable bios and/or discographies and credits (or links to same—which links may, in some models, like those built upon our prior patents, be presented in the form of video clips either separately from the primary stream of programming or integrated into the stream of programming). Such personalizing background info on the members of the value-creation team might even include favorite trivia, blogs, and personal touches of various kinds; these items might be an actual part of the header, or more likely be obtained through links embedded in the header.

Whether consensus is achieved by industry-wide policing, or government mandate—or neither or both—the result is clear. Such a royalty-only system eliminates the vagaries of an archaic, often artificially-centralized 'profit-centric' model. When combined with the concept of voluntary scaling and selective payments (made as granular as desirable through the assignment of such underwriting payments to each and any element of the delivery or value chain), and especially with the concept of the publicly-viewable direction and re-direction of royalties (including, visibly, to, for example, non-profit and socially-conscious recipients and other casually-related third and fourth parties), the model forms a viable and easily implemented path to a sustainable future for commerce in an online world where the notion of scarcity is less relevant than before.

Stored Credit I/O and Related-Concept Clarifications

In various embodiments, the methods disclosed include storing credits for consumed/received advertising and subsequently outputting those credits for the purpose of receiving real or imagined benefits. The methods are applied to any type of device, including for example computers, receivers, cellphone, PDA, internet-appliances and the like for the collection, tracking, storage and outputting of such credits/debits. Existing input/output devices, such as printers, voice-systems, card-readers/writers and the like are, in various embodiments, used for the dissemination of such credits in tangible or intangible forms.

A step in the redemption of credits is, in various embodiments, in the printing of material using bar codes, "digital watermarks", and any other forms of directly-computer-readable systems printable on a printer—including on an "unmodified" general purpose printer appliance, especially with the use of specially-prepared papers and/or forms. This outputting also include such systems as OCR-able characters, especially when coded in a secure way allowing electronic/optical signatures, and/or other proof of source data and methods, to be recorded, transmitted and/or read by such use of unmodified I/O devices. The method also includes the creation of physical and cybernetic coupons recording a pattern of media-use, including, without limitation, advertising and/or commercial message consumption, use of licensed media items, use/consumption of promotional and/or gaming media, or consumption of educational materials.

The rewarding of benefits for the above activities, and/or the application of credits/debits for the consumption of media for directly influencing/offsetting the cost of goods, information or services, whether related or unrelated to the consumed media, may involve printing. Systems are disclosed verifying such consumption for the purposes of modifying the above-named costs and specifically for the use of systems allowing varying degrees of remuneration or billing/debiting to occur, such activity to be based upon, or scaled, according to the level of assurance of said consumption.

Database of Extensively Downloaded Websites

In various embodiments, as URLs, websites, advertisements, links and news are presented to a surfer he/she is given the option of following a link immediately, following it in the background with varying priorities, and/or delaying it until some convenient future time. Further, the user indicates the level of penetration into the contents of a site, for example, from homepage only to exhaust site-resources. Default selection is provided, based preferably on information collected regarding the user's prior use of such systems. Additionally, a keyword or phrase or similar element is, in various embodiments, given to further refine a penetration-search of the site. The resident software registers all requests for such data.

In various embodiments, the software sits in the background looking for free moments to transmit these requests to a central server. The central server, referred to as the request server swiftly registers the entire family of requests/queries by the reception of a direct request server query, or by e-mail or other data-transfer technique such as, for instance, a Java applet with embedded query data. This query is then matched together with the querying user's profile, and/or as simple e-mail address or URL or similar ID. In various embodiments, the request server then also mines the user's search records and associated response and demographic data to look for the best-fit preference model for that user. The user is now done with the request server connection, and is free to continue foreground tasks or other queries.

Meanwhile, the request server searches its internal database, or associated networked databases looking for the requested information. Failing this, the request server engine begins to download pages, media, links and the like from the requested site. These are, in various embodiments, stored in any way, and transmitted back to the user in any way. E-mail is one way. Graphics and media assets are, in some embodiments, compressed and packed into an e-mail sent back to the user, or a notification is sent with an embedded request server-related URL. Upon, for example, opening the e-mail, the user has each relevant page of the site, or links or URLs for each such page.

In various embodiments, all graphics and a/v media are present in the e-mail or made swiftly available by links, or launchable media elements such as QuickTime files. Additionally, in the revenue model, advertisements such as independent advertisements surround, stream with, or embed in the results of the search. These ads create revenue for the visited site, the request server, and/or the user. In various embodiments, such aggressive ad-formats as independent advertisements are deployed within the user's machine thus leading to further searches from their own multiple advertisements deployment. Such aggressive ads also are programmed to replace the existing ad-offerings and sponsorships of the visited sites as perceived by the user.

In various embodiments, there is little to no waiting while surfing, and as a result a user is empowered to make freer and more complete searches. Also a new source of sponsoring revenue is made available to the user and the provider of the service and software disclosed. A new marketplace is made available to the advertiser. This is especially significant since the placement of web-page and spec-sheet contents directly in the user's receiver/computer allows unique opportunities for aggressive advertising and the targeting of highly motivated prospects. Additionally, the possible remuneration for the forwarding of such media to other prospects is made available to the user and advertiser.

In various embodiments, a user forwarding requested information to another user is rewarded, in whatever form—especially, or more so, if that user also takes action upon the data sent. In various embodiments, such forwarding is, in various embodiments, done through the request server for additional benefits to the forwarding user.

In various embodiments, the request server maintains a database of the most requested site-contents based upon historical, present, and/or projected demands for the site's contents. The request server also informs or auto-updates users when changes occur in the contents of interest to that user in the queried site. Advertising underwrites such update data and/or notices as well.

One of the key elements to improving the quality of the web experience is the removal of delays, and the concomitant frequent non-retrievable site (404) errors while surfing.

Interception of E-Mail

In various embodiments, a program resident in the user's receiver is used to intercept e-mails arriving from specified locations and place them, without user intervention, or even user knowledge, into functional structures within the user's receiver. These structures are, in various embodiments, employed to perform any number of functions with the e-mail, including the creation of sub-classes of e-mail itself. Program language and/or routines arrive and are deployed or cached, media assets are deployed or cached, and so on.

E-Mail Client Participates in Web Browsing

In various embodiments, each command issued from a browser is mediated and appropriate intermediary choices and/or commands are interposed. These choices allow the mail client to participate in the browsing process, both with outgoing and incoming mail.

User-Directed Remote Penetration and Retrieval of Sites

In various embodiments, upon the request by a user for deferred reception of a site's contents, the user refines the request through the use of keywords or categories-of-interest, as well as by intelligent search devices.

In various embodiments, the user has defined a set of keywords or similar directives to exhaust a target site of content. This contextual search is then potentially abetted by a definition of the level of penetration into the site desired by the user. In time, urgency is another vector, the results of such a penetration search are reported. All links are presented to allow the user to further specify refinements to the search that will cause further penetration into portions of the searched site. These will then be delivered. The process then repeats.

In various embodiments, the receiver has the ability to swiftly discard and retain the results of a user's search of a site. With each successive visit to a site, the process of discarding and retaining continue. Each subsequent search allows the user the opportunity to consolidate the incremental search results in a single, easily managed, file.

Level-of-Need-Sensitive and Context-Sensitive Mediating Device

In various embodiments, the effective search must accommodate varying levels of urgency and various search-contexts in the course of a natural web-search. For every searched item, a query device appears that takes, for example, the best-guess context of the clicked device from it's contained images and text as well as from it's keywords and/or its position in the stream of the search process, and allows the user to assign an urgency value, perhaps from a continuum, or by search-context to each singular or collective search.

Receiver-Resident Software Looks for Free CPU Time

In various embodiments, by monitoring keystrokes, mouse actions, modem-activity, printer-queue status, and the like, an accurate estimate is made of the appropriate time to launch and connect the background application that transmits the deferred queries to the SiteBank searching site, or its equivalent. Such a monitoring of modem activity and a comparison with, for example, historically-typical user-usage patterns and/or recognizable patterns of best-fit times for the transmission of the query data is useful. Query data is transmitted by any means to the querying site these include e-mail, cookies, URL strings and the like.

Sign-Off Icon Used to Time-Share

In various embodiments, a sign-off emblem or program element is invoked or placed upon the user's desktop. Upon termination of work, the user simply indicates sign-off status, or additionally qualifies such status: Take 5, Take 10, Take 60, Goodbye for X hours. In another embodiment, a user indicates: Use downtime for my tasks, or Use downtime for other's tasks. In various embodiments, deferred information requests, at the lowest, or lower, level of priorities are begun only at this time. The user's receiver/machine is linked to a voluntary networked distributed processing problem at this time—such as the processing of other user's information requests under the central server's control.

Query Information Selectively Converted to E-Mail

In various embodiments, a program element interposed between the transmission of query data, such as URLs, and the modem/transmission element itself, is capable of converting such a query into e-mail or into novel compound URL-strings.

Compound URL Strings/Addresses Transmit Queries and User Information

In various embodiments, any of several means are employed to subvert the simple issuance of a desired web location into a controllable query. In this scheme, the desired URL is converted into a tag beneath a slash in the URL of the querying server. That is, the URL abc.com becomes, conceptually for example, www.sitebank.com/$abc$com. Thus, in addition to traditional user information transmission such as the implantation of cookies, such information as the desired category of search is, in one embodiment, embedded in such a string or address, thus: www.sitebank.com/abc.com/business/marketing/urgent/specialoffedemail-address.

In various embodiments, at the server side, such a compound URL is decoded into its component parts: search the location abc.com for special offers references and return the results into user#xxxxxx (or e-mail address only) account under the heading business, subhead marketing. In various embodiments, this information is sent with urgent status. The use of any distinct recognizable strings of characters in such a phantom URL, as are, in various embodiments, required to enhance such a scheme are reserved as well.

In various embodiments, a shell or container or similar device may have a program, especially one intended to launch/run in the background, that acts as an intelligent mediator with a multi-tasking system in the following manner. A user, or system-initiated command, orders the launch of, or actions by, a background application or program element. The multi-tasking requests—flags and the like—of an operating system act to incite, not the intended program, but the multi-tasking shell.

The shell, in turn, utilizes as many complex sets of variables as are required to determine the proper time to actually deploy the desired program. Furthermore, in the case of a program needing to be launched, the launch not only is initiated in an appropriate time or time-slot, but the incremental launching of a program also is managed by such a shell or program. That is, rather than bogging down system resources by incrementally launching a program on an available time-slice basis, the shell allows the launching of an application on a variant-urgency basis, with interrupts of any possible length of time.

In various embodiments, a program begins to launch and then, upon the detection of user activity or system demands, go into a period of abatement where the state of the launch is recorded and the launch is held in an incomplete state indefinitely, until the parameters, for example, discussed above were detected or met. Upon arrival, or user specification, of the proper time to complete the launch and/or activities of the background application, the process picks-up where it left off.

In various embodiments, a URL is decoded into its component parts: search the location abc.com for special offers references and return the results into user#xxxxxx (or e-mail address only) account under the heading business, subhead marketing. Send this information with urgent status. The use of any distinct recognizable strings of characters in such a phantom URL, as are, in various embodiments, required to enhance such a scheme, are reserved as well.

In various embodiments, a user, or system-initiated command, orders the launch-o or actions by, a background application or program element. The multi-tasking requests—flags and the like—of an operating system act to incite, not the intended program, but the multitasking shell. The shell, in turn, utilizes as many complex sets of variables as are required to determine the proper time to actually deploy the desired program. Furthermore, in the case of a program needing to be launched, the launch not only is initiated in an appropriate time or time-slot, but the incremental launching of a program also is managed by such a shell or program. That is, rather than bogging down system resources by incrementally launching a program on an available time-slice basis, the shell allows the launching of an application on a variant-urgency basis, with interrupts of any possible length of time.

A program begins to launch and then, upon the detection of user activity or system demands, goes into a period of abatement where the state of the launch is recorded and the launch is held in an incomplete state indefinitely, until the parameters, for example, discussed above are detected or met. Upon arrival, or user specification, of the proper time to complete the launch and/or activities of the background application, the process picks-up where it left off.

Figure 7:
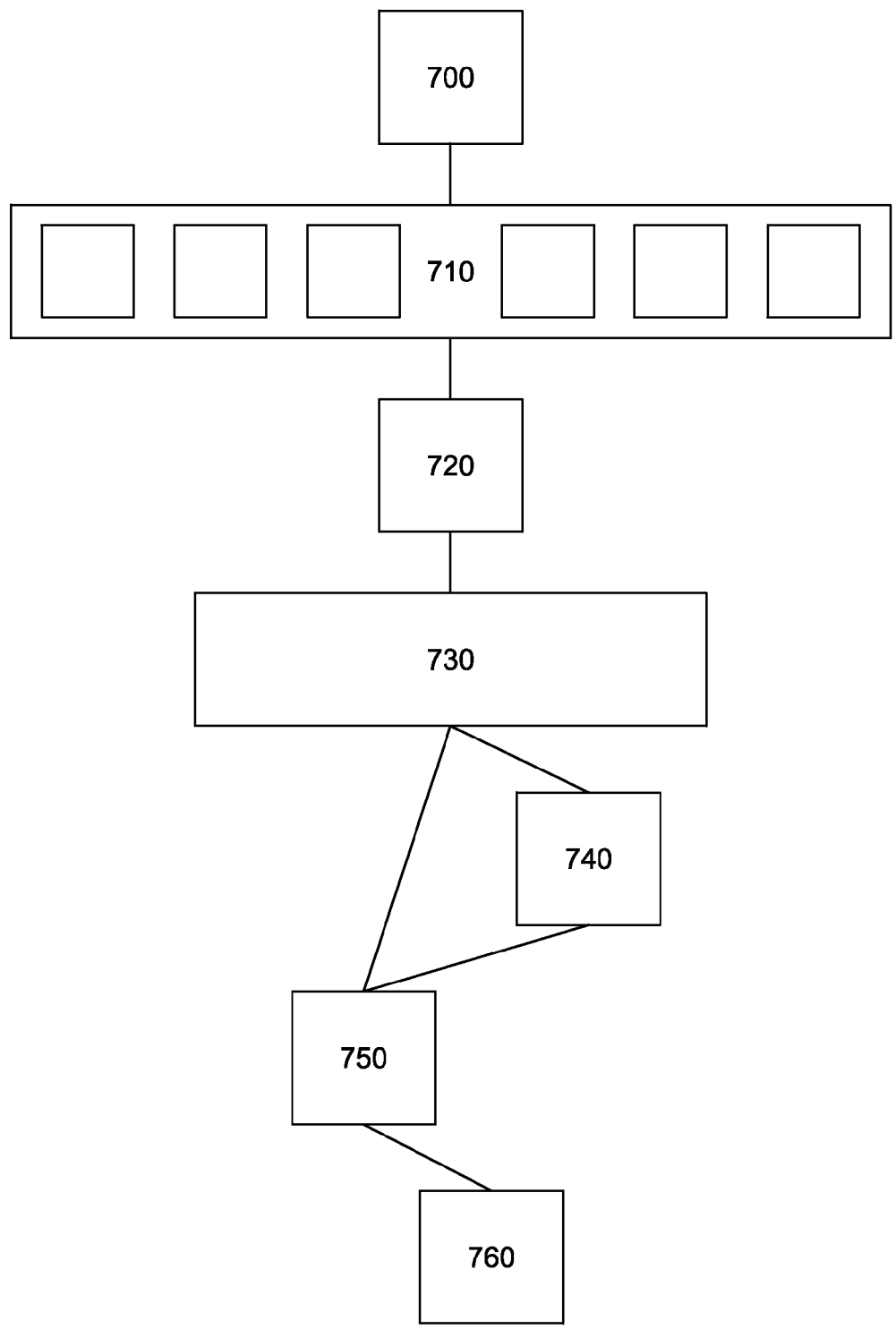
FIG. 7 is a block diagram of a delivery system in accordance with one embodiment of the present invention.

FIG. 7 illustrates a delivery system in accordance with one embodiment of the present invention. A multipurpose antenna 700, or array of them, and/or Internet or telephone or other land-line sources, feed received signals to a receiver-group 710 capable of configuring themselves to receive any variety of signals, modulation schemes, frequencies, and data- or signal-formats intended for use by the receiver. These receivers are preconfigured by a cached, or default, instruction set, and during the receive-cycle, by active configuration instructions arriving with the signals decoded. A tag and header decoder 720 recognizes media assets and routes them into a cache memory 730 which is grouped into various families by speed and durability of media-clips.

The decoder also splits the tags and/or headers into the various general families of such tags:

receive-configuration data will be employed to dynamically alter the channels and signals received for caching;

template data will store templates and template fragments to be used as master-programming rule-sets governing the assembly of media assets;

user-profile and use data will be employed to update the demography/psychography of the user.

Each of these data types is cached and then routed, as instructed by the interaction of those data-types, to a template-assembly module 740, where the algorithmic interaction of these data-types assembles final template employed to assemble and select media-assets or clips. Simultaneously, the template-assembly module instructs the asset-cache, which is receiving a constant stream of media, to save or destroy the cached and being-cached assets according to the factors of the various user-data described above. The edit assembler 750 then issues a request for media assets to the cache and the cache returns a stream of media program data to the edit assembler.

Acting in the way described above in connection with assembly of media programming, the assembler concatenates the appropriate assets and delivers them to the final-stage display-drivers and audio caches, D to A converters, and amplifiers 760.

In various embodiments, a switching system allows the user access to the appropriately conditioned media streams arriving into the configurable receivers. By conditioned access is meant the moderated and/or hosted presentation of those streams.

In various embodiments, all programs viewed, including advertising, along with user-presence data and user parameters are passed to the verification and crediting subassembly.

In various embodiments, user parameter records composited from historical and current patterns and factors, viewed-program data derived from monitoring video-RAM and the like, and verification data resulting from user interaction with media clips, arrive from the main receiver assemblies. Internally to the verification system, the settings of the receiver's user controls, such as volume settings, and the outputs of any user-presence sensors, such as keystrokes, mouse movements, and seat-switches, are routed to a viewer-presence and media-consumption matrix. Here, the several factors described above are weighted and cross-referenced and sent to a credit/debit computation and storage device. Here the factors are scored and stored, and upon request by the user or the system, the viewing records and their resultant credits/debits are both routed to a central server by any suitable means, such as a cell-phone, or output directly at the point of reception by any of the proposed methods described above.

In various embodiments, the receiver concept is also applied to generation of media from a remote location. For example, all or some of the role of an engine at a client computer is, in various embodiments, provided at a suitably configured server. Programming is, in various embodiments, delivered by cellular or landline telephone, with a remote assembly of programming. For landline telephone, for example, in exchange for reduced fee services, assembly is at the local service provider's switch, or at a long-distance service provider's facility. Programming is assembled for users who identify themselves upon placing a call to a business or other entity, or caller id is employed.

References to "viewers", "listeners", "users" and the like refer to anyone who receives programming of any type. This includes visual programming, which includes motion video, still images and text, games, mixed media, including audio-visual programming, audio programming by any delivery system (broadcast radio, digital cable audio, web radio, cellular telephone, landline telephone, or other media), or other sensory perception, such as the production of odors using suitable hardware in conjunction with a personal computer.

In various embodiments, the system is also employed in an interactive system that leads the viewer to select a desired sequence. The system, for example, provides more interesting visual data in areas of the screen that lead to the selection of material that the viewer should see, or provides smooth transitions from audiovisual assets incorporated in the program as a result of viewer input to audiovisual assets incorporated in the program to achieve a predetermined purpose (e.g., to convey certain information to the viewer).

Multiple Re-Use

In one embodiment, recorded media is available for re-use in a variety of programming. In an example embodiment, a movie is recorded and tagged. When a user's profile indicates the movie should not be rated higher than "PG", the receiver assembles (e.g., by removing, replacing or editing offending scenes using tagged replacements or edits) the movie such that the finished program is rated "PG". When a user's profile indicates the movie should be rated at least "R", the receiver assembles (e.g., by adding in more adult scenes, language, etc.) the movie such that the finished program is rated "R". Thus, production companies which normally are not financially able to produce and market multiple versions of the same media are now enabled to do so.

In another embodiment, one movie is used as a tagged source for insertion into programs other than the movie. For example, some of the movie media is inserted into a news program dealing with the movie. In another example, the movie is inserted in part of another movie (e.g., as a clip a character is viewing on TV or in a theater). In yet another embodiment, audio clips from the movie are placed in other program (e.g., bumpers or song transitions) to improve the entertainment quality of the flow of the program.

Editing Structure for Self-Assembly of Non-Branching Video

In various embodiments, a hierarchical structure, whether resolved by logical if-then statements leading to a single branched conclusion, or assembled by, for example, intelligent expert systems employing other logical systems, is used.

In various embodiment, there is a conceptual division between media content and structure. Media content is represented by metadata descriptors or tags. "Content" is understood by any combination of human or cybernetic processes of analysis of the visual, audio, and contextual content of a media clip. In one embodiment, content is represented by tags.

"Structure" is represented by templates. In various embodiments, templates are generally created as part of a workflow process. The process is slightly different for legacy media that is in need of atomization and re-purposing.

Look-and-Feel Templates

In various embodiments, at the highest level, a producer sets the "look-and-feel" of a "channel". A channel is understood to mean anything to which a user can "tune", or select, that delivers media programming. The "look-and-feel" is, in various embodiments, the most important foundational element of the media structure. Each viewer/user, and at each unique time and in each unique situation, can experience a different look and feel.

In one embodiment, the look-and-feel parameter is reduced to a template or series of templates that control:

types of graphics employed as interstitials, bumpers, logos, segment titles and the like;

style of music and sound effects and mixing employed;

general characteristics of the presented stream of media, including general speed/pace of editing;

graphic appearance, including "bugs"[3] windows, and overlays;

[3] Bugs are small logos or other identifying marks generally overlayed on the lower corner of a video to mark its source or sponsor. Of note is that elsewhere in the PPA documentation "bugs" are caused to be generated "on-the-fly" rather than in the normal post-production cycle. This could be a part of the look-and-feel settings by causing the identity of a "channel" or of its sponsor to shift dynamically with contextual factors. This may be a novel thought.

musical and sonic identity;

style of transitions (hard-cut, fade-to-black/white, slow dissolves, etc.);

overall frequency of advertisements, logos, station ID's, PSA's, interstitials, bumpers, announcements, diversions, and main or subsidiary programming elements;

temporal shifts of the above parameters, globally according to date/season/special events as well as by time of day and day of week.

The templates are, in various embodiments, called up or swapped according to time-of-day, week, year, and other desired parameters, such as contextual needs. These contextual needs can be dynamically sensed to shift templates. Look-and-feel templates are typically out of the reach of users/viewers. That is, while user interaction can modify other elements of the delivered signal at the template layer, the look-and-feel settings are not generally accessible to user modification. However, in one embodiment, users have full access to modify the look-and-feel settings.

This does not imply that the identity and efforts of a user are not reflected in this template. In one embodiment, input from a viewer/user is caused to modify the characteristics of the look-and-feel template or to cause the selection of a new or different template, but the user cannot directly cause this to occur.

Program Mix Templates

In various embodiments, the program mix parameter is related to the look-and-feel of a VOD "channel". It is the meta-layer above the actual modules of programming—that is, the programs or "shows". In various embodiments, a producer and/or instructional/program designer also defines the mix of programming to which a given "channel" of VOD will default. The "channel" defaults to a given "program mix" defined by the channel designers or, upon the receipt of a query from a user, modifies the program mix template according to the request parameter or swaps it out for a new template, such as a user-generated set of preferences.

Program Templates

In various embodiments, the producer or designer or instructional designer of a program is the person who would typically define the program template(s). This template defines the flow of modules within a given program block. In various embodiments, there are more than one such template. For example, a short-form program design is governed by a different design than a long-form presentation of the identical content requires.

In various embodiments, the first element of the Program Template is its designator. For example: WORKPLACE SAFETY, HIGH-PRESSURE GAS. This identifies the function of the template and causes it to adhere to the underlying media content in the event of a request by the "program mix" template for this type of programming, or by a user of the system. The template thus labeled contains a specific series of modules as metadata which corresponds to actual media elements stored in a database and tagged to identify them.

In an example embodiment, a program is about "workplace safety". The program template suggests something like the following modular sequence: logo, opening, host intro, dramatic sequence, question-answer series, short logo, host commentary, comic commentary, talk-show, host wrap-up, short logo, closing sequence. Notice that specific content description is not required at this level. Rather, the template contains an abstraction of the general function of each segment.

In various embodiments, below these segments, specific topics are also defined for each segment as well. The actual media corresponding to these elements exists in the database in non-temporal disarray.

In various embodiments, there exist other layers of templates below these. Generally, the clip metadata is directly below the templates. These, in turn, cause the actual assembly of the clips.

Template Manager

In various embodiments, the template manager receives parameters from the various sources which influence the selection of, and modification of, templates. It calls up the appropriate template from a database of templates. If required, it performs the appropriate modifications to, and substitutions of, the templates. The template parameters are then passed to the program element, the program assembly engine, which assembles the clip metadata into a data-only representation of the final program. After the testing for appropriateness described elsewhere, and the resultant substitutions, the edit-decision list resulting from the superimposition of template requirements with actual database clip contents is passed to the video-assembly engine for delivery to the user.

Workflow and Templates

In various embodiments, a workflow tool is dedicated to the creation of look-and-feel and program-mix templates. The appropriate locus for these tools is unique to the production process. In various embodiments, both sets of templates are defined in a spreadsheet-like application. The look-and-feel parameters outputted by the workflow element are often exported to the video-editing device, such as an Avid "Media Composer" or Apple's "Final Cut Pro". Here, in the event that a unitary look-and-feel is desired for the clips under consideration in the editor, they become the default parameters assigned to individual clips. Alternately, they are passed directly to the VOD server where they are maintained in a look-and-feel database for instantaneous deployment at the time of viewing/listening. In various embodiments, the program-mix parameters are not required in the editing environment, but are passed directly to the VOD head-end server.

In various embodiments, in the head-end server, the pair of templates dominate the delivery of default video streams. Default, in this usage, means without active "rollover" or other immediate, current, input from the viewer/user. In various embodiments, default delivery values weight the unmodified look-and-feel and program mix templates with viewer profiling parameters derived from historical viewing data and preferences, and other pre-profiling of the user.

In various embodiments, the workflow component is implemented at the level of the clips. In the scripting phase each clip is defined by a unique identifier (like, for example, 123456), type (meaning, for example, "dramatic enactment"), function (e.g., "teachable moment generator"), content (e.g., "diabetic coma, female, teen"), subject (e.g., "ketosis, over-eating"), demographic (e.g., teen, female, non-smoker, type I), psychographic (e.g., "low esteem, follower"), and subgroup (e.g., #2 of 10 clips, module B).

In various embodiments, other factors are recorded here as well, like underscore musical style, mood, quality, relative-importance weighting, sequence (the presentation order of a clip series), repeatability, and so on. This list is not exhaustive, and there are other tag types.

In various embodiments, these values are captured in a pre-formatted descriptive heading in the same word processor/scripting application used to write the description and/or text of the scene/clip described. The actual scene is then written out. The output of the headers is passed in a standard format, like OMF (Open Media Framework), to the video-editing system in such a way that the simple inputting of the identifier for the audio/video media clip to be edited, causes the data-bearing tags to form and assign to the media clip. Upon export of the clip to the database, these parameters (together with the unique "fuzzy-end" parameters assigned by the editor to each clip so marked) are passed along to form the metadata for that clip.

Variant-Length-VOD Delivery of Programming

In various embodiments involving VOD, the viewer is a passive consumer of media. In various embodiments, legacy media assets are tagged in order to re-purpose them by presenting them through the agency of our video engine as demographically/psychographically/contextually-relevant programming. In various embodiments, the system is used to re-purpose, for example, a collection of newsroom assets from several years of broadcast.

Various embodiments contain a series of templates relevant to the intended uses of the legacy programming. The assets are reviewed, tagged, placed (along with their metadata and templates) in a database and served to media recipients by on-line, cable, or other means.

In various embodiments, the delivery system provides a means for the profiling of users/viewers/listeners, provides a means for the acceptance of input from users regarding program selection by specific topics, moods, uses (say, party videos) and the like, customizes the delivered video/audio to users according to the mix of static constants, programmer-variables, and user input and usage history and maintains a suitably confidential record of the usage history and viewer profile data.

In various embodiments, the delivery system provides a video stream that will time-compress the video experience through the use of any number of methods, chief of which is the assignment of tags that define, without limitation, the most interesting, salient, attractive, shocking, and/or compelling clips to be shown to a viewer—or, for example, remove every other frame of video (or any other time-compression method). Alternately "tile" multiple video streams as boxes, regions, or layers of a uses video screen to achieve a simultaneity onscreen of multiple assets of temporal regions of assets.

In various embodiments, the delivery system spontaneously substitutes from within the database, or process (by, for example, time-compression), the audio component of condensed video clips, accepts user-input in the form of clicks, roll-overs, voice-commands, gestures, and the like indicating interest, or lack thereof, in the delivered media stream or its elements and utilizes the video database and engine to modify the stream of delivered programming to suit or respond to those inputs.

In other embodiments, without input from a user, the default stream issues within the look-and-feel parameters defined for that user by the "broadcaster/programmer". Upon input, such as clicking, the broadcast stream modifies thus: one form of input brings up the menu and pauses, or remembers, the point of "click" or input, another simply causes the clicked item to telescope. The telescoping (in time, or potentially in space by, say, tiling) of the selected clip can continue through several layers of detail according to user input. Upon the reception of two (or any designated number) of clicks/inputs, the full video program presents itself and plays.

In yet another embodiment, upon the issuance of the desired number of inputs (gestures, clicks, button-pushes) to indicate real, significant interest in a module of video (which has been shown in one or more short encapsulated forms) the user is transferred to another channel for viewing of the full-length piece.

In various embodiments, advertising income is a modified infomercial model. That is, a short "teaser" ad (say a 5-30 second ad) would, upon a single "click" open to a, say, 30-60 second ad. A second "click"/gesture, or a default issuing because no "click-out" was registered during the expanded advertisement, cause the ad to become a full-length infomercial experience. Advertisers and content-providers are charged a referral fee that takes one or more of many forms (e.g., flat fee, commission on sales, per-minute or per-exposure fee, and so on).

It will be apparent from the foregoing that, while particular forms of the invention have been illustrated and described, various alternatives, modifications and variations can be made without departing from the spirit and scope of the invention. Accordingly, the invention is intended to embrace all such alternatives, modifications and variations and it is not intended that the invention be limited, except as by the following claims.

I claim:

1. A method of media distribution, comprising:
    obtaining a first media stream comprising first media elements from a first media source;
    tagging said first media elements with a first plurality of first and second tags;
    obtaining a second media stream comprising second media elements from a second media source;
    tagging said second media elements with a second plurality of first and second tags;
    obtaining a template wherein said template guides assembly of a media program;
    assembling said media program to include elements of said first and second media streams using said template and according to a combination of at least some of said first plurality of first tags and said second plurality of first tags; and providing an indication of at least one aggregated royalty revenue according to a selected set of said first and second plurality of second tags, wherein each second tag comprises a header, wherein said header comprises data relating to a royalty obligation.

2. A method according to claim 1, wherein said header includes data relating to Downloads, Royalties and Packaging.

3. A method according to claim 1, wherein said header includes data relating to Sponsorship.

4. A method according to claim 1, which includes a descriptor for DATA CHANNEL/CARRIER(S) SIGNIFIERS AND ROYALTIES.

5. A method according to claim 1, wherein said header includes data relating to RETAILER CODE AND ROYALTY.

6. A method according to claim 1, wherein said header includes data relating to WHOLESALER CODE AND ROYALTY.

7. A method according to claim 1, wherein said header includes data relating to COLLECTION ENTITY AND ROYALTY.

8. A method according to claim 1, wherein said header includes data relating to PRODUCT CODE OF VALUED-ENTITY.

9. A method according to claim 1, wherein said header includes data relating to ROYALTY PARTICIPANT FIELDS.

10. A method according to claim 1, wherein said header includes data relating to ROLE OF PARTICIPANT.

11. A method according to claim 1, wherein said header includes data relating to PROFESSIONAL AFFILIATION OF PARTICIPANT.

12. A method according to claim 1, wherein said header includes data relating to ROYALTY EXPRESSED PERCENTAGE.

13. A method according to claim 1, wherein said header includes data relating to NON-ROYALTY CREDIT LIST.

14. A method according to claim 1, wherein said header includes data relating to ENTITY/PARTICIPANT SIGNIFIER.

15. A method according to claim 1, wherein said header includes data relating to RECIPIENT SIGNIFIER.

* * * * *